US010331095B2

(12) United States Patent
Patel et al.

(10) Patent No.: US 10,331,095 B2
(45) Date of Patent: Jun. 25, 2019

(54) SYSTEMS AND METHODS FOR DEVELOPMENT OF AN AUTOMATION CONTROL SERVICE

(71) Applicant: Cox Communications, Inc., Atlanta, GA (US)

(72) Inventors: Dipan Patel, Atlanta, GA (US); Nadine Finnerty, Atlanta, GA (US); Edgar V. Shrum, Jr., Atlanta, GA (US); Andrew Goldberg, Atlanta, GA (US); Haynes Taylor, Atlanta, GA (US)

(73) Assignee: Cox Communications, Atlanta, GA (US)

( * ) Notice: Subject to any disclaimer, the term of this patent is extended or adjusted under 35 U.S.C. 154(b) by 468 days.

(21) Appl. No.: 14/668,453

(22) Filed: Mar. 25, 2015

(65) Prior Publication Data

US 2015/0309493 A1 Oct. 29, 2015

Related U.S. Application Data

(60) Provisional application No. 61/986,080, filed on Apr. 29, 2014.

(51) Int. Cl.

| | |
|---|---|
| ***G05B 15/02*** | (2006.01) |
| ***H04L 12/28*** | (2006.01) |
| ***G06N 5/04*** | (2006.01) |
| ***G06N 99/00*** | (2019.01) |
| ***G06N 20/00*** | (2019.01) |
| *G06N 7/00* | (2006.01) |

(52) U.S. Cl.
CPC ............... *G05B 15/02* (2013.01); *G06N 5/04* (2013.01); *G06N 20/00* (2019.01); *G06N 99/005* (2013.01); *H04L 12/2803* (2013.01); *G06N 7/005* (2013.01)

(58) Field of Classification Search
CPC ........ G05B 15/02; G06N 5/04; G06N 99/005; H04L 12/2803; G05N 7/005
USPC .......................................................... 700/275
See application file for complete search history.

(56) References Cited

U.S. PATENT DOCUMENTS

| | | | |
|---|---|---|---|
| 7,222,113 B2 | 5/2007 | Katz | |
| 7,266,532 B2 | 9/2007 | Sutton et al. | |
| 7,275,048 B2 | 9/2007 | Bigus et al. | |
| 7,315,903 B1 | 1/2008 | Bowden | |
| 7,640,291 B2 | 12/2009 | Maturana et al. | |
| 7,991,602 B2 | 8/2011 | Maturana et al. | |
| 8,116,889 B2 * | 2/2012 | Krzyzanowski | H04L 12/2816 700/83 |
| 8,402,101 B2 | 3/2013 | Callaghan | |

(Continued)

FOREIGN PATENT DOCUMENTS

CA 2531605 A1 * 6/2006 ............... G06F 9/54

OTHER PUBLICATIONS

Benazzouz et al., Dyanmic Service Composition in Ambient Intelligence Environment, 2009, 2009 IEEE International Conference on Services Computing, pp. 411-418.*

(Continued)

*Primary Examiner* — Mohammad Ali
*Assistant Examiner* — Joshua T Sanders
(74) *Attorney, Agent, or Firm* — Eversheds Sutherland (US) LLP

(57) ABSTRACT

Aspects of the disclosure relate to intelligent automation control of an environment based at least on intelligence associated with behavior of an operator and/or equipment.

16 Claims, 39 Drawing Sheets

(56) References Cited

U.S. PATENT DOCUMENTS

| | | | |
|---|---|---|---|
| 8,536,998 | B1 | 9/2013 | Siu et al. |
| 9,318,108 | B2 | 4/2016 | Gruber |
| 9,477,240 | B2 | 10/2016 | Musunuri et al. |
| 9,800,429 | B2 | 10/2017 | Crayford et al. |
| 2003/0005030 | A1 | 1/2003 | Sutton et al. |
| 2004/0059698 | A1 | 3/2004 | Katz |
| 2004/0205101 | A1* | 10/2004 | Radhakrishnan ..... G06F 9/5016 709/200 |
| 2004/0030531 | A1 | 12/2004 | Miller |
| 2006/0167667 | A1 | 7/2006 | Maturana |
| 2006/0187017 | A1 | 8/2006 | Kulesz et al. |
| 2006/0206442 | A1 | 9/2006 | Hartman |
| 2006/0209868 | A1 | 9/2006 | Callaghan |
| 2007/0130014 | A1 | 6/2007 | Altberg et al. |
| 2007/0255852 | A1* | 11/2007 | McBride ............... H04W 12/06 709/246 |
| 2007/0271134 | A1 | 11/2007 | Ferry et al. |
| 2008/0022331 | A1 | 1/2008 | Barrett |
| 2008/0040304 | A1 | 2/2008 | Pujolle et al. |
| 2008/0090656 | A1* | 4/2008 | Hartwig .................. A63F 13/00 463/30 |
| 2008/0120422 | A1* | 5/2008 | Park ...................... H04L 67/025 709/229 |
| 2008/0282191 | A1 | 11/2008 | Branam |
| 2009/0150156 | A1 | 6/2009 | Kennewick |
| 2009/0206154 | A1 | 8/2009 | Pietrzyk et al. |
| 2009/0300673 | A1 | 12/2009 | Bachet |
| 2010/0063774 | A1 | 3/2010 | Cook et al. |
| 2010/0100426 | A1 | 4/2010 | Sander et al. |
| 2011/0029373 | A1 | 2/2011 | Steelberg et al. |
| 2012/0030721 | A1 | 2/2012 | Smith |
| 2012/0066168 | A1 | 3/2012 | Fadell et al. |
| 2013/0152092 | A1 | 6/2013 | Yadgar |
| 2013/0238538 | A1 | 9/2013 | Cook et al. |
| 2013/0245837 | A1 | 9/2013 | Grohman |
| 2013/0289952 | A1 | 10/2013 | Marwah et al. |
| 2013/0297555 | A1 | 11/2013 | Fadell et al. |
| 2014/0047107 | A1 | 2/2014 | Maturana |
| 2014/0108019 | A1 | 4/2014 | Ehsani |
| 2014/0172412 | A1* | 6/2014 | Viegas .............. G06F 17/30864 704/9 |
| 2014/0244834 | A1 | 8/2014 | Guedalia et al. |
| 2014/0324599 | A1 | 10/2014 | Munoz Torres et al. |
| 2015/0003798 | A1 | 1/2015 | Walker |
| 2015/0006463 | A1 | 1/2015 | Fadell et al. |
| 2015/0057808 | A1 | 2/2015 | Cook et al. |
| 2015/0120000 | A1 | 4/2015 | Coffey et al. |
| 2015/0154976 | A1* | 6/2015 | Mutagi ................. H04L 12/281 704/275 |
| 2015/0213490 | A1 | 7/2015 | Oikonomidis |
| 2015/0220978 | A1 | 8/2015 | Abraham et al. |
| 2015/0227118 | A1 | 8/2015 | Wong |
| 2015/0302462 | A1 | 10/2015 | Chan et al. |
| 2018/0005125 | A1* | 1/2018 | Fadell .................. G05B 19/042 |

OTHER PUBLICATIONS

Shafiq, et al., Bridging Multi Agent Systems and Web Services: towards interoperability between Software Agents and Semantic Web Services, Proceedings of the 10th IEEE international Enterprise Distributed Object Computing Conference (EDOC '06), 2006. (pp. 85-96).*

Vallée, et al., Flexible Composition of Smart Device Services, 2005, Proceedings of the 2005 International Conference on Pervasive Systems and Computing, PSC 2005, Las Vegas, Nevada, Jun. 27-30, 2005. pp. 165-171.*

Stein Berg, Brian. Fox to Use Hulu Inventory for Advertiser 'Make-Goods'. AdAge [online], Nov. 2010 [retrieved on Mar. 18, 2018]. Retrieved from the internet: <URL: http://adage.com/article/media/tv-fox-hulu-inventory-advertiser-make-goods/147256/> (Year: 2010).

Crupi, Anthony. When Make-Goods Aren't Good Enough. Adweek [online], Apr. 2014 [retrieved on Mar. 18, 2018]. Retrieved from the internet: <URL: http://www.adweek.com/tv-video/when-make-goods-arent-good-enough-157306/> (Year: 2014).

* cited by examiner aide

Round-the-clock care at home

EXAMPLE FEATURES

An always-there aid for the elderly or those with chronic conditions. Aide provides the convenience, comfort and personal attention of a dedicated, live-in helper at a fraction of the cost. Making that key aspiration, ageing in place, a more accessible reality

EXAMPLE SCENARIO ADDRESSED BY ASSET

For many seniors, or even those with chronic illnesses, frequent trips to the physician or treatment center can be the most stressful and unpleasant part of the journey. And while many of these check-ins and treatments are routine, most do not have the luxury of at-home care to relieve them of this burden or assist in moments of emergency

EXAMPLE FEATURES

An always-on asset that permits at least to:

- Assist with monitoring and tracking of or otherwise monitor and track biometric condition(s) and/or overall health
- Assist with scheduling and/or administering of or otherwise schedule and/or administer regular
- Notify medical services in case of emergency
- Enable remote monitoring for a third party (e.g., extended family)

FIG. 5A trainer

Helping you stay healthy and fit, both actively and passively

EXAMPLE FEATURES

A round-the-clock personal fitness coach. Trainer not only provides the expertise and structure of a class or one-on-one session, but also helps you manage your end-to-end fitness goals *passively*, in the times between your workouts

EXAMPLE SCENARIO ADDRESSED BY ASSET

Staying active can be a burden. So much so that many people rely on the structure and direction of fitness classes or personal trainers to ensure they stay active. On the other hand, working out at home can require an overwhelming amount of base knowledge and self-discipline, and often results in unmet fitness goals

EXAMPLE FEATURES

A 24/7 fitness management asset that permits at least to:

- Assist with selection of or otherwise select and plan personalized workout regimens
- Conduct guided one-on-one and/or group workout sessions
- Deliver video content OTT and/or through video-on-demand (VOD) platform(s)
- Provide a holistic assessment for achievable personal goal(s)
- Track day-to-day activity of a user toward the user's personal goal(s)

FIG. 5B guardian

Your dedicated protector for the physical and digital world

EXAMPLE FEATURES

A multi-platform security guard. Guardian goes beyond locks and alarms to protect you and your family not just from the traditional threats of the home, but also those of the internet and connected devices

EXAMPLE SCENARIO ADDRESSED BY ASSET

In today's home, protecting against unwelcome intruders and fire is only half of the security equation. With an increasing number of intelligent devices and more and more of our time spent online, there are more ways into the home than ever—even if they aren't physical. Consumers are aware of today's digital threats, but lack a simple, consolidated solution they can trust

EXAMPLE FEATURES

Home security asset that integrates and permits at least the functions of:

- Physical security system(s), such as alarm(s), sensor(s), and/or detector(s)
- Automated home function(s), such as lighting, shading, and/or lock(s)
- Digital security solutions, such as virus protection, file encryption, reputation management and/or parental content control(s)
- 911 and/or E-911 notification and/or communication with other emergency service(s)

FIG. 5C dj

The master of your at-home listening experience

EXAMPLE FEATURES

Part jukebox, part audio engineer, DJ creates ideal music-listening experiences for every moment at home. Whether you're entertaining guests in the living room or relaxing alone in the study, DJ knows what you want to hear and where you want to hear it

EXAMPLE SCENARIO ADDRESSED BY ASSET

Music is as core a component of the at-home experience as lighting and temperature control, yet by comparison, it requires more active and regular maintenance by the user to optimize and enjoy. And while existing music services can help predict *what* you want to hear, they do little to predict when, where and *how* you want to listen

EXAMPLE FEATURES

A music management asset that permits at least to:

- Predict what music a user desires to listen to
- Control the location in a living or working space at which music is to be played based on position of an occupant within the space
- Modulate sound volume or other type of sound characteristics based at least on activity of an occupant of a living or working space
- Coordinate with other services to optimize your listening experience

FIG. 5D assistant

Helping bring your office to the home

EXAMPLE FEATURES

A personal assistant that not only manages your schedule and connects your calls, but who transforms your home seamlessly from place of rest to place of work at the swipe of a finger

EXAMPLE SCENARIO ADDRESSED BY ASSET

With telecommuting an increasingly common practice, more and more consumers need their homes to serve as both a place of rest *and* of work. And while working from home may offer convenience, many are forced to sacrifice the aspects of the office that allow for high quality connectivity, focus and productivity.

EXAMPLE FEATURES

A full-service digital secretary that permits at least to:

- Prioritize bandwidth to ensure high-speed connectivity for key tasks
- Configure and/or connect to conference calls and video conferences
- Secure connectivity and/or information backup
- Coordinate with other services to create a satisfactory at-home work environment

FIG. 5E

SYSTEMS AND METHODS FOR DEVELOPMENT OF AN AUTOMATION CONTROL SERVICE

CROSS-REFERENCE TO RELATED APPLICATION

This patent application is related to and claims priority from U.S. Provisional Patent Application No. 61/986,080, filed Apr. 29, 2014, the content of which is hereby incorporated by reference herein in its entirety.

This application is also related to application Ser. No. 14/668,435, filed concurrently with the present application on Mar. 25, 2015, entitled: "SYSTEMS AND METHODS FOR INTELLIGENT AUTOMATION CONTROL SERVICES;" application Ser. No. 14/668,442, filed concurrently with the present application on Mar. 25, 2015, entitled: "SYSTEMS AND METHODS FOR INTELLIGENT CUSTOMIZATION OF AN AUTOMATION CONTROL SERVICE;" and application Ser. No. 14/668,449, filed concurrently with the present application on Mar. 25, 2015, entitled: "SYSTEMS AND METHODS FOR AUTONOMOUS ADAPTATION OF AN AUTOMATION CONTROL SERVICE;" the contents of which are hereby incorporated by reference in their entireties.

SUMMARY

This summary presents a simplified, rather than extensive, overview of the disclosure in order to provide a basic understanding of some aspects thereof. In addition, this summary is not intended to identify key or critical elements of the disclosure or delineate any scope thereof. Instead, this summary presents certain principles of the disclosure in a simplified form as a prelude to the more extensive detailed description that is included in the present specification.

The disclosure generally relates, in at least certain aspects, to consumer-centric intelligent automation control. Such intelligent automation control can rely upon or otherwise leverage at least three functional elements: (1) a gateway device that can recognize devices and/or sensors, and connectivity standards in order to deliver managed automation control services. The gateway device can have varying degrees of complexity and, in certain embodiments, the gateway device can be embodied in or can include a unit that sends traffic and/or signaling to a backend network or a computing device thereof (such as a network element or a "cloud" element) where at least a portion of the traffic and/or signaling can be processed or otherwise managed. (2) A suite of automation control services that can be provided in a cloud arrangement or are otherwise distributed in a networked configuration. An automation control service can include assets (referred to as "automation control assets), such as hardware, firmware, and/or software. As such, an automation control service can include physical components and/or software components. In certain embodiments, an automation control asset can include a device that can operate within a controlled environment. (3) A dynamic library or supply of customizable service settings (which may be referred to as "modes") associated with an automation control service and/or an automation control asset. In one aspect, automation control assets and/or related modes can be developed by a community of users via a development platform and related portal that can permit sharing and/or discovering new configuration of connected services and devices within a controlled environment.

The disclosed automation control can be based on learned behavior(s) of the consumer and, in one aspect, can be dynamic or otherwise evolve over time. Intelligence associated with such behaviors can be gleaned from or otherwise based on information (e.g., data, metadata, and/or signaling) obtained from one or more devices disposed within a controlled environment (e.g., a confined region of space) or in proximity thereof. Networked automation control services and/or assets can permit implementation of one or more control sequences associated with at least one of the devices. In one example, an automation control asset can have one or more modes associated therewith, where a mode can include a specific configuration of tasks and/or operations to be performed by device(s) and/or sensor(s) associated with a controlled environment (e.g., a dwelling, such as single-family unit or multi-dwelling unit; a factory or other industrial spaces; an office building or other commercial spaces; or the like). Automation control assets or modes thereof can be developed within a platform associated with a provider of services (e.g., voice, data, and the like) consumed within the controlled environment. In one example, a mode can be germane to an automation control asset or can be a hybrid between modes associated with two or more automation control assets. The modes can be developed autonomously, automatically, and/or manually. In one example, autonomously generated or otherwise updated modes can be produced automatically and/or based at least on learned behaviors associated with the controlled environment. In addition or in the alternative, a third-party can develop such assets and/or modes. A portal referred to as a marketplace can expose available automation control service(s) and/or asset(s), and can permit transactions between a consumer or prospective consumer and a platform that provides such service(s) and/or asset(s).

In at least certain aspects of intelligent automation control services, embodiments of the disclosure permit generation and/or recommendation of automation control services based on learned behaviors of agents associated with an environment to be controlled (e.g., a residence, a business office, a hotel, a factory, or the like). An agent can be a human or a non-human entity, such as a device, a sensor, a software application in execution (e.g., a web service), an information structure (e.g., user input) and an associated device, a combination thereof, or the like. Streams of data, metadata, and/or signaling can be received or otherwise accessed from an agent, and can be conditioned (e.g., aggregated, filtered, formatted, etc.) for analysis. Raw or conditioned information (e.g., data, metadata, and/or signaling) from one or more agents can be analyzed to determine or otherwise identify a behavior of an agent. The behavior can be characterized by (i) sequences of events, such as specific activity of an agent, extracted from the data, metadata, and/or signaling; (ii) patterns in the data, metadata, and/or signaling; and/or (iii) correlations between patterns. Based on the behavior, one or more control actions can be determined. The control action(s) can be grouped to form an automation control service, which can be recommended to an owner or lessee of the environment. In addition, the control action(s) can be grouped to form a specific mode of operation of the automation control service. The determined control action(s), as either an automation control service or a mode thereof, can be relied upon to direct operation of the agent(s) associated with the environment to be controlled.

In other aspects, embodiments of the disclosure permit customization of an automation control service based at least on learned interactivity of an agent (such as an end-user, a device or sensor) with the service. Streams of data, metadata, and/or signaling can be received or otherwise accessed from an agent, and can be conditioned (e.g., aggregated, filtered, formatted, etc.) for analysis. Raw or conditioned information (e.g., data, metadata, and/or signaling) from one or more agents can be analyzed to learn how an agent interacts with the automation control service. Learned interactivity can be characterized by correlation between events associated with an agent in a specific control state of a control sequence provided by the automation control service and/or a specific agent state not necessarily related to the control state. A control state can be a condition of a controlled environment (e.g., temperature of a room and/or light intensity from one or more light sources) arising from implementation of a control sequence based on the automation control service. An agent state can be a condition of an agent that arises from activity (e.g., sensing protocol of a sensor, physiological condition of a human agent due to exercise routing, etc.) within a controlled environment, or in response to a specific control state. In addition, learned interactivity can be characterized by structure (e.g., sequence, pattern, etc.) of one or more events associated with the agents at a control state and/or agent state. Based on the learned interactivity, (A) a specific automation control asset (e.g., a mode; an agent, such as a sensor, a device, a software application; or the like) can be recommended for addition to an existing automation control service; (B) operation of an agent (e.g., a sensor or a device) of the existing automation control service can be adjusted; and/or (C) an additional automation control service can be recommended to supplement or complement the existing automation control service. The additional automation control service and the existing automation control service can form a new automation control service.

In at least certain aspects of evolution or adaptation of intelligent automation control, embodiments of the disclosure permit dynamic adaptation of an automation control service in response to a current environment of an agent, thereby providing automation control that may be optimal or nearly optimal to current operation conditions of the agent. For instance, the automation control service can be adapted in response to events, such as activity (historical or contemporaneous) at certain times of the day; activity (historical or contemporaneous) at certain times of the week; and/or cumulative activity during a predetermined period, such as intense work week for a human, operation of a heating, ventilation, and air conditioning (HVAC) system during certain days with inclement weather, acquired proficiency (e.g., increased fitness) during certain periods, and the like. Streams of data, metadata, and/or signaling can be received or otherwise accessed from an agent, and can be conditioned (e.g., aggregated, filtered, formatted, etc.) for analysis. Raw or conditioned information (e.g., data, metadata, and/or signaling) from one or more agents can be analyzed to determine a current state of the agent for a current environment of the agent, and/or to learn behavior of the agent in such an environment. Such state, environment, and/or learned behavior can permit modifying the automation control service, thereby providing a service that is tailored (e.g., optimized or nearly optimized) to the current environment and/or situation of the agent within a controlled environment. As such, the automation control service can evolve and autonomously adapt to the agent. The current state of an agent and/or the environment thereof can be biased (or perturbed) in order to collect a response or feedback (e.g., desirability, popularity, operational efficiency of a device, or the like) from the agent, and thus, learn what control actions may be favorable to (e.g., preferred by) the agent and adapt the automation control service accordingly.

In at least certain aspects of development of automaton control services, a common control language and an information model (e.g., data model, metadata model, and/or signaling model) can permit composition of an automation control service without reliance on platform-specific details of an automation control asset (e.g., a hardware unit, such as a sensor or a device; a software unit, such as control logic). Accordingly, the automation control service can be developed as an abstract platform-agnostic service, and control messages specific to a control environment (e.g., a specific control environment, such as a specific sound system in customer premises) can be provided based on available information regarding the control environment. As such, the disclosed system and methods can obfuscate the complexity of the myriad of underlying technology systems and their settings. Existing automation control services and/or automation control assets (e.g., modes, sensors, devices, etc.) can be dynamically inventoried and exposed for development of additional automation control services. Similarly, automation control services and/or assets can be discovered for a specific environment to be controlled. For instance, sensors, devices, and/or other equipment can be discovered for a household in response to provisioning control services or in response to changes within the household (e.g., deployment of lighting system, changes in HVAC system, media system, etc.). Discovered automation control services and/or assets can be inventoried and exposed for development of new or updated automation control services and/or assets. Available automation control services and/or assets can be recommended to developers, and can be cross-referenced to facilitate further development.

Various features of the disclosure can provide example advantages over conventional automation technologies. For example, certain embodiments of the disclosure can permit maintaining a focus on the "automation job" or automation task intended or otherwise desired by an end-user. As such, devices within an automated environment and/or available to the end-user can permit achieving a desired automation control, rather than determining the type of control that can be implemented within the automated environment. For another example, certain embodiments of the disclosure can permit intelligent automation control that can be linked to behavior of the consumer and thus, automation control services and/or assets described herein can be straightforward and/or intuitive to set up, configure, and utilize. For yet another example, certain embodiments of the disclosure can permit providing intelligent automation control as a managed service, and can leverage numerous functionalities and capabilities of a networked environment (e.g., WAN(s), LAN(s), and/or other networks), such as security, reliability, etc. Accordingly, the automation control services and/or assets described herein can leverage cloud principles and/or functionality, and as such, complement devices and/or network with subscription to automation control services that can be delivered seamlessly to a controlled environment.

While various aspects of the disclosure are illustrated in connection with a home or a dwelling, it should be appreciated that the disclosure is not so restricted and embodiments of the disclosure can be applied to or otherwise leveraged in most any environment having a confined region of space, including indoors and/or outdoors areas. For example, such an environment can be embodied in or can include a multi-dwelling unit, a factory or other industrial space, a business office or other commercial space, portion of a city or other urban area, a combination of the foregoing, or the like.

Other features and/or advantages of the disclosure will be set forth in part in the description which follows, and in part will be apparent from the description, or may be learned by practice of the disclosure. Certain features and/or advantages of the disclosure may be realized and attained by means of the elements and combinations particularly pointed out in the appended claims. It is to be understood that both the foregoing general description and the following detailed description are exemplary and explanatory only and are not restrictive of the present disclosure.

BRIEF DESCRIPTION OF THE DRAWINGS

The accompanying drawings are an integral part of the disclosure and are incorporated into the subject specification, and illustrate example embodiments of the disclosure. The drawings, in conjunction with the summary, description, and claims serve to explain various principles, features, and/or aspects of the disclosure.

FIGS. 5A, 5B, 5C, 5D, and 5E illustrate example automation assets in accordance with one or more embodiments of the disclosure.

FIG. 17A represents a first portion of the data model and FIG. 17B represents a second portion of the data model.

DETAILED DESCRIPTION

Figure 1A:
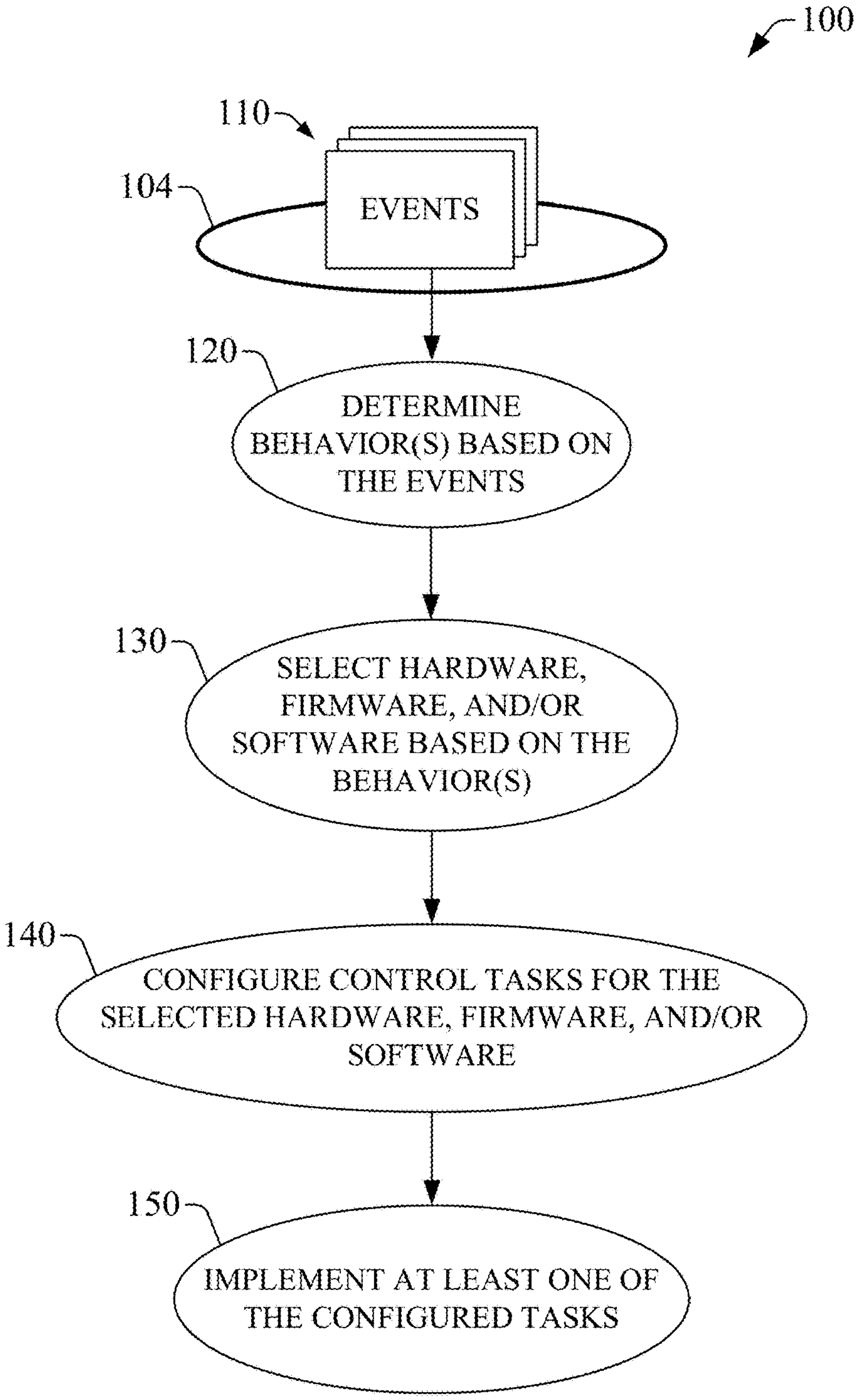
FIG. 1A illustrates customer-centric intelligent automation control in accordance with one or more embodiments of the disclosure.

As utilized in the present disclosure, the term "solution" or "service" can refer to a group of one or more of an infrastructure functional element (e.g., a router, a hardware server, a computing device, a reference link, or the like), a software application, a firmware application, or a service (such as a business service or an infrastructure service). The terms "cloud solution" refer to a solution that is deployed in the cloud or a wide area network (e.g., a backbone network, a regional network, etc.). The cloud or the wide area network can comprise wireline functional elements and/or wireless functional elements (such as functional elements contained in a terrestrial wireless network or a satellite-based wireless network).

As employed in this specification, annexed drawings, and/or claims the terms "unit," "component," "engine," "system," "platform," "environment," "interface," "repository," "portal," and the like are intended to include a computer-related entity or an entity related to an operational apparatus with one or more functionalities afforded by one or more computational resources, such as processor(s), one or more memories, network connector(s), combinations thereof, and the like. The computer-related entity or the entity related to the operational apparatus can be either hardware, a combination of hardware and software, software, or software in execution. One or more of such entities also may be referred to as "functional elements." As an example, a unit may be, but is not limited to being, a process running on a processor, a processor, an object, an executable computer program, a thread of execution, a program, a memory (e.g., a hard disc drive), and/or a computer. As another example, a unit can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a unit can be an apparatus that provides specific functionality through electronic functional elements without mechanical parts, the electronic functional elements can include a processor therein to execute software or firmware that provides at least in part the functionality of the electronic functional elements. An illustration of such apparatus can be control circuitry, such as a programmable logic controller. The foregoing examples and related illustrations are but a few examples and are not intended to limiting or otherwise restrictive. Moreover, while such illustrations are presented for a unit, the foregoing examples also apply to a component, a system, a platform, an interface and the like. It is noted that in certain embodiments, or in connection with certain aspects or features thereof, the terms "unit," "component," "engine," "system," "platform," "environment," "interface," "repository," and "portal" can be utilized interchangeably.

Throughout the present specification and drawings of the disclosure, the words "comprise," "include," and "have" and variations of such words, such as "comprising" and "comprises," "including" and "includes," "having" and "has," mean "including but not limited to," and are not intended to exclude, for example, other systems, subsystems, components, action, steps, or the like. When utilized, the term "exemplary" refers to "an example of" and is not intended to convey an indication of a preferred or ideal embodiment, entity, feature, or the like. "Such as" is not utilized in the present disclosure in a restrictive sense, but rather it is put forward for explanatory purposes.

Disclosed are functional elements, such as components, units, engines, interfaces, platforms, repositories, etc., that can be utilized to perform the disclosed methods and systems. These and other functional elements are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The methods, systems, solutions, and the like, of the disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Functionality of the embodiments is described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1B:
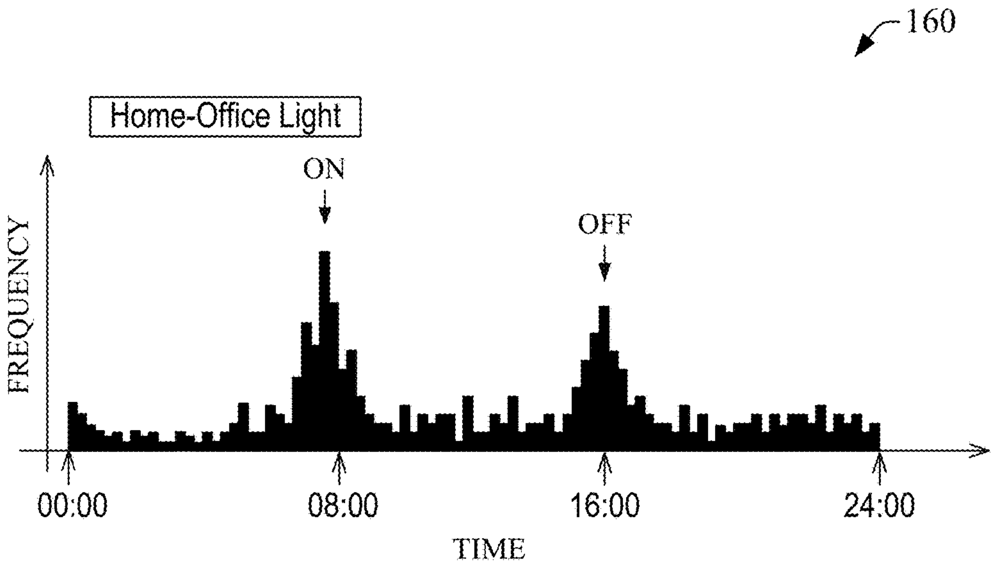
FIG. 1B illustrates an example of historical event information associated with customer-centric intelligent automation control in accordance with one or more embodiments of the disclosure.

FIG. 1 illustrates consumer-centric intelligent automation control in accordance with one or more embodiments of the disclosure. As described herein, such automation control can be implemented with respect to an environment, such as a dwelling, a factory or another type of industrial space, an office or commercial space, a portion of a city or other urban area; or the like). Multiple events 110 associated with operation of devices, sensors, and/or other equipment can occur within the environment and/or in the vicinity thereof. For example, the multiple events 110 can include events associated with turning on and/or off devices, executing software, actuating sensors, or the like. In one aspect, the multiple events 110 can be monitored or otherwise detected. In certain scenarios, the environment can be referred to as a controlled region 104. In other scenarios, the environment and at least a portion of the vicinity thereof can be referred to as the controlled region 104. For instance, in one such scenario, music or other sound can be controlled within a home and an adjacent or nearby outdoor space. As illustrated in block 120, one or more behaviors associated with the controlled environment can be determined based at least on the events. In one example, the one or more behaviors can include one or more patterns of events that occur as a function of time. The one or more behaviors can represent specific characteristics of the operation of devices, sensors, and/or services associated with the controlled environment and, as such, can permit identifying certain devices, sensors, and or services that are specific to a behavior within the environment. As such, as shown at block 130, hardware, firmware, and/or software can be selected or otherwise identified based on the one or more behaviors. The operation of the selected hardware, firmware, and/or software can be controlled in order for such operation to be consistent with a determined behavior. Therefore, as shown at block 140, one or more controls tasks (more generally referred to as "tasks") can be configured for the selected hardware, firmware, and/or software. Upon or after configuration, at least one of the configured tasks can be implemented. Implementation of the task(s) can be controlled by one or more computing platforms (e.g., an orchestration platform) (as shown at block 150). In addition, configuration of the tasks can be dynamic and/or responsive to conditions of one or more devices, sensors, and/or services within the controlled environment.

Figure 2:
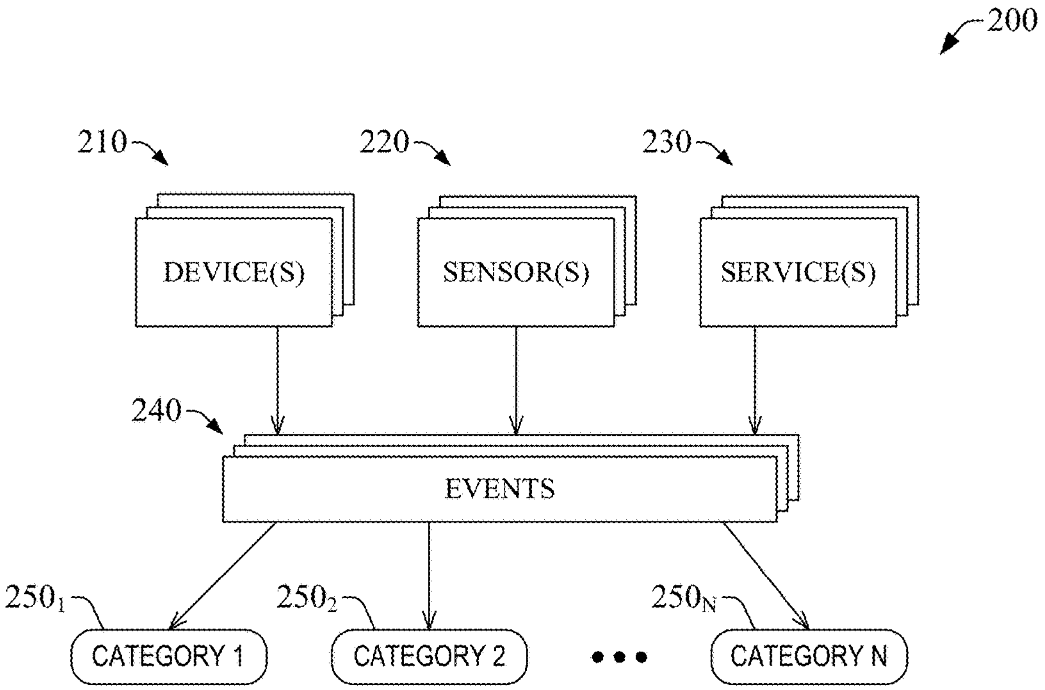
FIG. 2 illustrates intelligence associated with customer-centric intelligent automation control in accordance with one or more embodiments of the disclosure.

In one aspect, as illustrated in FIG. 2, the events 240 that can be utilized to determine a behavior associated with a controlled environment can be categorized according to the functionality of the device(s) 210, sensor(s) 220, and or service(s) 230 associated with an event. Such a categorization can permit the configuration of tasks specific to a category of functionality. Therefore, specific combinations of device(s), sensor(s), and/or service(s) can be associated with a specific configuration of tasks that permit operation of the controlled environment in accordance with an identified behavior.

Figure 3:
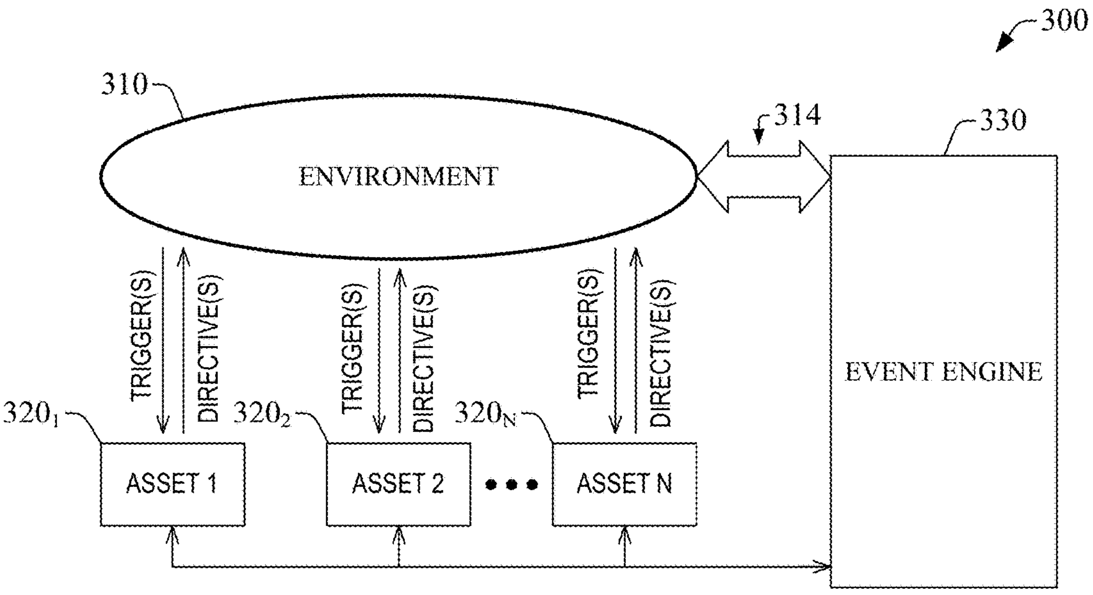
FIG. 3 illustrates an example operational environment for customer-centric intelligent automation control in accordance with one or more embodiments of the disclosure.

In certain implementations, a configuration of tasks can be referred to as an automation control mode. In addition, such a mode can be associated with the selected hardware, firmware, and/or software to form an automation control asset. In one aspect, such association can be a logic association and can be retained in a remote computing platform. Such a remote computing platform can utilize or otherwise leverage a group of automation control assets to control the operation of an environment in accordance with one or more behaviors present in the environment. For example, FIG. 3 illustrates an environment 310, which can include devices, sensors, and/or other equipment, that can be controlled by a group of assets $\mathbf{320}_1$-$\mathbf{320}_N$. The remote computing that can control the environment 310 can include an event engine 330 that can receive and process information (e.g., data, metadata, and/or signaling) from the environment 310 and can direct at least a portion of the devices, sensors, and/or equipment present in the environment 310 to operate according to one or more of the assets $\mathbf{320}_1$-$\mathbf{320}_N$. To at least such an end, each of the assets can be configured to supply directives to the environment 310, where the directives can be specific to a configuration of tasks associated with the assets or can be response to the signaling (referred to as trigger(s)) received and/or processed by the event engine 330. As illustrated the event engine 330 can exchange information with one or more devices and/or sensors within the environment 310 via a communication environment 314, which can include network(s) (wireless or otherwise), reference links, wireless links, wireline links, combinations thereof, or the like.

Figure 4:
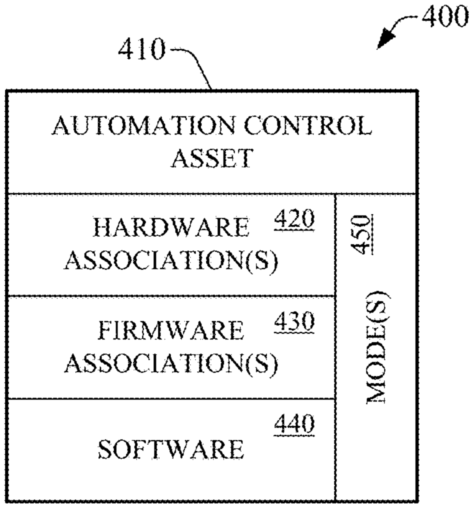
FIG. 4 illustrates an example representation of an automation control asset in accordance with one or more embodiments of the disclosure.

As illustrated in FIG. 4, an automation control asset 410 may be represented or otherwise characterized by one or more hardware associations 420 that can link respective one or more devices and/or sensors to the automation control asset 410; one or more firmware associations 430 that can link the respective firmware to the automation control asset 410; and/or software 440, which can represent or otherwise indicate at least specific automation sequence or logic that pertains to the automation control asset 410. In one example, a specific configuration of the hardware association(s) 420, the firmware association(s) 430, and the software 440 can embody or can constitute a mode of the automation control asset 410. As illustrated, an automation control asset, (e.g., asset 410), can include one or more modes, (e.g., mode(s) 450).

FIGS. 5A, 5B, 5C, 5D, and 5E illustrate example automation controls assets in accordance with one or more aspects of the disclosure. The illustrated assets include "Aide," "Trainer," "Guardian," "Deejay" (DJ), and "Assistant." It should be appreciated that these automation control assets are merely illustrative and other automation control assets are contemplated within the disclosure. As described herein, an automation control asset (e.g., "Guardian") can operate in accordance with one or more modes. For example, the Guardian automation control asset can have a mode, which can be referred to as "bedtime mode" which causes specific operation of devices and/or sensors within a controlled region 710. As described herein, the controlled region can include a confined environment and/or a nearby area. For example, in "bedtime mode," the Guardian asset can lower the downstairs lights, arms the security system and disables Wi-Fi to all of the teenagers' devices. As described herein, in one example, the automation orchestration platform 730, or a component therein or functionally coupled thereto, can direct such devices and or sensors to operate according to the "bedtime mode." As such, the automation orchestration device 730, or a component therein or functionally coupled thereto, can direct or otherwise communicate instructions to the devices and/or sensors via the gateway device 712.

In one embodiment, different Guardian modes, for example, can handle security services for a wide range of scenarios, which are addressed by such modes: Home Alone: Enhanced security for instances in which children are home alone without a parent or another person responsible for their wellbeing (e.g., baby sitter). Doorman: Relaxed front door security for expected guests or delivery personnel. Vacation: Comprehensive security with regular push notification updates when away from the home for an extended period. Around the House: Relaxed security for when the family is leisurely staying at home during the day. Outback: Relaxed backdoor security and increased front door security for when out back cooking outdoors (e.g., barbequing) or working in the yard. It should be appreciated that these automation control assets are merely illustrative and other automation control assets are contemplated within the disclosure.

As described herein, while individual automation control services can be powerful or otherwise useful on their own, the disclosure permits numerous ways that such services can work collectively or otherwise in cooperation via hybrid modes: Party: DJ telling Guardian that there will be a party and to keep the back door unlocked for guests. Jog: Guardian providing Trainer with a one-time password for the front door so you don't need to bring keys with you on your run. Health Monitor: Trainer informing Aide of an abnormal heart rate during the last leg of your run. Appointment: Aide requesting Assistant to schedule a doctor's appointment for tomorrow afternoon. Quiet Call: Assistant asking DJ to lower the music in the room you're in when the phone rings.

Figure 6:
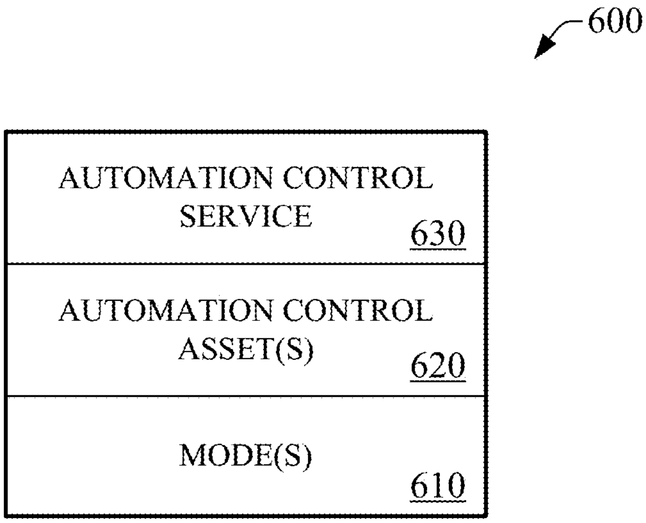
FIG. 6 illustrates another example representation of an automation control service in accordance with one or more embodiments of the disclosure.

Similarly, as illustrated in FIG. 6, a logical stack of automation control asset(s) and mode(s) can represent an automation control service in accordance with the present disclosure. In certain embodiments, the logical stack can be embodied in or can include a specific configuration of control tasks and/or protocols that can permit implementation of such tasks. The example logical stack 600 can include a stack layer 610 containing one or more modes. The one or more modes can be associated with one or more automation control assets, which can be contained in a stack layer 620. In addition, the example logical stack can include a stack layer 630 containing the automation control service. As described herein, an automation control asset and an automation control service can be embodied in a cloud solution—either supplied by a provider of services (e.g., voice, data, and/or media) to an environment that is controlled, or by a third-party, such as a commercial partner of the provider. The provider of services can include a multiple system operator (MSO) or any other type of service provider.

Figure 7:
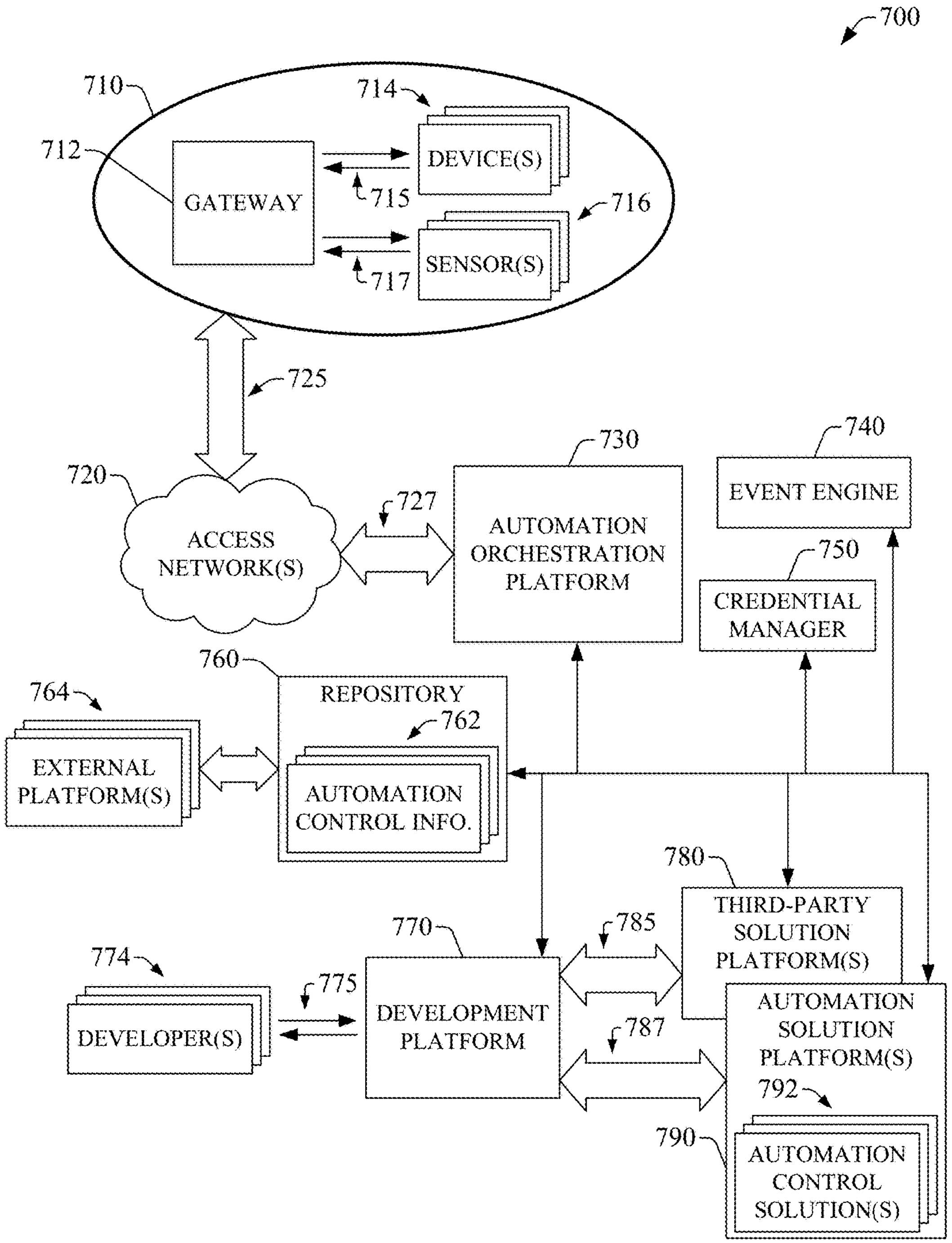
FIG. 7 illustrates an example operational environment for customer-centric intelligent automation control in accordance with one or more embodiments of the disclosure.

FIG. 7 illustrates an example operational environment 700 for customer-centric intelligent control in accordance with one or more aspects of the disclosure. The example operational environment 700 includes an environment 710, such as dwelling, a business office (e.g., a small or medium organization's office) or other commercial space, a factory or other industrial space, or the like. The environment 710 can be controlled in accordance with at least some aspects described herein. A group of devices 714 (e.g., one or more devices) and/or a group of sensors 716 can be deployed or otherwise installed within the environment 710 or in proximity thereto, or in any spatial arrangement including locations within the environment 710 and/or in proximity thereto. At least one of the device(s) 714 and/or at least one of the sensor(s) 716 can be functionally coupled (e.g., communicatively and/or electrically coupled) to customer premises equipment 712, which referred to as a gateway device 712. As such, one or more of the device(s) 714 can be functionally coupled to the gateway device 712 via link(s) 715, which can include upstream link(s) and/or downstream link(s). Each of such link(s) can be or can include a wireless link or a wireline link. Similarly, one or more of the sensor(s) 716 can be functionally coupled to the gateway device 712 via link(s) 717, which can include upstream link(s) and/or downstream link(s). Each of such link(s) can be or can include a wireless link or a wireline link.

The gateway device 712 (which also may be referred to as gateway 712) can receive and/or transmit information from and/or to one or more of (i) at least one of the device(s) 714 or at least one of the sensor(s) 716. As illustrated, the gateway 712 can be functionally coupled to an automation orchestration platform 730 via one or more access networks 720 (e.g., wireless network(s), wireline network(s), or a combination thereof) and data and signaling pipes 725 and 727. As illustrated, the gateway 712 can be functionally coupled to at least one of the network(s) 720 or a component thereof via the data and signaling pipe(s) 725, and the automation orchestration platform 730 can be functionally coupled to at least the same or another network of the access network(s) 720 or a component thereof via the data and signaling pipe(s) 727. One or more network elements within the access network(s) 720 can permit communication (e.g., routing) of information between the network(s) that can be functionally coupled to the gateway 712 and the automation orchestration platform 730. Therefore, information (e.g., data, metadata, and/or signaling) can be received, transmitted, or exchanged between the automation orchestration platform 730 and the gateway 712.

Figure 10:
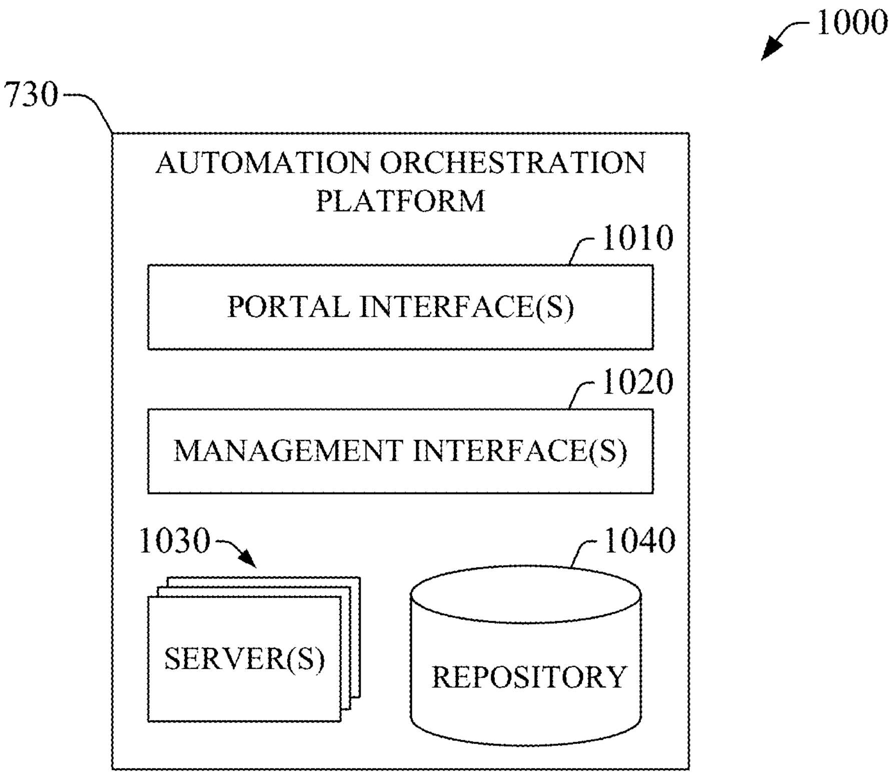
FIGS. 10-11 illustrate examples of an automation orchestration platform in accordance with one or more embodiments of the disclosure.
Figure 11:
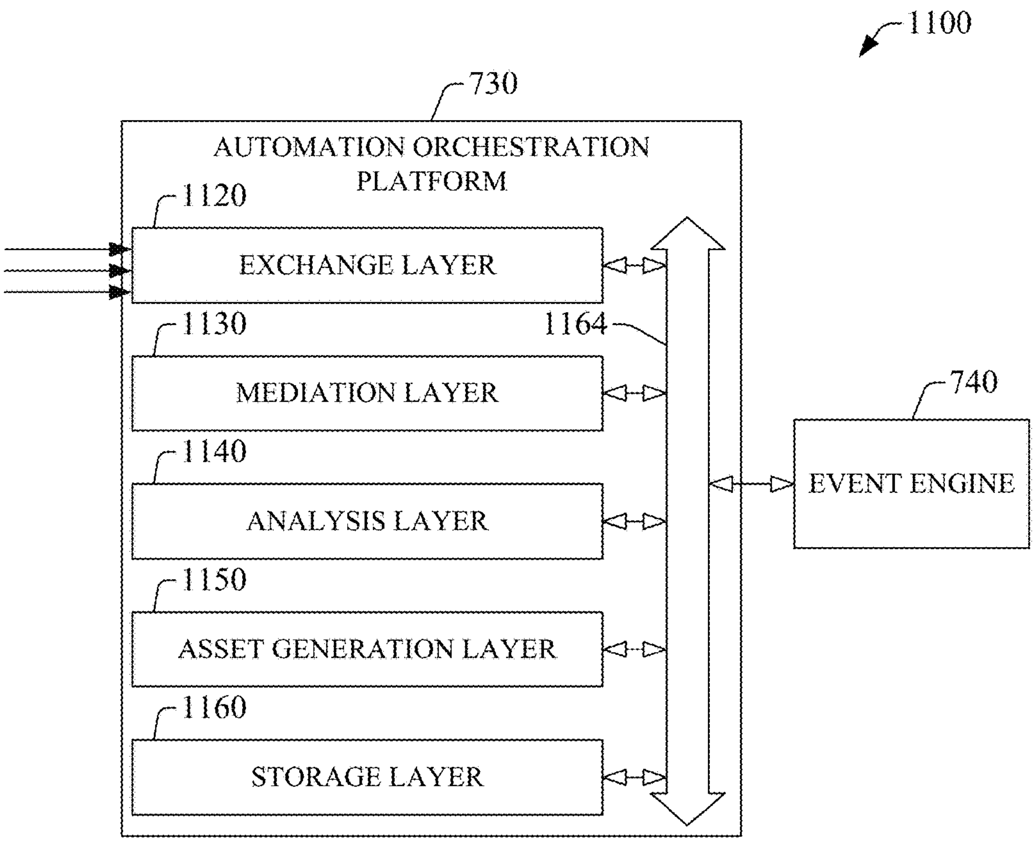

In one aspect, the gateway 712 can obtain or otherwise receive information from one or more of at least one of the device(s) 714 or at least one of the sensor(s) 716, and can communicate at least a portion of such information to the automation orchestration platform 730 in accordance with aspects described herein. Various embodiments of the automation orchestration platform are illustrated in FIGS. 10-11.

The automation orchestration platform 730 can receive such information and can determine behaviors of an agent associated with the environment 710. The agent can be a dweller of the confined region, whether it is a long term dweller (e.g., an owner or tenant) or short term dweller, such as a visitor to the confined region or an employee of an organization conducting business within the environment 710. To at least such an end, the orchestration platform 730 can determine intelligence indicative of a behavior of the agent based at least in part on the received information. In one example, the automation orchestration platform 730 can generate a model of the behavior of the agent based at least on unsupervised learning. In certain implementations, the model can be embodied in or can include one or more of a statistical Markov model, a neural network model, or a Gaussian mixture model. In addition or in other implementations, the model of the behavior of the agent can be embodied in or can include one or more of statistical Bayes model and/or a model constructed from regression analysis. In another example, the automation orchestration platform 730 can determine a pattern of actions of the agent and associate such a pattern to the behavior of the agent. The pattern can include, for example, one or more of (i) a pattern of sequences of events, (ii) a time-domain pattern in the at least one of the one or more information streams, or (iii) a space-domain pattern in the at least one of the one or more information streams. In certain implementations, provided a set of several patterns, the automation orchestration platform 730 can determine correlations between patterns in such a set. As described herein, such actions can be represented or otherwise indicated by the received information, which can convey agent's activities initiated within the environment 710 or some other environment, or otherwise observed (e.g., measured) within the environment 710 or some other environment. In certain embodiments, one or more units (e.g., a machine learning unit) integrated into or functionally coupled to the automation orchestration platform 730 can determine at least a portion of the intelligence indicative of the behavior of the agent. In certain embodiments, regression analysis and/or Bayesian models may be used or otherwise leveraged to determine the probability of a group of activities being related and, therefore, postulate an associated mode and/or related automation control asset. It should be appreciated that this disclosure is not limited with respect to regression and Bayesian models, and various other types of predictive and causal models can be used or otherwise leveraged to determine intelligence associated with the behavior of an agent.

The automation orchestration platform 730, or a component therein or functionally coupled thereto, can supply an automation control asset based at least on the intelligence associated with (e.g., indicative or otherwise representative of) the behavior of the agent described herein. In one example, the automation control asset is configured to provide automation control of at least one of the group of the devices 714. To at least such an end, in one example, the automation orchestration platform 730 can provide a recommendation to create a new automation control asset and/or a new mode thereof in a system that combines and/or creates new activities or control actions based on the determined behavior. For instance, an event engine 740 can update (e.g., combine) or generate an activity or action associated with the automation control asset. Such activity or action can be part of an automated sequence related or otherwise associated with one or more of at least one of the device(s) 714 or at least one of the sensor(s) 716. In certain example embodiments, in order to supply an automation control asset, the automation orchestration platform 730 can determine a configuration of tasks (e.g., a mode) for at least one of the device(s) 714 and/or at least one of the sensor(s) 716. In other example embodiments, in order to supply an automation control asset, the automation orchestration platform 730 can generate a new configuration of tasks for the at least one of the device(s) 714, or can update an extant configuration of tasks for the at least one of the device(s) 714. In yet other example embodiments, in order to supply an automation control asset, the automation orchestration platform 730 can determine a first configuration of tasks (e.g., a first mode) for at least one of the device(s) and/or sensor(s) based on a second configuration of tasks (e.g., a second mode) associated with a second automation control asset.

In certain embodiments, a specific mode of an automation control asset can be configured or otherwise arranged via a user interactivity interface implemented at (e.g., executed by) any device that is associated with an agent related to the environment 710. In one example, the user interactivity device can permit customizing a mode of an automation control asset to specific needs desired of the agent. Preference settings that configure or otherwise define a mode can permit specific control of an environment 710 in which a group of devices and/or a group of sensors associated with the automation control asset operate. It should be appreciated that the user interactivity interface be implemented within substantially any functional element or computing device within the operational environment 700 or other operational environments of the disclosure. In one example, the user interactivity interface can be accessible from any connected device (e.g., a device that can consume a service via the gateway 712) and can permit consumers to interact with the gateway device 712, to manage their home network, manage data across devices (e.g., at least one of the device(s) 714), interact with automation control services and/or automation control assets and related mode(s); and access one or more portals (e.g., a marketplace) within the example operational environment 700 or other operational environments disclosed herein. In certain embodiments, the user interactivity interface can be implemented in response to execution of a virtual control module deployed within a network in a distributed configuration or within a device in a localized configuration.

As described herein, based on a specific automation control service and/or an automation control asset, the automation orchestration platform 730, or a component therein or functionally coupled thereto, can direct at least one device of the group of devices 714 and/or sensor(s) 716 to operate according to a specific mode of the automation control asset and/or the automation control service. Such operation of a device of the device(s) 714 and/or a sensor of the sensor(s) 716 also can be leveraged to generate additional intelligence associated with the behavior of an agent in accordance with aspects described herein. For instance, correlations between agents can be leveraged or otherwise utilized to generate at least a portion of such intelligence. As such, in one example, the intelligence associated with the behavior of an agent can be indicative or otherwise representative of a correlation between events associated with at least one other agent, where the at least one other agent can be in at least one of (i) a specific control state of a control sequence based on the automation control service or (ii) a specific agent state.

In addition or in the alternative, the disclosure can provide or otherwise permit interactions between automation control services and/or automation control assets associated therewith. Such interactions provide a rich gamut of tasks and/or operations than can render customer-centric the automation of an environment. Such tasks and/or operations can be dynamically adjusted based on intelligence refinement or otherwise development of an extant service based at least on (1) information collected in response to implementation of an automation control service, and/or (2) collection, identification, and/or analysis of information indicative or otherwise representative of events that may occur at a device within or in proximity to a controlled environment; during execution of an application in a computing device; during implementation of a control sequence; and/or due to activity of an agent (human or otherwise) within or in proximity of a controlled environment (e.g., environment 710).

Figure 8A:
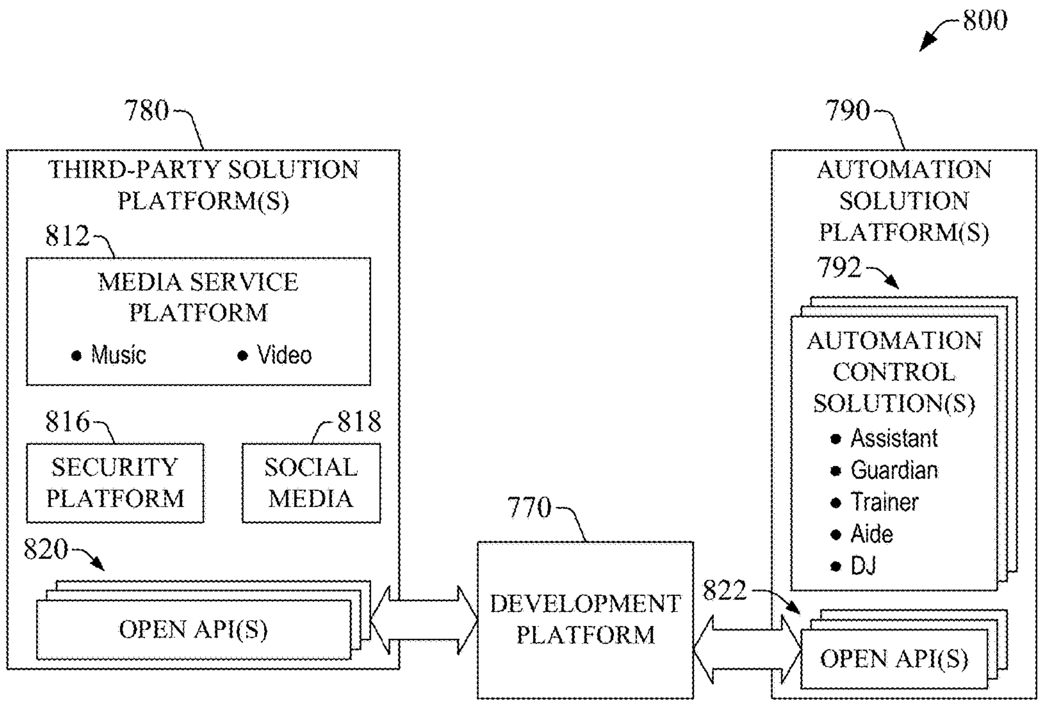
FIG. 8A illustrate another example operational environment for customer-centric intelligent control in accordance with one or more embodiments of the disclosure.

As described herein, the gateway device 712 can exchange information (data, metadata, and/or signaling) with the automation orchestration platform and/or other platform(s) integrated therein or associated therewith. In one aspect, the gateway device 712 can recognize at least one of the device(s) 714 and/or at least one of the sensor(s) 716, and can leverage connectivity standards (e.g., radio communication protocols and/or other communication protocols, packetized or otherwise) in order to provide managed automation control services and/or assets available via one or more network platforms, such as an automation solution platform(s) 790, which can include one or more automation control solution(s) 792, and/or a third-party solution platform(s) 780. FIG. 8A illustrates an example of an operation environment 800 including the third-party solution platform(s) 780 and the automation solution platform(s) 790. As described herein, the automation control solution(s) 792 can include a group of automation control assets, such as those described herein in connection herein with FIGS. 5A-5E, each of which being configured or otherwise operable to provide customer-centric intelligent control in accordance with one or more aspects of this disclosure. In addition, in certain embodiments, the third-party solution platform(s) 780 can provide various services that can supplement or complement an automation control asset. As illustrated, the third-party solution platform(s) 780 can include a media service platform 812 (as shown in FIG. 8A) that can provide music, images, videos, combinations thereof, or any type of media consumable in user equipment or CPE. Such media can include customer-specific and/or asset-specific content that can be provided to the environment 710 in response to implementation of an automation control asset. The media service platform 812 can include an over-the-top (OTT) media platform and/or other types of media platforms. In addition, the third-party solution platform(s) 780 can include a security platform 816 that can provide security service(s) to a device or other type of equipment within the environment 710. Further, the third-party solution platform(s) 780 can include a social media platform 818 that can provide information feeds (e.g., blog feeds, microblog feeds, news aggregation services, posts on social media outlets, etc.) to a device or other type of equipment within the environment 710. Further, a group of open API(s) 820 can permit accessing functionality associated with an automation control asset via the development platform 770. More specifically, in certain implementations, the open API(s) 820 can permit developing such an automation control asset, including configuring asset modules, creating relationships to hardware, and/or creating associations to firmware.

As illustrated, the exemplified operational environment 800 also includes the automation solution platform(s) 790, which can be administered or otherwise provided by the entity (e.g., a service provider or MSO) that provides the automation orchestration platform 730. In addition to including the automation control solution(s) 792, the automation solution platform(s) 790 also includes a group of open API(s) 822. At least one of the group of open API(s) 820 can permit accessing functionality for an automation control asset, including configuring asset modules, creating relationships to hardware, and/or creating associations to firmware.

Figure 12:
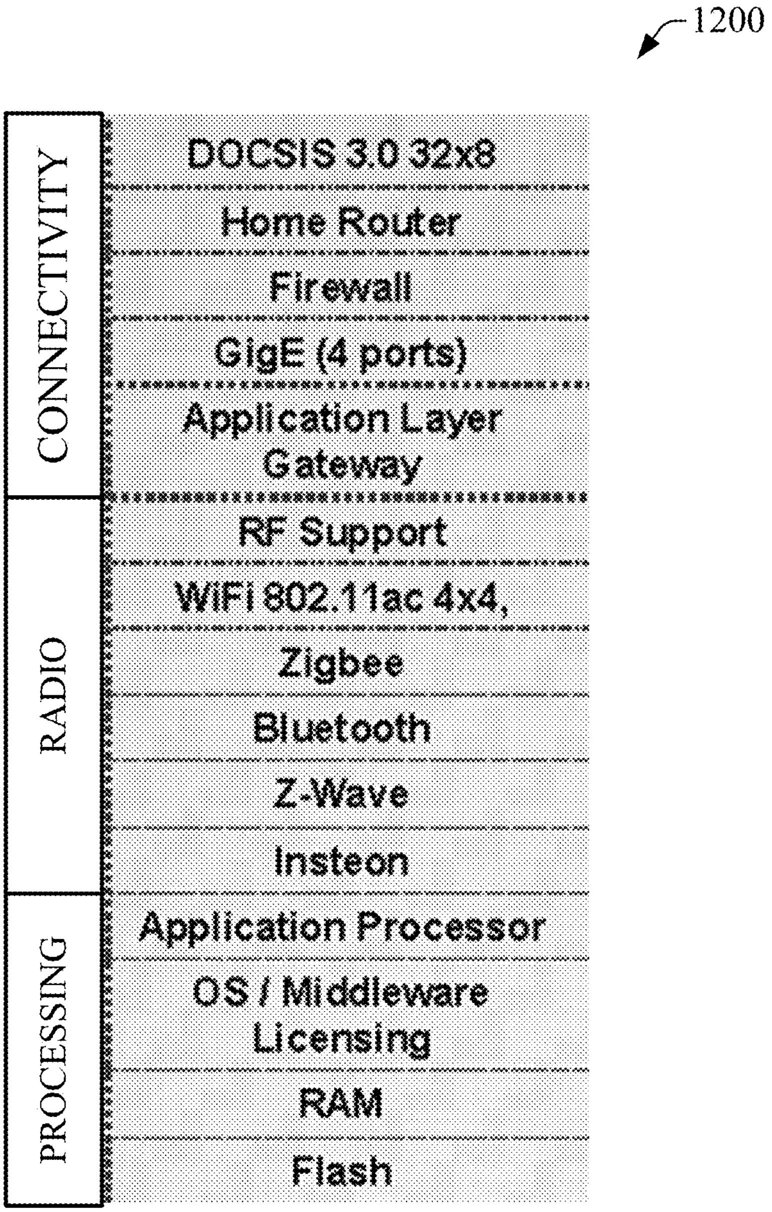
FIGS. 12-13 illustrate an example computing device associated with customer-centric intelligent control in accordance with one or more embodiments of the disclosure. The example computing device can embody or can constitute a gateway device in accordance with embodiments of the disclosure.
Figure 13:
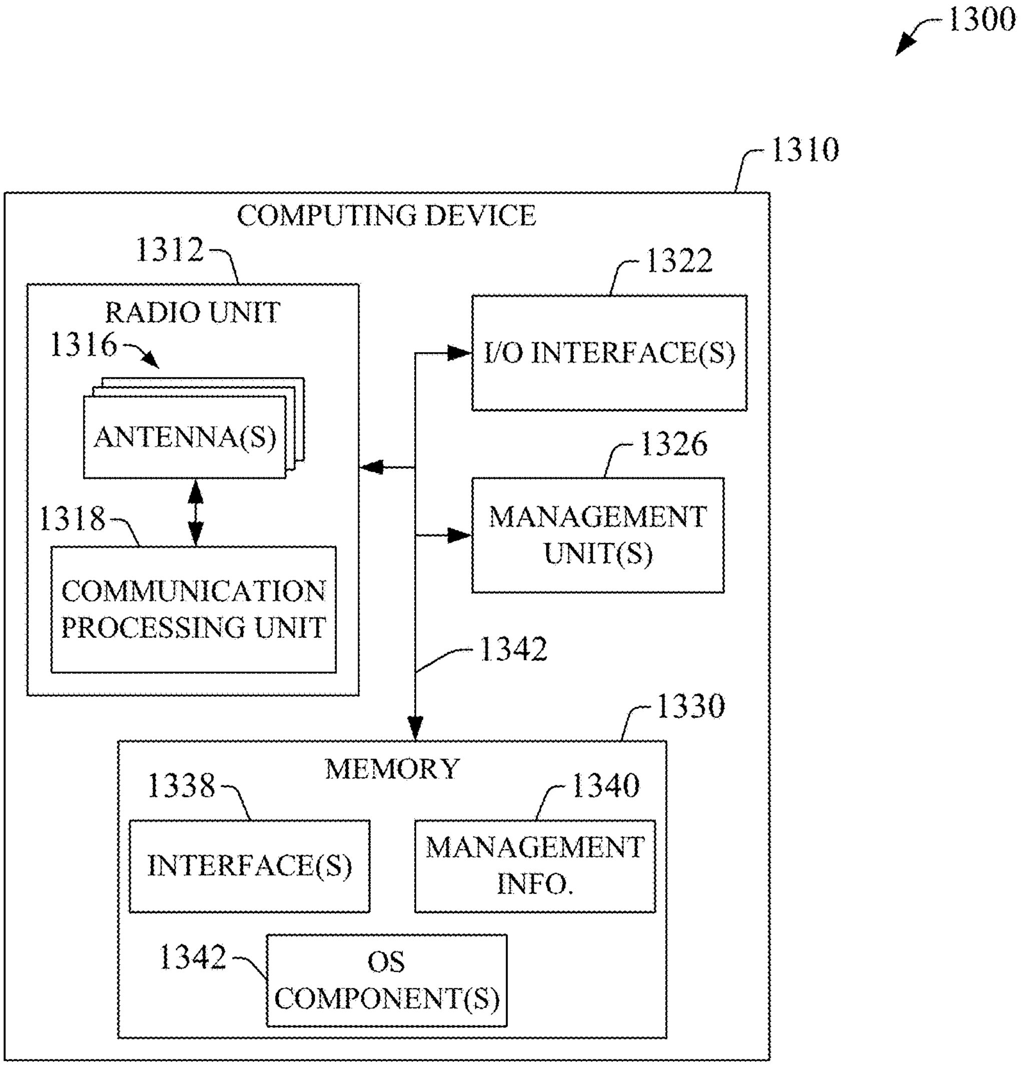
Figure 14:
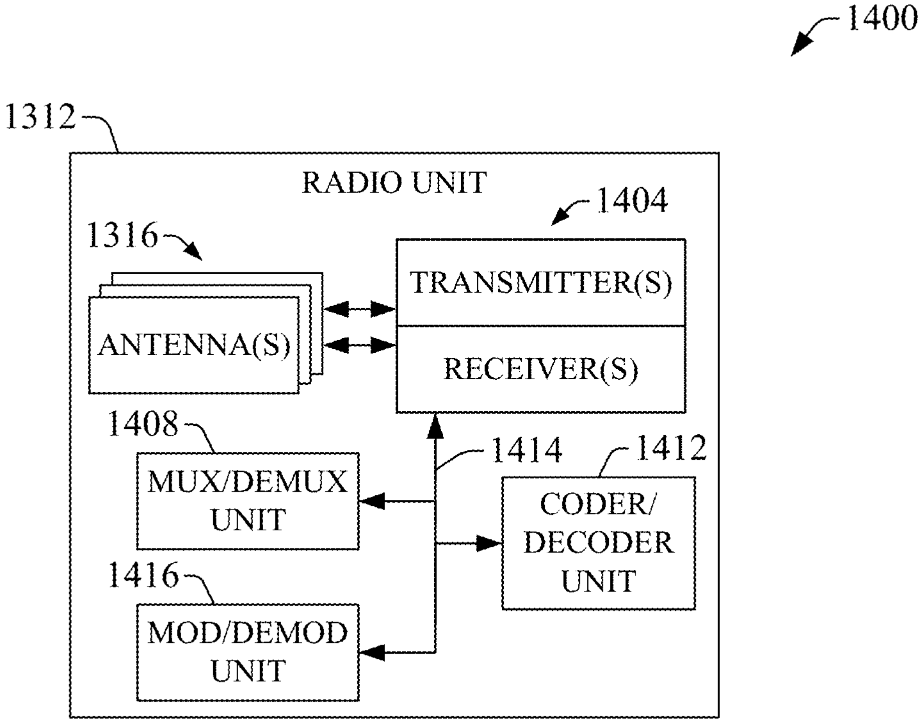
FIG. 14 illustrates an example radio unit in accordance with one or more embodiments of the disclosure.

FIGS. 12-13 illustrate example embodiments of computing devices that can embody or can constitute the gateway device 712 in accordance with aspects of the disclosure. As illustrated, the computing device 1310 can include a radio unit 1312 that can permit wireless communication between the computing device 1310 and other device(s) of the device(s) 714 and/or sensor(s) 716. FIG. 14 illustrates an example embodiment 1400 of the radio unit 1312 in accordance with one or more aspects of the disclosure. As illustrated, the radio unit 1312 can include one or more antennas 1316 and a multi-mode communication processing unit 1318. In certain embodiments, the antenna(s) 1316 can be embodied in or can include directional or omnidirectional antennas, including, for example, dipole antennas, monopole antennas, patch antennas, loop antennas, microstrip antennas or other types of antennas suitable for transmission of RF signals. In addition, or in other embodiments, at least some of the antenna(s) 1316 can be physically separated to leverage spatial diversity and related different channel characteristics associated with such diversity. In addition or in other embodiments, the multi-mode communication processing unit 1318 that can process at least wireless signals in accordance with one or more radio technology protocols and/or modes (such as MIMO, single-input-multiple-output (SIMO), multiple-input-single-output (MISO), and the like. Each of such protocol(s) can be configured to communicate (e.g., transmit, receive, or exchange) data, metadata, and/or signaling over a specific air interface. The one or more radio technology protocols can include 3GPP UMTS; LTE; LTE-A; Wi-Fi protocols, such as those of the Institute of Electrical and Electronics Engineers (IEEE) 802.11 family of standards; Worldwide Interoperability for Microwave Access (WiMAX); radio technologies and related protocols for ad hoc networks, such as Bluetooth or ZigBee; other protocols for packetized wireless communication; or the like). The multi-mode communication processing unit 1318 also can process non-wireless signals (analogic, digital, a combination thereof, or the like).

In one embodiment, (e.g., example embodiment 1400 shown in FIG. 14), the multi-mode communication processing unit 1318 can comprise a set of one or more transmitters/receivers 1404, and components therein (amplifiers, filters, analog-to-digital (A/D) converters, etc.), functionally coupled to a multiplexer/demultiplexer (mux/demux) unit 1408, a modulator/demodulator (mod/demod) unit 1416 (also referred to as modem 1416), and a coder/decoder unit 1412 (also referred to as codec 1412). Each of the transmitter(s)/receiver(s) can form respective transceiver(s) that can transmit and receive wireless signals (e.g., electromagnetic radiation) via the one or more antennas 1316. It should be appreciated that in other embodiments, the communication processing unit 1318 can include other functional elements, such as one or more sensors, a sensor hub, an offload engine or unit, a combination thereof, or the like. In one aspect, such a unit can be configured by programmed instructions retained in the memory 1330 and/or other memory devices integrated into or functionally coupled to the unit.

Electronic components and associated circuitry, such as mux/demux unit 1408, codec 1412, and modem 1416 can permit or facilitate processing and manipulation, (e.g., coding/decoding, deciphering, and/or modulation/demodulation), of signal(s) received by the computing device 1310 and signal(s) to be transmitted by the computing device 1310. In one aspect, as described herein, received and transmitted wireless signals can be modulated and/or coded, or otherwise processed, in accordance with one or more radio technology protocols. Such radio technology protocol(s) can include 3GPP UMTS; 3GPP LTE; LTE-A; Wi-Fi protocols, such as IEEE 802.11 family of standards (IEEE 802.ac, IEEE 802.ax, and the like); WiMAX; radio technologies and related protocols for ad hoc networks, such as Bluetooth or ZigBee; other protocols for packetized wireless communication; or the like.

The electronic components in the described communication unit, including the one or more transmitters/receivers 1404, can exchange information (e.g., data, metadata, code instructions, signaling and related payload data, combinations thereof, or the like) through a bus 1414, which can embody or can comprise at least one of a system bus, an address bus, a data bus, a message bus, a reference link or interface, a combination thereof, or the like. Each of the one or more receivers/transmitters 1404 can convert signal from analog to digital and vice versa. In addition or in the alternative, the receiver(s)/transmitter(s) 1404 can divide a single data stream into multiple parallel data streams, or perform the reciprocal operation. Such operations may be conducted as part of various multiplexing schemes. As illustrated, the mux/demux unit 1408 is functionally coupled to the one or more receivers/transmitters 1404 and can permit processing of signals in time and frequency domain. In one aspect, the mux/demux unit 1408 can multiplex and demultiplex information (e.g., data, metadata, and/or signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition or in the alternative, in another aspect, the mux/demux unit 1408 can scramble and spread information (e.g., codes) according to most any code, such as Hadamard-Walsh codes, Baker codes, Kasami codes, polyphase codes, and the like. The modem 1416 can modulate and demodulate information (e.g., data, metadata, signaling, or a combination thereof) according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like). In addition, processor(s) that can be included in the computing device 1310 (e.g., processor(s) included in the radio unit 1312 or other functional element(s) of the computing device 1310) can permit processing data (e.g., symbols, bits, or chips) for multiplexing/demultiplexing, modulation/demodulation (such as implementing direct and inverse fast Fourier transforms) selection of modulation rates, selection of data packet formats, inter-packet times, and the like.

The codec 1412 can operate on information (e.g., data, metadata, signaling, or a combination thereof) in accordance with one or more coding/decoding schemes suitable for communication, at least in part, through the one or more transceivers formed from respective transmitter(s)/receiver(s) 1404. In one aspect, such coding/decoding schemes, or related procedure(s), can be retained as a group of one or more computer-accessible instructions (computer-readable instructions, computer-executable instructions, or a combination thereof) in one or more memory devices 1330

(referred to as memory 1330). In a scenario in which wireless communication among the computing device 1310 and another computing device (e.g., a station or other types of user equipment) utilizes MIMO, MISO, SIMO, or SISO operation, the codec 1412 can implement at least one of space-time block coding (STBC) and associated decoding, or space-frequency block (SFBC) coding and associated decoding. In addition or in the alternative, the codec 1412 can extract information from data streams coded in accordance with spatial multiplexing scheme. In one aspect, to decode received information (e.g., data, metadata, signaling, or a combination thereof), the codec 1412 can implement at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. The codec 1412 can utilize, at least in part, mux/demux unit 1408 and mod/demod unit 1416 to operate in accordance with aspects described herein.

With further reference to FIG. 13, the computing device 1310 can operate in a variety of wireless environments having wireless signals conveyed in different electromagnetic radiation (EM) frequency bands. To at least such end, the communication processing unit 1318 in accordance with aspects of the disclosure can process (code, decode, format, etc.) wireless signals within a set of one or more EM frequency bands (also referred to as frequency bands) comprising one or more of radio frequency (RF) portions of the EM spectrum, microwave portion(s) of the EM spectrum, or infrared (IR) portion(s) of the EM spectrum. In one aspect, the set of one or more frequency bands can include at least one of (i) all or most licensed EM frequency bands, (such as the industrial, scientific, and medical (ISM) bands, including the 2.4 GHz band or the 5 GHz bands); or (ii) all or most unlicensed frequency bands (such as the 60 GHz band) currently available for telecommunication.

In addition, the computing device 1310, which can embody or can constitute the gateway device 712, can include one or more I/O interface(s) 1322 that can permit wireline communication between the computing device 1310 and other devices (e.g., a network device and/or a device of the device(s) 714, or at least one of the sensor(s) 716). The radio unit 1312 can permit wireless communication according to various radio technology protocols, such as Wi-Fi, LTE, LTE-A, BlueTooth, Zigbee, and the like (see, e.g., FIG. 12 for an illustration of various protocols contemplated in this disclosure).

Specific application functionality of the gateway device 712, as embodied in the computing device 1310 can be permitted, at least in part, via one or more management unit(s) 1326 and/or management information that can be retained in one or more memory elements referred to as management info. 1340. In general, the "application" functions in the gateway device 712 can be configured or otherwise provided to be flexible in terms of execution environment. In one example, such functionality can be implemented within SDN and/or NFV, where the higher layer capabilities can be shifted out of the computing device 1310 (e.g., a set-top box, CPE, or other premises device) into service provider's data center/cloud, such as the automation solution platform(s) 790. Accordingly, in certain embodiments, the gateway device 712, as embodied in the computing device 1310, for example, can be embodied in a virtual function that can include the I/O interface(s) 1322 (e.g., physical interfaces) and the radio unit 1312 into the environment 710, and that can provide processing capabilities based on a remotely located platform, which can render such capability location agnostic. In addition, the gateway device 712, as embodied in the computing device 1310, for example, can be seen as a physical layer connector and/or an information (e.g., data and/or metadata) collector. Yet, intelligence and/or processing functionality to anything at the application layer and/or applying logic could be local and/or remote.

In one aspect, the gateway device 712, as embodied in the computing device 1310, for example, can provide a substantive breadth of automation control services and other services via the gateway device 712 and/or regulated by the same (such as, any Internet app, POTS/VoIP, managed video, home security, etc.). As such, the gateway device 712, as embodied in the computing device 1310, for example, can include one or more management unit(s) that can permit applying one or more of rules, filters, and/or policies (which can be embodied or otherwise retained in the management information 1340) that can be applied could be to any individual or combination of services, either automation control services or otherwise.

In certain embodiments, the gateway device 712, as embodied in the computing device 1310, for example, can provide one or more intelligence component(s) which can be focused on a network management layer. For example, such intelligence can manage bandwidth, QoS, and related service delivery aspects in response to adaptation of an automation control service to specific events (e.g., changes of environmental condition, behaviors, interests, and the like) within the environment 710. In one example, such intelligence can be tied to proactive controls being set by consumer, parts may be tied to modes, and parts may be set to passive management and/or optimization, (e.g., autonomous adjustment of automation control mode(s)) associated with an automation control service. Accordingly, a consumer can customize the delivery of a service within the environment 710 via network management (e.g., functionality associated with cloud solutions and/or automation control services within a networked automation solution platform. For instance, a consumer can go into "work at home" mode, which can be part of the "Assistant" asset, and bandwidth automatically optimized for the home computer at the environment 710 (e.g., a residential dwelling), virtual private network (VPN) can be established, while other connected device(s) within the environment 710 (e.g., a child's tablet can be sub-optimized for streaming media). Important to note that security is another aspect and not just QoS. So, for services which require additional data security (e.g. home health) there would be the necessary protections from a network security standpoint.

As described herein, the operational environment 100 and other operational environments described herein can provide a system for customer-centric intelligent control of an environment in accordance with aspects described herein. In certain embodiments, the example system can include the automation orchestration platform 730, the gateway device 712, which can be functionally coupled to the automation orchestration platform 730 via an access network; and a plurality of devices (e.g., device(s) 714 and/or sensor(s) 716) functionally coupled to the gateway device 712. As described herein, the plurality of devices includes at least one of customer premises equipment, a transducer, a sensor, a medical device, a three-dimensional printer, a detector, a scanner, a code-reader device, a radio-frequency identification (RFID) reader, a controller, a telecommunication receiver, a telecommunication transmitter, a telecommunication transceiver, a tethered computing device, a wireless computing device, a wearable device, or an appliance. In one embodiment, the example system can include a service platform, (e.g., one or more automation solution platforms 790) comprising one or more automation control solutions 792, which can include one or more automation control assets/services comprising at least a device and/or an automation control module (e.g., software 440). It should be appreciated that these controls can either be passive, (e.g., based on information related to operation of device(s) and/or sensor(s) can learn and autonomously adjust), or can be configured manually, via activating a mode associated with the automation control asset, for example. As illustrated in at least some of the operational environments of the disclosure, such a service platform may be implemented in one or more third-party solution platforms 780 (see, e.g., FIG. 8A).

In addition, the example system for customer-centric intelligent automation control provided herein can include a development platform 770 (and/or a modes development center as shown in FIGS. 7 and 8A, for example) that can permit generating or updating an automation control module/asset. In one aspect, the development control platform can include a group of one or more interfaces, such as application programming interfaces (APIs), that can permit access to and/or configuration of at least one of the device(s) 714 and/or sensor(s) 716, for example, in order to configure a specific automation control service, automation control asset, and/or mode. In the example operational environment 700, such interface(s) (e.g., APIs) can be accessed by one or more developer's devices 774 (which also may be referred to as developer(s) 774). At least one of the developer(s) 774 can be functionally coupled to the development platform 770 (or the modes development center in the operational environment of FIG. 12, for example)

Figure 8B:
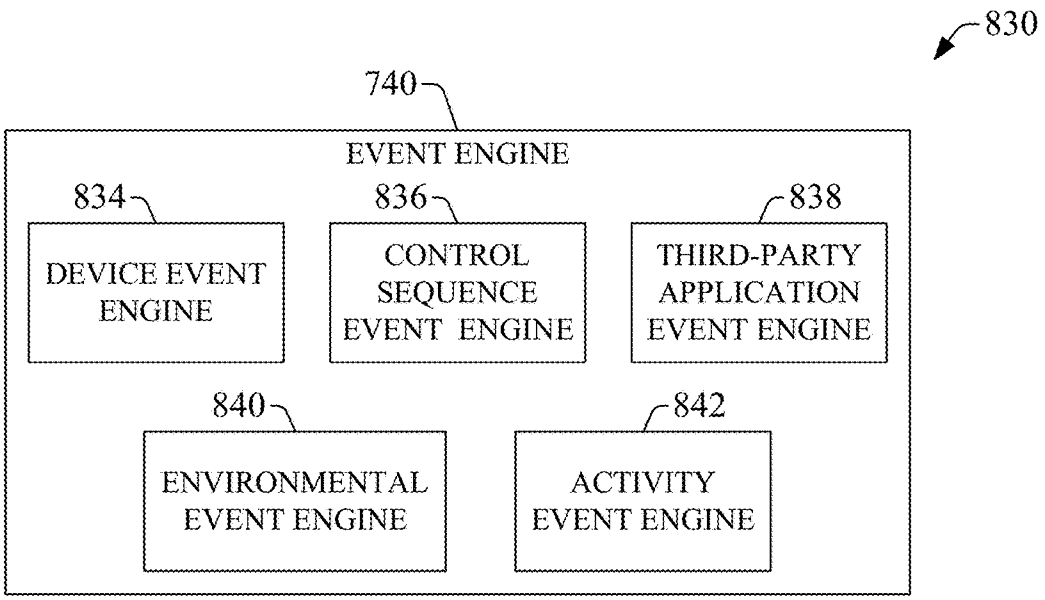
FIG. 8B illustrates an example of an event engine for customer-centric intelligent control in accordance with one or more embodiments of the disclosure.

In addition, the example system for customer-centric intelligent automation control provided herein can include an event management platform 740 (generally referred to as an event engine 740) that may be configured to monitor operational activity of at least one device of a plurality of devices and/or at least one sensor of a plurality of sensors. The event engine 740 can have the same or substantially the same functionality of the event engine 330. FIG. 8B illustrates an example embodiment 830 of the event engine 740. As illustrated, the event engine 740 can include a device event engine 834 that can receive signaling or other types of information (e.g., data and/or metadata) associated with the operation of a device, e.g., execution of a command, detection of a stimulus (e.g., change in temperature, change in lighting conditions, and the like. Such a device can have a relationship with a specific automation control asset, or can be included within the environment 710 without an established relationship with the automation control asset. As an illustration, such a device can be embodied in or can include a medical device that can provide data and/or metadata while the automation control asset that does not have a relationship with the medical device is being executed. The event engine 740 also can include a control sequence event engine 836 that can implement a specific control sequence (e.g., a sequence of tasks) of an automation control asset. The control sequence event engine 836 also can monitor or otherwise detect events associated with the automation control asset. The event engine 740 also can include other engines that can permit implementing and/or monitoring events associated with environment 710. More specifically, the event engine 740 can include an environmental event engine 840 that can, for example, monitor or otherwise detect events that can provide context of the environment 710. The context can include information indicative or representative of conditions related to the environments. Such information can be indicative or otherwise representative of one or more of (i) weather conditions in the vicinity of the environment 710, (ii) safety alerts (e.g., Amber alerts, school lockdowns, inmate escapes, vehicular accidents, etc.) in the vicinity of the environment 710, (iii) traffic conditions in the vicinity of the environment 710, (iv) travel alerts associated with an itinerary of an agent associated with the environment 710, or the like. In addition or in other embodiments, the event engine 740 can include a third-party application event engine 838 that can monitor or otherwise collect information associated with execution of a specific third-party application that can be linked or otherwise associated with an automation control asset. As an example, the third-party application event engine 838 can collect data and/or metadata generated by a running application (e.g., RunKeeper, endomondo, or the like) executed on a mobile device associated with an automation control asset (e.g., the Trainer asset described herein). As another example, the third-party application event engine 838 can collect data and/or metadata generated by a gaming application executed on a gaming console included in the device(s) 714 or in the cloud, where the gaming console can be associated with an entertainment and/or fitness automation control asset.

With further reference to FIG. 8B, the event engine 740 can include an activity event engine that can monitor utilization of a specific automation control asset or an agent thereof (e.g., a device associated with the asset, a software module associated with the asset, firmware associated with the asset, or the like). The activity event engine 842 can generate utilization records (or logs) that, in certain implementations, can be aggregated or otherwise analyzed, prior to retaining at least a portion of such records in the repository 760.

Figure 8C:
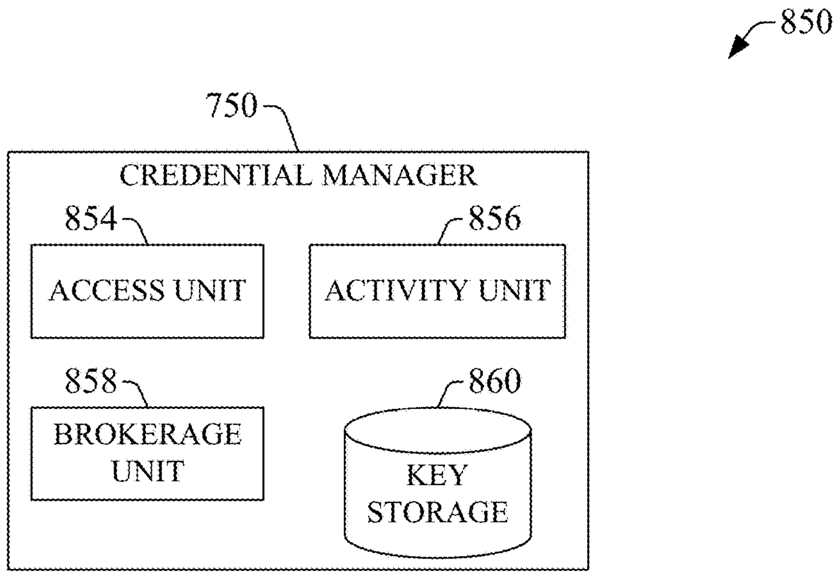
FIG. 8C illustrates an example of a credential manager for customer-centric intelligent control in accordance with one or more embodiments of the disclosure.

The example system for customer-centric intelligent automation control provided herein also can include a credential management platform 750 (referred to as a credential manager 750) that can permit validation and/or authorization to utilization of automation control services and/or related automation control assets. In certain embodiments, such as example embodiment 850 shown in FIG. 8C, the credential manager 750 can include an access unit 854 that can control or otherwise manage access (e.g., manage validation and/or authorization) to an automation control solution provided by the third-party solution platform(s) 780 or the automation solution platform(s) 790. As illustrated, the credential manager 750 can include a brokerage unit 858 that can permit the exchange of credentials (e.g., private keys, public keys, or the like) or other information that can permit access to an automation control solution available at the third-party solution platform(s) 780 or other third-party source. The credential manager 750 also can include an activity unit 856 that can monitor the access to an automation control solution by an agent thereof (e.g., hardware, firmware, software, and/or software in execution associated with the solution) or an agent associated with an environment controlled by the automation control solution. More specifically, for example, the activity unit 856 can generate records of access to the automation control solution. As such, the activity unit 856 can generate historical information (e.g., data and/or metadata) indicative or otherwise representative of usage or other types of metrics representative of the desirability of the automation control solution. Further, the credential manager 750 can include one or more memory devices 860 (referred to as key storage 860) that can include credentials or other types of information that can permit validation and authorization to access an automation control solution and/or other type of services. In one example, such credentials or other types of information can include private keys, public keys, tokens (e.g., data structures indicative of the scope of permitted access, such as type of service to be accessed, period available for access, etc.), and the like.

Figure 9:
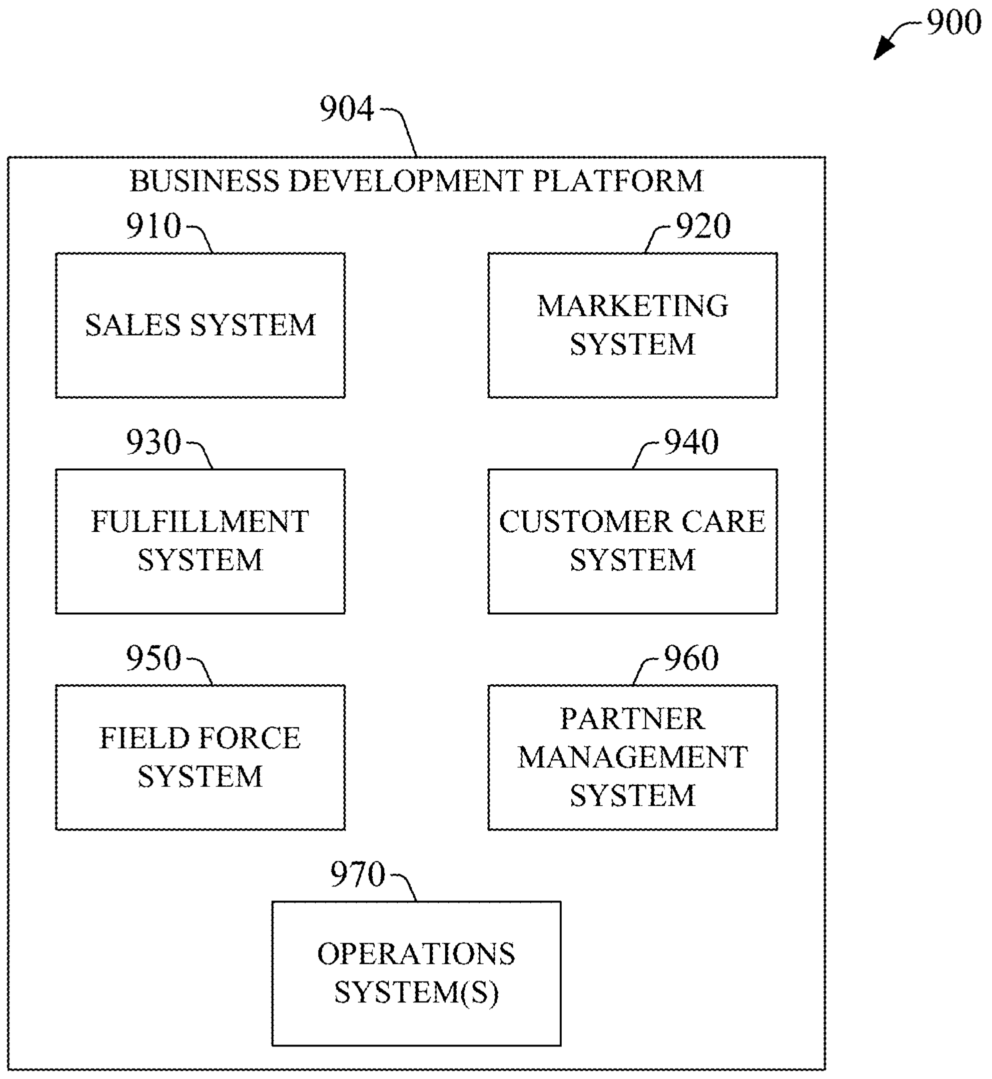
FIG. 9 illustrates an example of a business development platform in accordance with one or more embodiments of the disclosure.

FIG. 9 illustrates an example embodiment 900 of a business development platform 904 in accordance with one or more embodiments of the disclosure. As illustrated, the business development platform 904 can include various systems that can permit administering certain aspects of deployment and/or for management of an automation control service in accordance with aspects of this disclosure. In one aspect, the business development platform 904 can permit commercializing automation control services. More specifically, the business development platform 904 can include a sales system 910 and a marketing system 920. In one embodiment, that permits introducing an end-user or another type of consumer to an automation control solution and selling such a solution to the consumer. In addition or in another embodiment, the sales system 910 can permit transactions between an end-user or other type of consumers and an entity that provides automation control services (such as a MSO). Such transactions can be directed to a sale of an automation control service and/or an automation control asset, and thus, the transactions can include various ecommerce flows or other types of sale logic and associated information. Therefore, in one example, the sales system 910 can permit or otherwise facilitate exchange of information between a remote computing device of a consumer engaged in the purchase of an automation control service and/or an automation control asset. Similarly, the sales system 910 also can permit or otherwise facilitate the exchange of information between a remote device of a third-party provider of components (e.g., devices, software libraries, or the like) associated with an automation control service and/or an automation control asset. In one embodiment, the sales system 910 can process payment for an automation control service and/or an automation control asset. Similarly, the business development platform 904 can include a marketing system 920 that can permit advertising or otherwise promoting automation control solutions in accordance with aspects of the disclosure. The marketing system 920 can include or can be functionally coupled to a sub-system for generation of advertisement and/or to media outlets for dissemination or publication of the advertisement. The media outlets can include printed media and/or digital media (e.g., web-based media, social media, a combination thereof, or the like).

In addition, the business development platform 904 can include a fulfillment system 930 that can permit generating a new account for an automation control solution of this disclosure, and provisioning such a solution. Further, a customer care system 940 of the business development platform 904 can permit receiving queries regarding issues with service and/or expansion of the service (e.g., purchase and provisioning of additional automation control assets). The business development platform 904 also can include a field force system 950 that can permit coordinating and/or supplying field technician for installation of a gateway, devices, sensors, or other equipment associated with an automation control solution of the disclosure. As described herein, third-party solutions and/or applications can be included within the customer-centric intelligent automation of this disclosure. As such, in the illustrated embodiment, the business development platform 904 can include a partner management system 960 that can permit maintaining a business relationship with a commercial partner that provides at least some of the automation control assets of this disclosure. The business development platform 904 also can include one or more operation system(s) 970 that can implement provisioning, entitlement management, billing, and/or other operational aspects. In certain implementations, at least a portion of the business development platform 904 can be embodied in or can constitute a BSS/OSS platform.

In certain embodiments, the automation orchestration platform 730 can comprise an asset portal (or asset portal platform, which can include a service and/or mode marketplace) comprising one or more interfaces, such as the portal interface(s) 1010 shown in FIG. 10, configured to expose and/or provide access to one or more of a catalog of automation control modules/assets or a promotion. In one example, the asset portal can comprise one or more interfaces (e.g., APIs) configured to provide catalog management. In another example, the asset portal can comprise one or more interfaces (e.g., the portal interface(s) 1010) configured to provide access to a third-party agent/entity, such as a computing device of a business partner of a service provider that administers the automation orchestration platform 730.

In certain embodiments, the asset portal (which can embody or can constitute a service and/or mode marketplace, as shown in FIG. 12, for example) can include one or more interfaces configured to permit a transaction associated with the automation control asset, wherein the transaction comprises one or more of a purchase of the automation control asset, a review of the automation control asset, or a publication (or post) of the automation control asset.

In certain embodiments, the automation orchestration platform 730 can include a user management platform, (e.g., at least one of management interface(s) 1020), that can permit access to and/or configuration of use profile(s) associated with a controlled environment 710, as well as single-sign-on functionality directed to one or more applications utilized or leveraged within or in proximity of a controlled environment, such as environment 710. In addition, the user management platform also can provide billing features associated with a user device that consumes an automation control service in accordance with the disclosure.

In addition or in the alternative, automation orchestration platform 730 or other automation orchestration platforms of the disclosure can include device management platform, (e.g., at least one of the management interface(s) 1020), that can permit provisioning, monitoring, and data-harvesting associated with operation of at least one of the device(s) 714 and/or at least one of the sensor(s) 716. Information so collected by the device management platform can be retained in the repository 1040 or other memory device(s), and can be utilized or otherwise leveraged for generation of automation control services, automation control assets, and/or a service mode.

In certain embodiments, as illustrated in the example embodiment 1100 shown in FIG. 11, the portal interface(s) 1010, the management interface(s) 1020, the server(s) 1030, and the repository 1040 can be arranged in layers. A layer can include physically distributed functional elements and can operate as a single logical unit. In the illustrated embodiment, the orchestration platform can include an exchange layer 1120 that can receive multiple streams of information (represented with arrows) from a controlled environment (e.g., environment 710). The automation orchestration platform 730 also can include a mediation layer 1130 and an analysis layer 1140, each of which can analyze or otherwise process at least a portion of the information received at the automation orchestration platform. In addition, the automation orchestration platform 730 also can include an asset generation layer 1150 and can provide (e.g., compose or otherwise generate) an automation control asset in accordance with aspects of this disclosure. As illustrated, the automation orchestration platform 730 can include a storage layer 1160 that can retain information received and/or generated at the automation orchestration platform 730. Bus architecture 1164 can permit the exchange of information between two or more of the layers that constitute the automation orchestration platform 730. As described herein, the automation orchestration platform 730 can be functionally coupled (e.g., communicatively coupled to the event engine 740.

Figure 15:
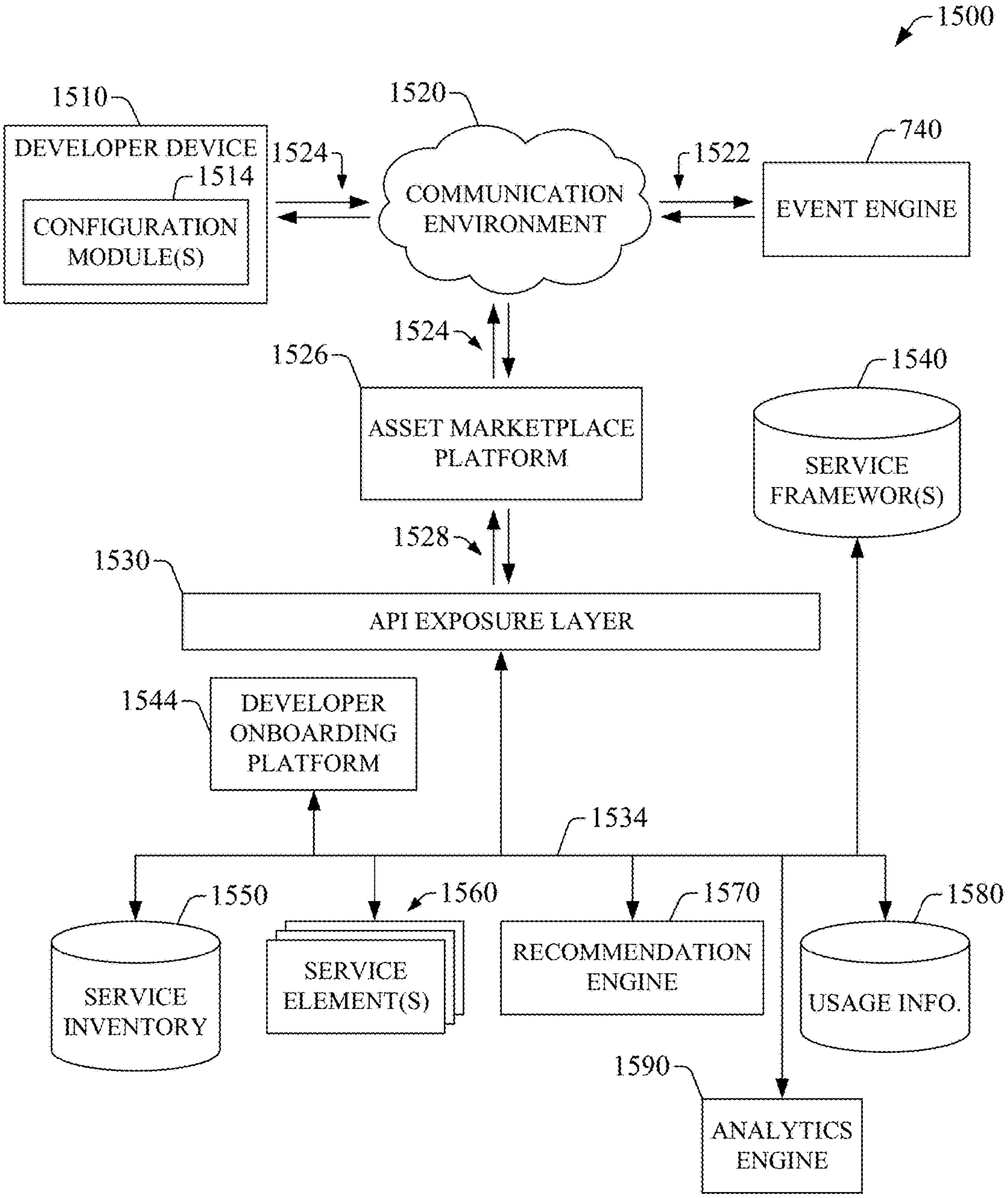
FIG. 15 illustrates an example of an operational environment for development of automation control services in accordance with one or more embodiments of the disclosure.

FIG. 15 illustrates an example operational environment 1500 for development of automation control services in accordance with one or more embodiments of the present disclosure. The operational environment 1500 can be distributed, which can permit development of an automation control service by a developer associated with an entity that can administer the service or a third-party developer. As illustrated, a developer device 1510 can include one or more configuration modules 1514 that can communicate with an asset marketplace platform 1526 via a communication environment 1520. As illustrated, the asset marketplace platform 1526 is functionally coupled to an API exposure layer 1530 via communication links 1528. It should be appreciated that in certain embodiments, the API exposure layer 1530 can be integrated into the asset marketplace platform 1526. Communication links 1524 can permit downstream and upstream communication of information (e.g., data, metadata, and/or signaling) between the developer device 1510 and the communication environment 1520. Similarly, communication links 1528 can permit upstream and downstream communication of information between the API exposure layer 1530 and the communication environment 1520. As such, the communication links 1524 and 1528, and the communication environment 1520 can permit exchange of information between at least one of the configuration module(s) 1514 and the API exposure layer 1530 or a component thereof. In one embodiment, the API exposure layer 1530 can include one or more servers (which may be referred to as API servers) that can provide APIs for configuration of an automation control service. To at least such an end, in one example, at least one of the configuration module(s) 1514 can cause the developer device 1510 to render a user interface (UI) that can permit selection of frameworks for configuration of the automation control service. The frameworks can include a service framework having a premises framework associated with a confined region to be automated, and an activity framework associated with the certain functionality to be automated.

Figure 16:
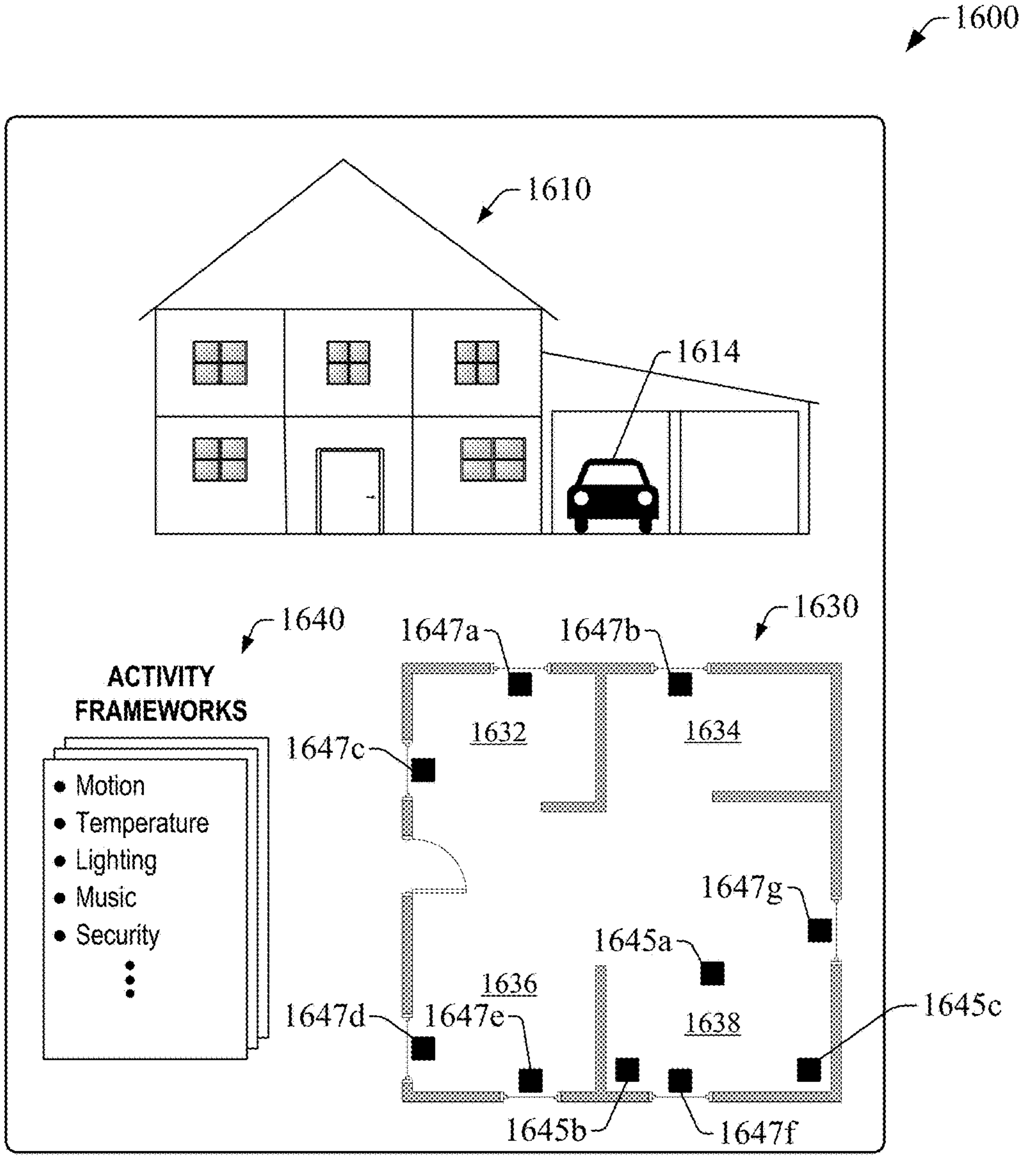
FIG. 16 illustrates an example of a user interface for configuration of an automation control service in accordance with one or more embodiments of the disclosure.

As an illustration, FIG. 16 presents an example of a UI 1600 that can permit configuration of the automation control service in accordance with one or more embodiments of the disclosure. The example UI 1600 can include indicia 1610 representing a single-family dwelling to be controlled. It should be appreciated that the disclosure is not so limited and, in other embodiments, the UI 1600 can include indicia representative of other types of dwelling or environments to be controlled—(e.g., MDU, an industrial space, a commercial space, or the like). The indicia 1610 can include selectable or otherwise actionable portions that, in response to actuation, can cause the developer device 1510 to present indicia 1610 representative of a floor plan of the single-unit dwelling. To that end, in certain embodiments, the asset marketplace platform 1526 access (e.g., retrieve and/or receive) information indicative or otherwise representative of the single-family unit, and can send such information and/or second information (e.g., metadata) to the developer device 1510 to present the indicia 1610. More specifically, yet not exclusively, one of the configuration module(s) 1514 can render or otherwise process the received information and can cause a display unit or other suitable input/output (I/O) interface of the developer device 1510 to present the processed information.

In addition, the indicia 1630 also can include selectable or otherwise actionable indicia 1632, 1634, 1636, and 1638 that can identify certain regions of the floor plan. Selection of each of the indicia 1632, 1634, 1636, 1638 can cause the developer device 1510 to present service elements (e.g., device(s) and/or sensor(s)) associated with the respective region selected in the floor plan of the single-family dwelling. In the illustrated embodiment, service elements 1645*a*, 1645*b*, and 1645*c* can be presented in response to selection of the actionable indicia 1638. In addition or in other embodiments, the example UI 1600 can include indicia 1640 representative of activity frameworks for functionalities that can be automated in a specific region of a floor plan of the single-family dwelling. The functionalities can include music or other types of sound; motion; climate control (e.g., temperature regulation, humidity regulation); energy consumption control; lighting; security, including physical security and/or digital security; parental controls; a combination of the foregoing; or the like. In certain implementations, selection of an activity framework can cause the developer device 1510 to present some of all of the devices and/or sensors associated with the activity framework. In the example UI 1600, window locks 1647*a*-1647*g* can be presented in response to selection to a security framework of the activity frameworks 1640. In addition or in other implementations, presentation of the window locks 1647*a*-1647*g* can be accompanied of presentation (e.g., display) of a sensor framework that can permit configuration, via input information, for example, of the type of lock, activity (e.g., locked/unlocked cycles) associated with the lock, and/or location of the lock. For other type of sensors and/or devices, the sensor framework also can permit configuration of sensitivity range of a sensor or a device, and/or operational range of the sensor or device. It should be appreciated that the developer device 1510 can present UIs similar to UI 1600 for other service frameworks associated with other premises, such as a multiple-dwelling unit (MDU) framework, a factory framework, a hospital framework; a small or medium business (SMB) framework, such as an office framework, a retail store framework, a medical office framework; and the like.

Figure 17A:
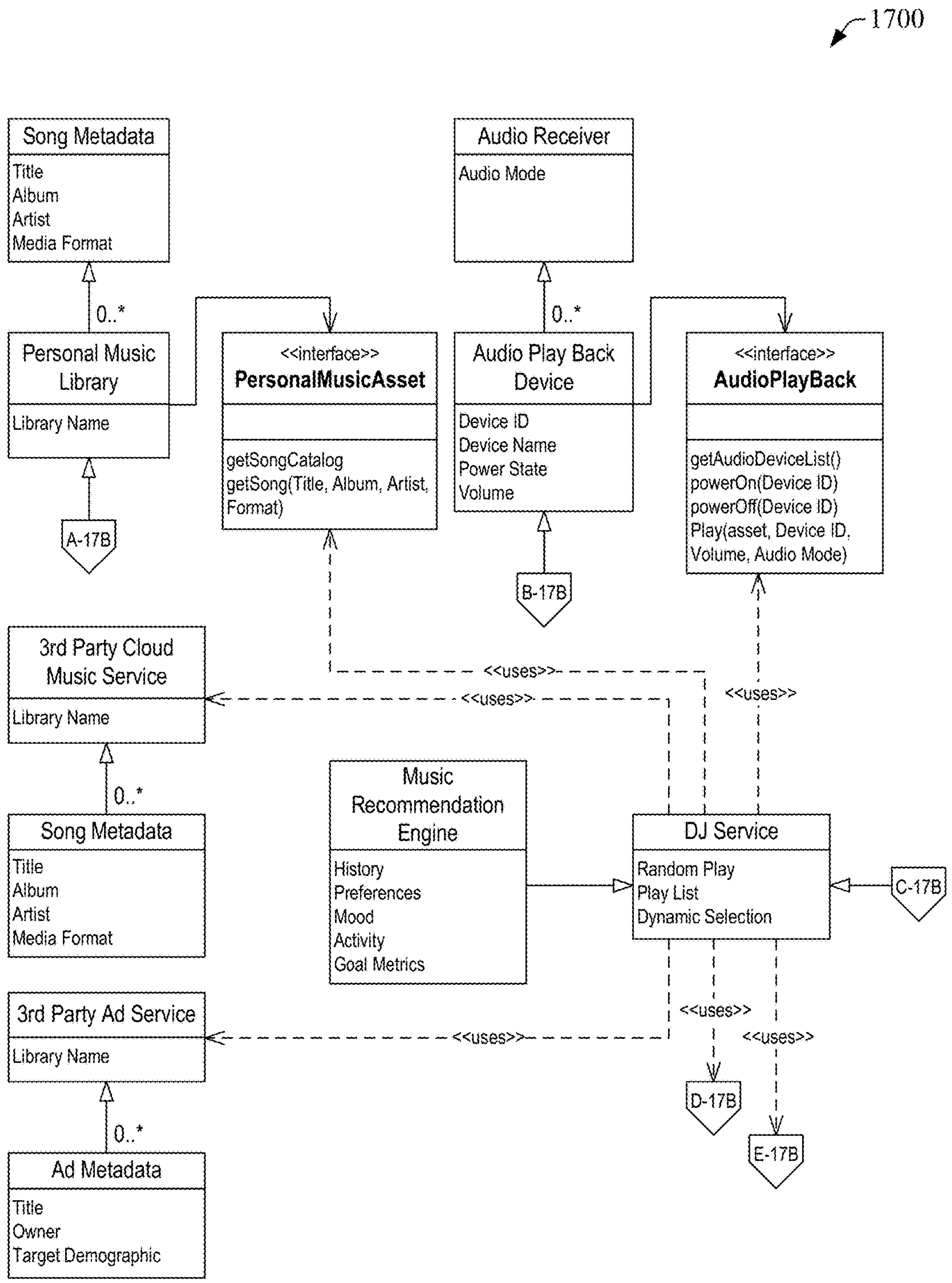
FIGS. 17A and 17B illustrate an example of a data model for configuration of an automation control service in accordance with one or more embodiments of the disclosure.
Figure 17B:
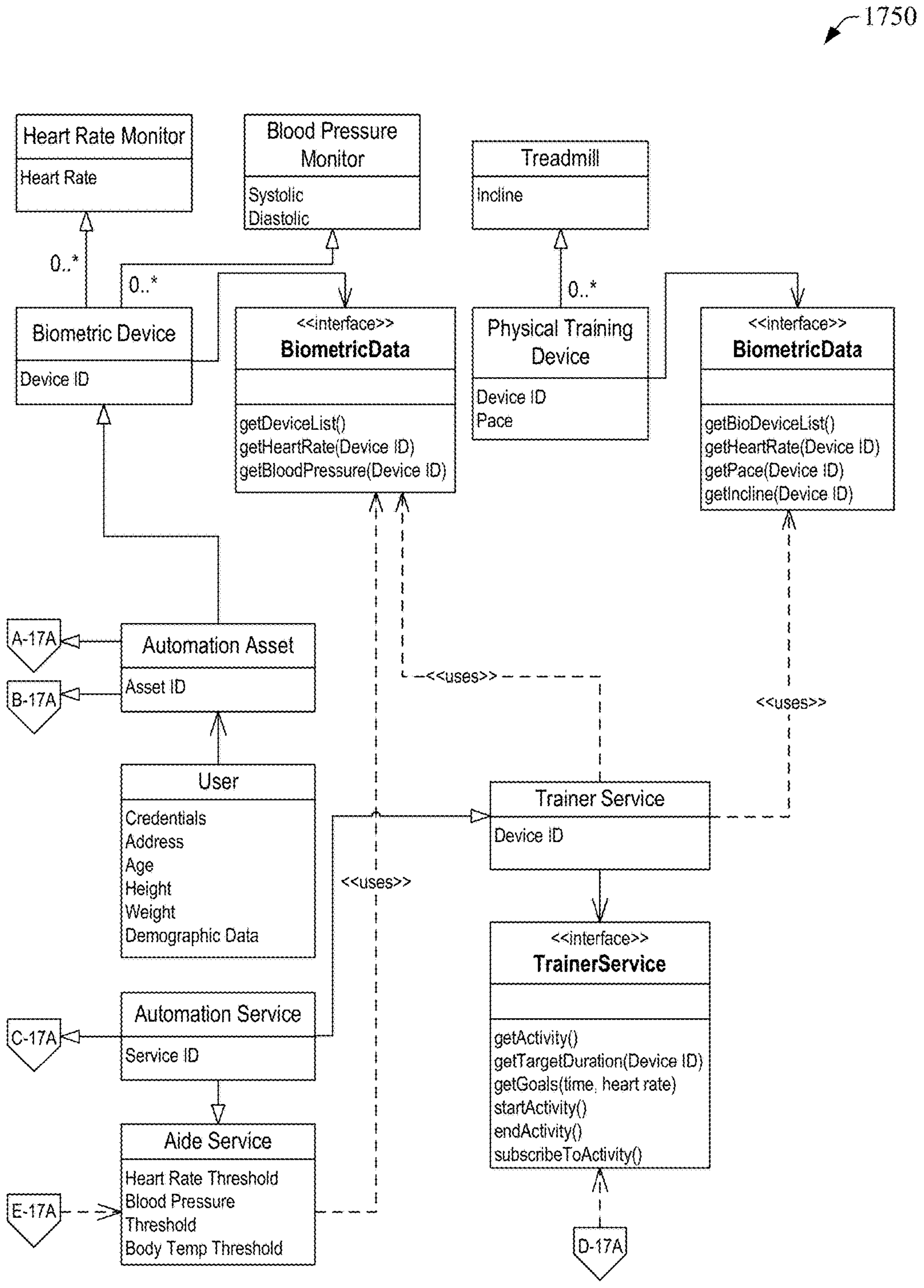

The asset marketplace platform 1526 can permit configuration of an automation control service in response to selection of a premises framework and/or an activity framework as described herein. In addition, in certain embodiments, in response to configuration of the automation control service, the API exposure layer 1530 can provide or otherwise expose the automation control service and/or an automation control asset as a service in order to be re-used. More specifically, yet not exclusively, the selection of the premises framework and/or the activity framework can cause at least one of the configuration module(s) 1514 to specify the automation control service using a common control language and/or a common information model, which can be represented by a predetermined service schema. In one aspect, the predetermined service schema can describe or otherwise specify the automation control service in an automatically parsable manner. In certain embodiments, the service schema can be embodied in or can include an extensive markup language (XML) schema that can describe actions and/or elements associated with the automation control service. In other embodiments, the service schema can be embodied in or can include a unified modeling language (UML) representation. As an illustration, FIGS. 17A-17B present an example UML schema for an example embodiment in which the Trainer and the DJ assets can operate concurrently. An illustration can include a treadmill configured by the Trainer asset for some specific workout (e.g., a hill-workout) with the DJ asset playing suitable music to help the user keep a certain pace. Although not shown, in certain embodiments, an HVAC asset also can be configured to operate concurrently with Trainer and DJ assets (see, e.g., FIGS. 5B and 5D) in order to include temperature control, which can regulate the temperature of an environment in which the treadmill is operated so as to ensure that the user does not overheat. Further, as illustrated, features of the Aide asset (see, e.g., FIG. 5A) can be incorporated in order to include information (e.g., data and/or metadata) related to biometrics of the user while the workout is in progress. Off-page connectors "A," "B," "C," "D," and "E" in diagrams 1700 and 1750 are utilized for the sake of clarity, simplifying the presentation of the full example UML schema. Labels "17A and "17B" refer, respectively, to FIGS. 17A and 17B.

Regardless of the specific formal representation of the service schema, an automation control service can be configured by specifying state variables, actions, elements, events, and/or schedules. The configured automation control service also can have an attribute indicative or otherwise representative of a monetary quantity associated with the usage of the automation control service by a consumer. A second attribute indicative or otherwise representative of a second monetary quantity associated with re-use by a developer (e.g., via the developer device 1510, for example) also can be included in the representation or specification provided by the service schema. In addition, the configured automation control service can include a reference to a functionality provided by another automation control service and/or an automation control asset thereof. Specification of such variable(s) can be implemented according to the common information model. For an automation control asset, the common information model can include asset information that can characterize a service element associated with an automation control service. The asset information can include one or more of the following types of information: asset type (e.g., door sensor, entry lock, thermostat, audio device, or the like); state information (e.g., on/off, open/closed, current temperature, current humidity, volume level, or the like); controllable capabilities or actions (e.g., power state, temperature set point, volume set point); event attributes; event thresholds (e.g., changes in temperature, changes in humidity, changes in heartbeat rate); or the like. In addition, a representation of an asset can be provided, wherein the asset can be embodied in or can include physical devices or sensors (such as temperature sensors, door contact sensors, biometric sensors, audio system) or logical software entities (such as an application running on a common computing platform (e.g. a personal computer, a smartphone, a tablet computer, a video set-top box (STB), a home security panel, a home data router platform, or the like). The representation of the asset can be agnostic to the specific implementation of an automation control service including the asset.

In addition or in other embodiments, the common control language of this disclosure can permit the discovery, control, and/or orchestration of events and/or actions across automation control assets based at least on a specific common information model. In one embodiment, the API exposure layer 1530 can expose the common control language as one or more application programming interfaces (APIs). At least one of such APIs can provide, for example, methods to (i) retrieve the inventory of events in a premises or location (e.g., getDevices[accountID, device array]); (ii) subscribe to events from a given asset (e.g., setEvent[accountID, assetID, eventID]); (iii) set an attribute of an asset (e.g., setAssetAttribute[accountID, assetID, attribute]); (iv) set an attribute or receive events based on specific people; and the like.

The common control language can be embodied in or can include, for example, programmatic language that can include one or more APIs and the common information model described herein for developing automation control assets (e.g., software applications and/or firmware) that can be executed in a common application and device environment (e.g. on an in-premises control panel or automation hub). The programmatic language can include, for example, high level scripting (such as Java Script, Phython, or the like), lower level programming languages (e.g., C#, C, Java), and/or programming approaches (e.g., assembler, ladder logic, or the like).

In certain embodiments, configuration of an automation control service by the developer device 1510 can cause the asset marketplace platform 1526 to supply information indicative of the automation control service and/or the functionality thereof to a service inventory 1550. To that end, in one example, the asset marketplace platform 1526 can utilize or otherwise leverage the API exposure layer 1530. Similarly, the asset marketplace platform 1526 can supply information indicative of one or more service elements (e.g., hardware, firmware, or software) and/or the functionality thereof to one or more service elements 1560. As such, in one aspect, the automation control service and/or elements thereof can be inventoried in response to configuration of such a service.

In addition or in certain embodiments, configuration of an automation control service by the developer device 1510 can cause the asset marketplace platform 1526 to provide a recommendation for specific automation functionality, a specific automation control service, or an element thereof. To that end, in one example, the asset marketplace platform 1526 can utilize or otherwise leverage a recommendation engine 1570, which can be accessed via the API exposure layer 1530. More specifically, yet not exclusively, the recommendation engine 1570 can generate such a recommendation. The recommendation can be directed to expanding the usefulness of the configured automation control service and can be based, for example, at least on usage information indicative of the operation of devices, sensors, and/or behavior of an agent associated with a confined region that is automated. In addition or in the alternative, the recommendation can be directed toward informing a developer of another automation control that the configured automation control service can extend the functionality of an automation control service developed by such a developer. In certain embodiments, a recommendation can be provided to the developer device 1510 via one of the configuration module(s) 1514, and can be generated by a recommendation engine 1570. As illustrated, the usage information can be retained within a repository 1580 (which can be referred to as usage info. 1580). As illustrated, in certain embodiments, an analytics engine 1590 can process data, metadata, and/or signaling associated with implementation of one or more automation control services associated with a controlled region. Such processing can permit generating intelligence associated with utilization of the automation control service and/or an agent associated therewith. Specifically, yet not exclusively, the analytics engine 1590 can identify or otherwise determine patterns and/or other types of features in time series representative or otherwise indicative of the data, metadata, and/or signaling. In one implementation, the analytics engine 1590 can process the data, metadata, and/or signaling in nearly real-time. In addition or in other implementations, the analytics engine 1590 can process contemporaneous and historical information (e.g., data, metadata, and/or signaling) which can permit identifying or otherwise determining long-lived (or long time-scale) patterns, such as trends within the information.

In addition or in other embodiments, the developer device 1510, via one of the configuration module(s) 1514, can provide a recommendation to the asset marketplace platform 1526. The recommendation can be provided, for example, via an API available to the developer device 1510. In one example, the recommendation can specify, to the asset marketplace platform 1526, one or more service elements or other type of automation control assets that can be utilized by an automation control service configured by the developer device 1510. In addition or in another example, the recommendation can specify an automation control service that can be utilized in conjunction with the automation control service configured by the developer device 1510.

The API exposure layer 1530 also can provide a group of common APIs that are not specific to the architecture of a device, sensor, or other type of agent associated with an automated environment. Accordingly, in one aspect, the common APIs can permit platform-agnostic development and implementation of automation control services.

Figure 18:
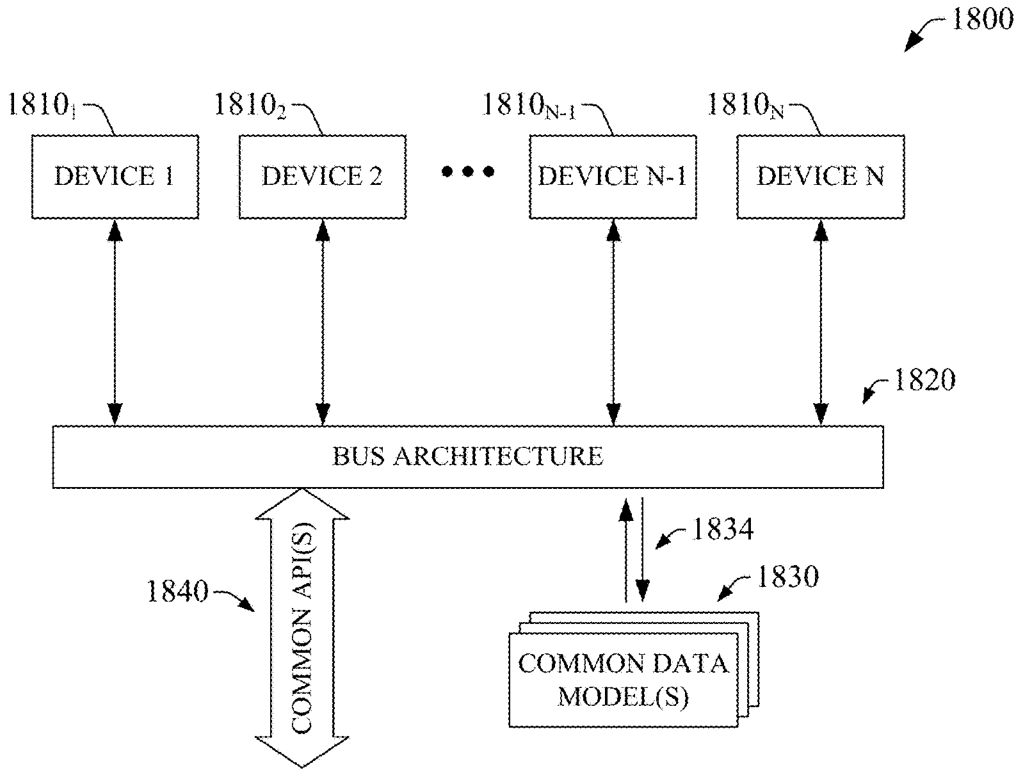
FIG. 18 illustrates an example of an operation environment for utilization of an automation control service configured in accordance with embodiments of the disclosure.
Figure 19:
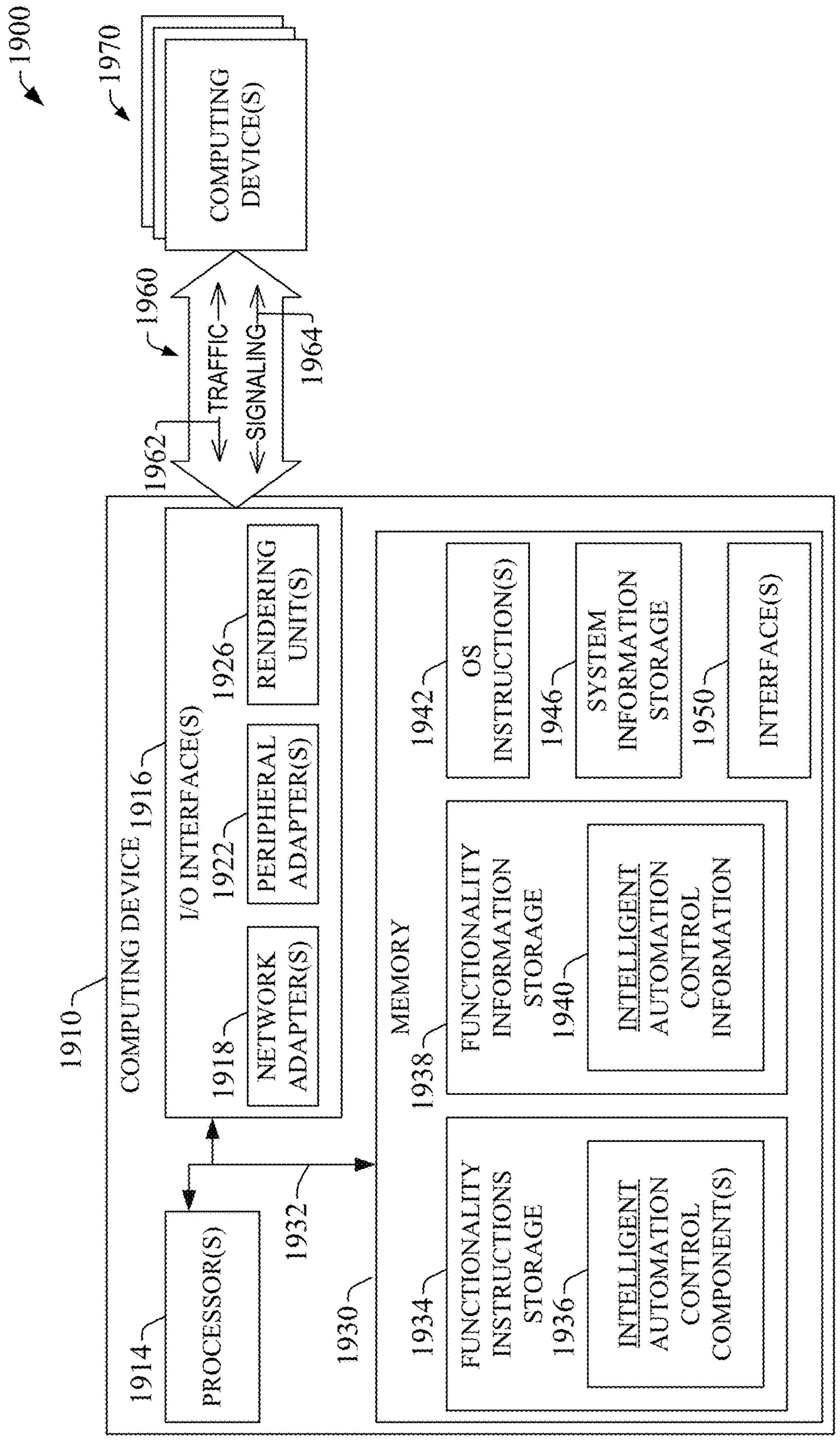
FIGS. 19-20 illustrate examples of computing environments for costumer-centric intelligent automation control in accordance with one or more embodiments of the disclosure.

FIG. 18 illustrates an example of an operational environment for implementation of an automation control service in accordance with aspects of this disclosure. As illustrated, an event and message bus architecture 1820 can be functionally coupled (e.g., communicatively coupled to a group of devices $\mathbf{1810}_1$, $\mathbf{1810}_2$, . . . , $\mathbf{1810}_{N-1}$, and $\mathbf{1810}_N$, with N≥1, where one or more of such devices is manufactured or otherwise provided by a different vendor. Each of the devices $\mathbf{1810}_1$-$\mathbf{1810}_N$ can communicate event information (e.g., data, metadata, and/or signaling) indicative of an event to the bus architecture 1820, which can communicate the information to the event engine 740. The communication can be implemented via one or more common APIs 1840, and any payload data and/or metadata associated with the event information can be interpreted using a common information model 1830. As such, the event engine 740 can receive the event information in a platform-agnostic fashion, and can relay such information to the automation orchestration platform 730. The event information can cause the automation orchestration platform 730 to direct the device (e.g., device $\mathbf{1810}_2$) that generated the event information to perform an automation task based on the event information and according to an automation control service associated with a confined region containing the device $\mathbf{1810}_1$-$\mathbf{1810}_N$.

Figure 20:
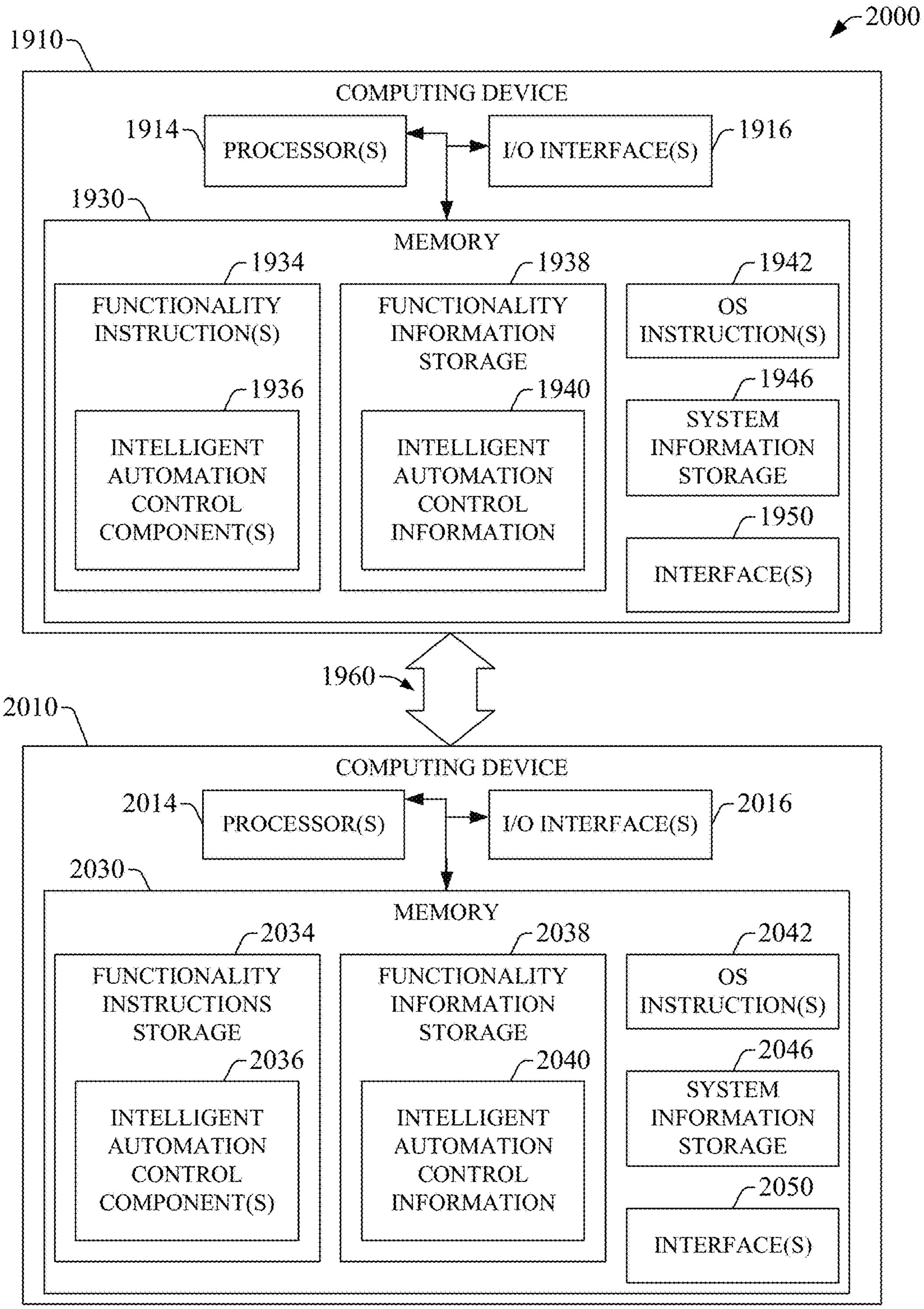

FIG. 20 illustrates a block diagram of an example of an operational environment 2000 for customer-centric intelligent automated control in accordance with one or more aspects of the disclosure. The example operational environment is merely illustrative and is not intended to suggest or otherwise convey any limitation as to the scope of use or functionality of the operating environment's architecture. In addition, the illustrative operational environment 2000 depicted in FIG. 20 should not be interpreted as having any dependency or requirement relating to any one or combination of components illustrated as part of the operational environment 2000. The operational environment 2000 comprises a computing device 2010 which, in various embodiments, can correspond to the computing device 2010.

The operational environment 2000 represents an example implementation of various aspects of the disclosure in which the processing or execution of operations described in connection with customer-centric intelligent automation control as disclosed herein can be performed in response to execution of one or more software components at the computing device 2010. It should be appreciated that the one or more software components can render the computing device 2010, or any other computing device that contains such components, a particular machine for customer-centric intelligent automation control as described herein, among other functional purposes. A software component can be embodied in or can comprise one or more computer-accessible instructions, (e.g., computer-readable and/or computer-executable instructions). In one scenario, at least a portion of the computer-accessible instructions can embody and/or can be executed to perform at least a part of one or more of the example methods described herein, such as the example methods presented in FIGS. 21-32. For instance, to embody one such method, at least a portion of the computer-accessible instructions can be persisted (e.g., stored, made available, or stored and made available) in a computer storage non-transitory medium and executed by a processor. The one or more computer-accessible instructions that embody a software component can be assembled into one or more program modules that can be compiled, linked, and/or executed at the computing device 2010 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 2010 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects of the disclosure in connection with customer-centric intelligent automation control as described herein can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers (PLCs), distributed computing environments that comprise any of the above systems or devices, or the like.

As illustrated, the computing device 2010 can comprise one or more processors 2014, one or more input/output (I/O) interfaces 2016, one or more memory devices 2030 (herein referred to generically as memory 2030), and a bus architecture 1932 (also termed bus 1932) that functionally couples various functional elements of the computing device 2010. In certain embodiments, the computing device 2010 can include, optionally, a radio unit (not depicted in FIG. 20). The radio unit can include one or more antennas and a communication processing unit that can permit wireless communication between the computing device 1910 and another device, such as one of the computing device(s) 1970. At least one of the computing device(s) 1970 can have similar or identical architecture to the computing device

2010. The bus 1932 can include at least one of a system bus, a memory bus, an address bus, or a message bus, and can permit exchange of information (data, metadata, and/or signaling) between the processor(s) 2014, the I/O interface(s) 2016, and/or the memory 2030, or respective functional elements therein. In certain scenarios, the bus 1932 in conjunction with one or more internal programming interfaces 2050 (also referred to as interface(s) 2050) can permit such exchange of information. In scenarios in which processor(s) 2014 include multiple processors, the computing device 2010 can utilize parallel computing.

The I/O interface(s) 2016 can permit communication of information between the computing device and an external device, such as another computing device, (e.g., a network element or an end-user device). Such communication can include direct communication or indirect communication, such as exchange of information between the computing device 2010 and the external device via a network or elements thereof. As illustrated, the I/O interface(s) 2016 can comprise one or more of network adapter(s) 1918, peripheral adapter(s) 1922, and rendering unit(s) 1926. Such adapter(s) can permit or facilitate connectivity between the external device and one or more of the processor(s) 2014 or the memory 2030. For example, the peripheral adapter(s) 1922 can include a group of ports, which can comprise at least one of parallel ports, serial ports, Ethernet ports, V.35 ports, or X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

In one aspect, at least one of the network adapter(s) 1918 can functionally couple the computing device 2010 to one or more computing devices 1970 via one or more traffic and signaling pipes 1960 that can permit or facilitate exchange of traffic 1962 and signaling 1964 between the computing device 2010 and the one or more computing devices 1970. Such network coupling provided at least in part by the at least one of the network adapter(s) 1918 can be implemented in a wired environment, a wireless environment, or a combination of both. The information that is communicated by the at least one of the network adapter(s) 1918 can result from implementation of one or more operations in a method of the disclosure. Such output can include any form of visual representation, including, but not limited to, textual, graphical, animation, audio, tactile, or the like. In certain scenarios, each of the computing device(s) 1970 can have substantially the same architecture as the computing device 2010. In addition, or in the alternative, the rendering unit(s) 1926 can include functional elements (e.g., lights, such as light-emitting diodes; a display, such as liquid crystal display (LCD), a plasma monitor, a light emitting diode (LED) monitor, an electrochromic monitor; combinations thereof; or the like) that can permit control of the operation of the computing device 2010, or can permit conveying or revealing the operational conditions of the computing device 2010.

In one aspect, the bus 1932 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, a PCI-Express bus, a Personal Computer Memory Card Industry Association (PCMCIA) bus, a Universal Serial Bus (USB) and the like. The bus 1932, and all buses described herein can be implemented over a wired or wireless network connection and each of the subsystems, including the processor(s) 2014, the memory 2030 and memory elements therein, and the I/O interface(s) 2016 can be contained within one or more remote computing devices 1970 at physically separate locations, connected through buses of this form, thereby effectively implementing a fully distributed system.

The computing device 2010 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Examples of computer-readable non-transitory storage media can be any available media that can be accessed by the computing device 2010, and can comprise, for example, both volatile and non-volatile media, and removable and/or non-removable media. In one aspect, the memory 2030 can comprise computer-readable media in the form of volatile memory, such as random access memory (RAM), and/or non-volatile memory, such as read-only memory (ROM).

The memory 2030 can comprise functionality instructions storage 2034 and functionality information storage 2038. The functionality instructions storage 2034 can comprise computer-accessible instructions that, in response to execution by at least one of the processor(s) 2014, can implement one or more of the functionalities of the disclosure. The computer-accessible instructions can embody or can comprise one or more software components illustrated as automation control component(s) 2036. In one scenario, execution of at least one component of the automation control component(s) 2036 can implement one or more of the methods described herein, such as one or more of the example methods presented in FIGS. 21-32. For instance, such execution can cause a processor that executes the at least one component to carry out a disclosed example method. It should be appreciated that, in one aspect, a processor of the processor(s) 2014 that executes at least one of the automation control component(s) 2036 can retrieve information from or retain information in an intelligent automation control information element 2040 in the functionality information storage 2038 in order to operate in accordance with the functionality programmed or otherwise configured by the automation control component(s) 2036. Such information can include at least one of code instructions, information structures, or the like. Such instructions and information structures can embody or can constitute machine-learning techniques (e.g., pattern recognition algorithms, inference algorithms, and the like) that can be utilized to implement at least certain functionality described herein. At least one of the one or more interfaces 2050 (e.g., application programming interface(s)) can permit or facilitate communication of information between two or more components within the functionality instructions storage 2034. The information that is communicated by the at least one interface can result from implementation of one or more operations in a method of the disclosure. In certain embodiments, one or more of the functionality instructions storage 2034 and the functionality information storage 2038 can be embodied in or can comprise removable/non-removable, and/or volatile/non-volatile computer storage media.

At least a portion of at least one of the automation control component(s) 2036 or automation control information 2040 can program or otherwise configure one or more of the processors 2014 to operate at least in accordance with the functionality described herein. In one embodiment, the automation control component(s) 2036 contained in the functionality instruction(s) storage 2034 can include one or more components that can provide the functionality described herein in connection with customer-centric intelligent automation control. One or more of the processor(s) 2014 can execute at least one of the automation control component(s) 2036 and leverage at least a portion of the information in the functionality information storage 2038 in order to provide customer-centric intelligent automation control in accordance with one or more aspects described herein.

It should be appreciated that, in certain scenarios, the functionality instruction(s) storage 2034 can embody or can comprise a computer-readable non-transitory storage medium having computer-accessible instructions that, in response to execution, cause at least one processor (e.g., one or more of processor(s) 2014) to perform a group of operations comprising the operations or blocks described in connection with the disclosed methods.

In addition, the memory 2030 can comprise computer-accessible instructions and information (e.g., data and/or metadata) that permit or facilitate operation and/or administration (e.g., upgrades, software installation, any other configuration, or the like) of the computing device 2010. Accordingly, as illustrated, the memory 2030 can comprise a memory element 2042 (labeled operating system (OS) instruction(s) 2042) that can contain one or more program modules that embody or include one or more operating systems, such as a Windows operating system, Unix, Linux, Symbian, Android, Chromium, or substantially any OS suitable for mobile computing devices or tethered computing devices. In one aspect, the operational and/or architectural complexity of the computing device 2010 can dictate a suitable OS. The memory 2030 also comprises a system information storage 2046 having data and/or metadata that permits or facilitates operation and/or administration of the computing device 2010. Elements of the OS instruction(s) 2042 and the system information storage 2046 can be accessible or can be operated on by at least one of the processor(s) 2014.

It should be recognized that while the functionality instructions storage 2034 and other executable program components, such as the OS instruction(s) 2042, are illustrated herein as discrete blocks, such software components can reside at various times in different memory components of the computing device 2010, and can be executed by at least one of the processor(s) 2014. In certain scenarios, an implementation of the automation control component(s) 2036 can be retained on or transmitted across some form of computer-readable media.

The computing device 2010 and/or one of the computing device(s) 1970 can include a power supply (not shown), which can power up components or functional elements within such devices. The power supply can be a rechargeable power supply, (e.g., a rechargeable battery), and it can include one or more transformers to achieve a power level suitable for operation of the computing device 2010 and/or one of the computing device(s) 1970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 1918) to connect operationally to the conventional power grid. In another aspect, the power supply can include an energy conversion component, such as a solar panel, to provide additional or alternative power resources or autonomy for the computing device 2010 and/or at least one of the computing device(s) 1970.

The computing device 2010 can operate in a networked environment by utilizing connections to one or more remote computing devices 1970. As an illustration, a remote computing device can be a personal computer, a portable computer, a server, a router, a network computer, a peer device or other common network node, and so on. As described herein, connections (physical and/or logical) between the computing device 2010 and a computing device of the one or more remote computing devices 1970 can be made via one or more traffic and signaling pipes 1960, which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 1970) that are functionally coupled (e.g., communicatively linked or otherwise coupled) through a network having traffic and signaling pipes and related network elements. In a distributed computing environment, in one aspect, one or more software components (such as program modules) can be located in both the computing device 2010 and at least one remote computing device of the computing device(s) 1970, for example. It should be appreciated that in such distributed environments, the functionality for generation of organization intelligence and management thereof can be implemented by the system constituted at least by the computing device 2010 and at least one of the computing device(s) 1970. Such a system can embody or can contain at least a portion of the example operational environment 100, (e.g., the automation orchestration platform 730).

In certain embodiments, such as example embodiment 2000 shown in FIG. 20, various features of the embodiments of the disclosure (e.g., systems, techniques, and the like) can be practiced in distributed computing environments, such as grid-based environments, where tasks can be performed by remote processing devices (computing device(s) 1970) that are functionally coupled (e.g., communicatively linked or otherwise coupled) through a network having traffic and signaling pipes and related network elements. In a distributed computing environment, in one aspect, one or more software components (such as program modules) can be located in both a local computing device 1910 and at least one remote computing device, such as computing device 2010. As illustrated and described herein, the at least one remote computing device, (e.g., computing device 2010), can have substantially the same architecture and associated functionality as the computing device 1910. For instance, the computing device 2010 can comprise processor(s) 2014, I/O interface(s) 2016, and a memory 2030, where a bus architecture can couple functionally two or more of such elements. The memory 2030 can comprise a functionality instructions storage 2034 having one or more intelligent automation control component(s) 2036, and a functionality information storage 2038 having intelligent automation control information 2040. The memory 2030 also can comprise OS instruction(s) 2042 and system information storage 2046 that can permit, at least in part, operation and/or administration of the computing device 2010. One or more internal programming interfaces 2050 (represented as interface(s) 2050 in FIG. 20) can permit or facilitate exchange of information between the intelligent automation control components 2036 and the functionality information storage 2038. In a scenario in which several components are present in the group of intelligent automation control components 2036, at least one interface of the interface(s) 2050 can permit or facilitate exchange of information between at least two of such components.

In one embodiment, the computing device 1910 and the computing device 2010 can embody or can include the devices 210 and/or functional elements thereof. In another embodiment, the computing device 1910 and the computing device 2010 can embody the automation orchestration platform 730 and the development platform 770 (which in certain implementations can include the asset marketplace platform 1526).

In view of the aspects described herein, example methods that can be implemented in accordance with the disclosure can be better appreciated with reference to the diagrams in FIGS. 21-32. For purposes of simplicity of explanation, the example methods disclosed herein are presented and described as a series of blocks. However, it is to be understood and appreciated that the disclosed methods are not limited by the order of blocks and associated actions, as some blocks may occur in different orders and/or concurrently with other blocks from that shown and described herein. For example, the various methods or processes of the disclosure can be alternatively represented as a series of interrelated states or events, such as in a state diagram. Furthermore, not all illustrated blocks and associated action(s) may be required to implement a method in accordance with one or more aspects of the disclosure. Further yet, two or more of the disclosed methods or processes can be implemented in combination with each other, to accomplish one or more features or advantages described herein. At least a portion of the methods described herein can be implemented (e.g., configured (such as linked, compiled, a combination thereof, or the like); executed; configured and executed; or the like) by a system having at least one processor and at least one information storage device (which also may be referred to as at least one memory device or at least one memory). Such a system can comprise one or more computing devices or one or more processors, and can be employed to execute computer-accessible instructions retained in a memory, or any computer-readable or machine-readable medium, to implement the methods described herein. The computer-accessible instructions can provide a computer-executable or machine-executable framework to implement the methods described herein.

It should be further appreciated that the example methods of the disclosure can be retained on an article of manufacture, or computer-readable medium, to permit or otherwise facilitate transporting and transferring such methods to a computing device (e.g., a desktop computer, a mobile computer, such as a tablet or a smartphone; a mobile telephone, a blade computer, a programmable logic controller, and the like) for execution, and thus implementation, by a processor of the computing device or for storage in a memory thereof.

Figure 21:
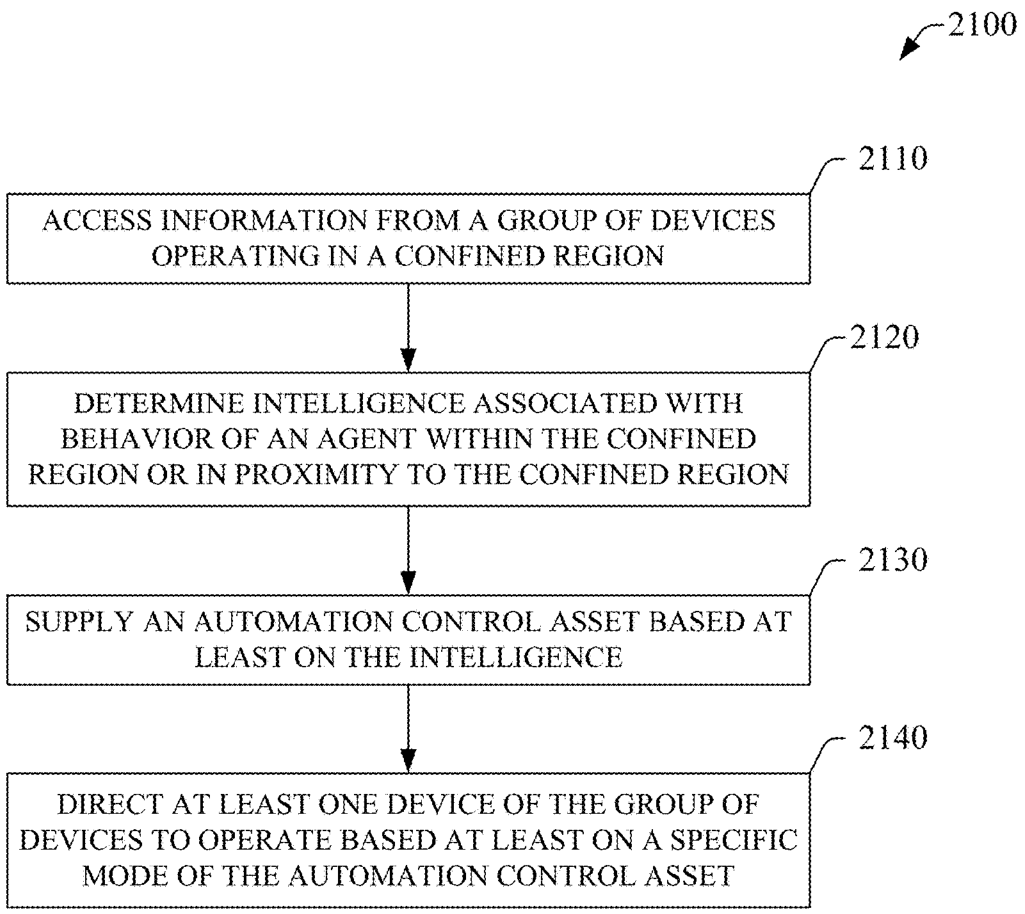
FIGS. 21-33 illustrate example methods for costumer-centric intelligent automation control in accordance with one or more embodiments of the disclosure. While the example techniques illustrated in FIGS. 21-26 and 28-32 are conveyed in flowcharts, the example method illustrated in FIG. 27 is conveyed in an example process flow comprising example architecture (e.g., device(s), a gateway device, and an orchestration platform) that can operate in accordance with one or more aspects of the disclosure.

FIG. 21 presents a flowchart of an example method 2100 for generation and/or update of automation control assets and associated control of devices in accordance with one or more aspects of the disclosure. In one embodiment, a system that has at least one processor can implement (e.g., configure, compile, link, execute, combinations thereof, or the like) one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method in part or in its entirety. In additional or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

At block 2110, information can be accessed from a group of devices operating in a confined region. The devices can include connected devices, such as wearable computing devices, mobile computing devices, customer premises equipment; sensors; actuators; motors; equipment with specific functionality (e.g., a furnace, a water heater, an air conditioner, a compressor, a fan, and so forth). As described herein, the information can include data, metadata, and/or signaling representative of a state or condition of a device in the group of devices. In one example, the confined region embodies or includes an automated environment in which one or more of the group of devices can operate in accordance with an automation control asset in accordance with this disclosure. At block 2120, intelligence associated with behavior of an agent (e.g., an end-user, a device, a sensor, a program in execution, a combination thereof, or the like) within the confined region or in proximity to the confined region can be determined. At block 2130, an automation control asset can be supplied based at least on the intelligence determined at block 2120. At block 2140, at least one device of the group of devices can be directed or otherwise instructed to operate based at least on a specific mode of operation of the automation control asset.

Figure 22:
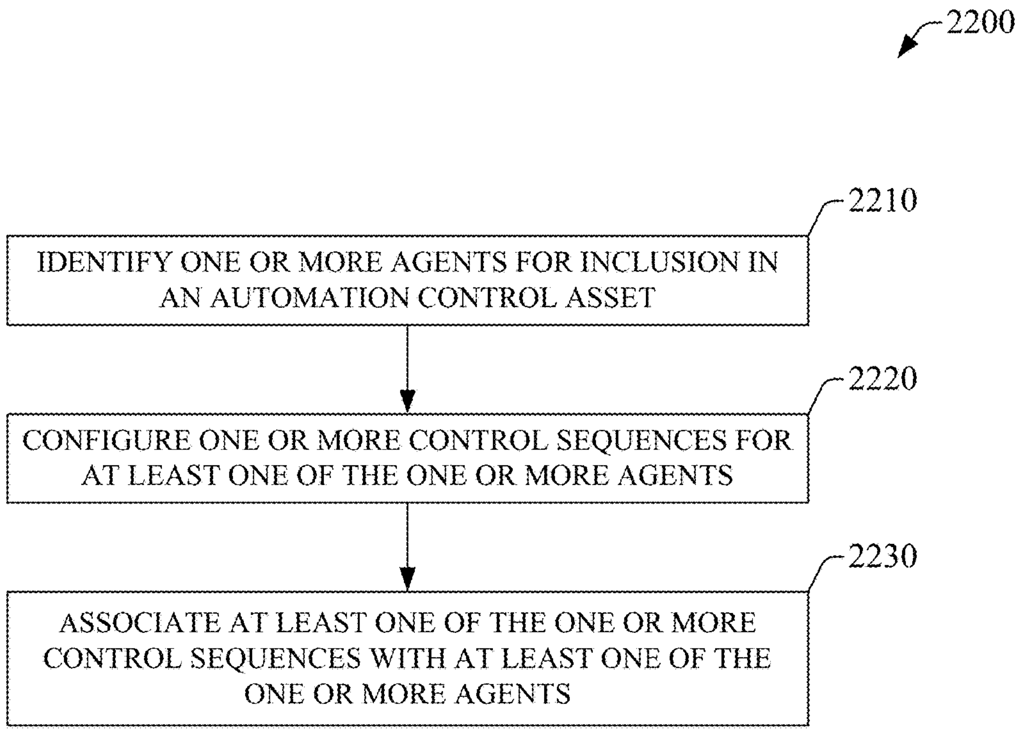

FIG. 22 presents a flowchart of an example method 2200 for generation and/or update of automation control assets and associated control of devices in accordance with one or more aspects of the disclosure. In certain embodiments, a system that has at least one processor can implement (e.g., configure, compile, link, execute, combinations thereof, or the like) one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method in part or in its entirety. In additional or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

At block 2210, one or more agents (e.g., device(s), sensor(s), and/or software application(s)) can be identified or otherwise determined for inclusion in an automation control asset. At block 2210, one or more control sequences can be configured for at least one of the agent(s) identified at block 2210. At block 2230, at least one of the control sequence(s) can be associated with at least one of the agent(s).

Figure 23:
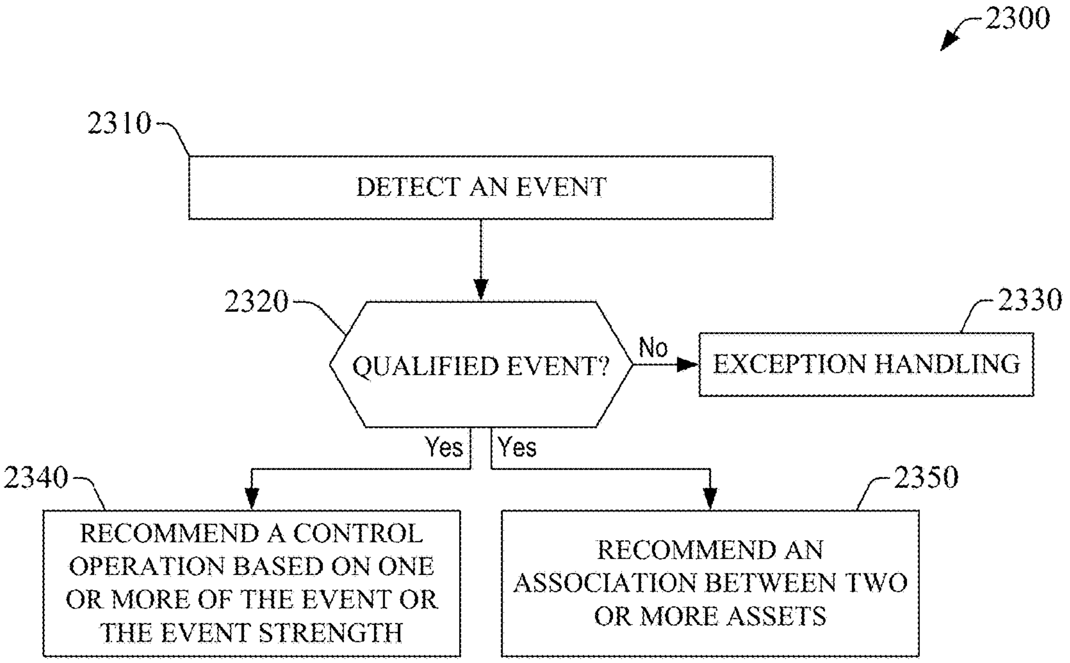

FIG. 23 presents a flowchart of an example method 2300 for providing a recommendation for intelligent automation control in accordance with one or more aspects of the disclosure. In certain embodiments, a system that has at least one processor can implement (e.g., configure, compile, link, execute, combinations thereof, or the like) one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method in part or in its entirety. In additional or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

At block 2310, an event can be detected. At block 2320, it can be determined if the event is a qualified event. In response to ascertaining that the event is not a qualified event, flow can be directed to block 2330, at which exception handling can be performed. In the alternative, in response to ascertaining that the event is a qualified event, flow can be directed to block 2340, block 2350, or both (concurrently or sequentially in any order). Specifically, at block 2340, a control operation or other type of directive can be recommended based at least on one or more of the event or the event strength. For instance, the event can be a change in temperature $\Delta T$ and the event strength can be the magnitude of DT, whether the temperature increases ($\Delta T>0$) or decreases ($\Delta T<0$). At block 2350, an association between two or more assets can be recommended.

Figure 24:
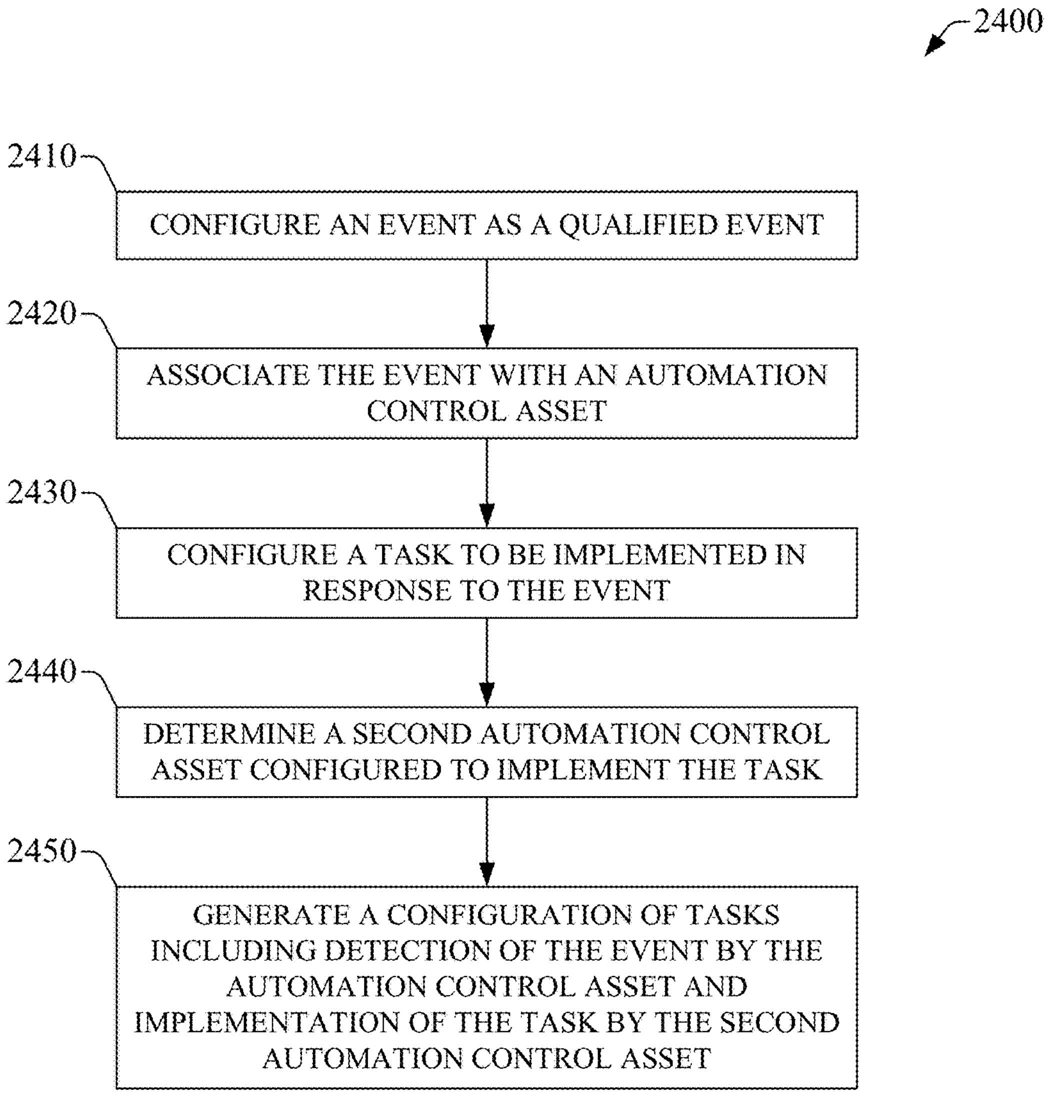

FIG. 24 presents a flowchart of an example method 2400 for configuring hybrid intelligent automation control in accordance with one or more aspects of the disclosure. In one example, such a type of control can refer to regulation of an environment via two or more automation control assets. In certain embodiments, a computing system that has at least one processor can implement (e.g., configure, compile, link, execute, combinations thereof, or the like) one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method in part or in its entirety. In additional or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

At block 2410, an event can be configured as a qualified event. At block 2420, the event can be associated with an automation control asset. At block 2430, a task to be implemented in response to the qualified event can be configured. At block 2440, a second automation control asset can be identified or otherwise determined to implement the task. At block 2450, a configuration of tasks can be generated, where such a configuration can include detection of the event by the automation control asset and implementation of the task by the second automation control asset.

Figure 25:
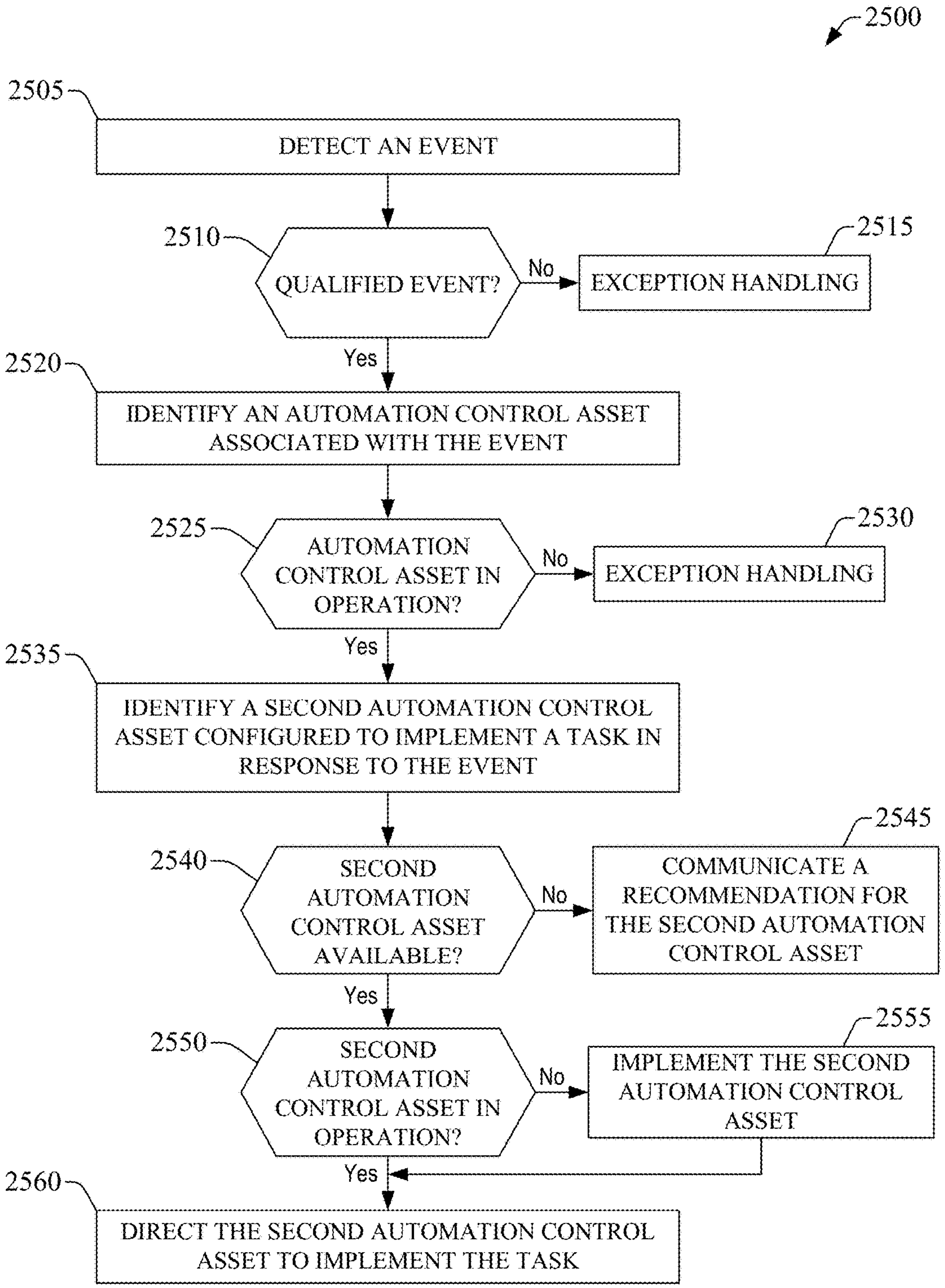

FIG. 25 presents a flowchart of an example method 2500 for implementing hybrid automation control in accordance with one or more aspects of the disclosure. In certain embodiments, the system or computing device that implements the example method 2000 also can implement the subject example method. At block 2505, an event can be detected. At block 2510, it can be determined if the event is a qualified event. In response to ascertaining that the event is not a qualified event, exception handling can be implemented at block 2515. In the alternative, in response to ascertaining that the event is a qualified event, an automation control asset associated with the event can be identified or otherwise determined at block 2520. At block 2525, it can be determined if the automation control asset is in operation. In response to ascertaining that the automation control asset is not in operation, exception handling can be implemented at block 2530. In certain embodiments, implementing exception handling can include implementing (e.g., executing) the automation control asset. In addition or in other embodiments, implementing exception handling can include communicating a recommendation for the automation control asset. In the alternative, in response to ascertaining that the automation control asset is in operation, a second automation control asset can be identified or otherwise determined at block 2535. In one aspect, the second automation control asset can be configured to implement a task in response to the event (which has been determined to be a qualified event).

At block 2540, it can be determined if the second automation control asset is available. Availability of such an asset can be determined by availability of a subscription or other type of affirmative entitlement to the second automation control asset by a party (e.g., an end-user or a consumer) associated with an environment (e.g., the confined region 104 or the confined region 710). In response to ascertaining that the second automation control asset is not available, a recommendation for such an asset can be communicated at block 2545. In the alternative, in response to ascertaining that the second automation control asset is available, it can be determined, at block 2550, if the second automation control asset is in operation. In response to ascertaining that such an asset is not in operation, the second automation control asset can be implemented at block 2555. Implementation of the second automation control asset can include manipulation of one or more agents associated with the asset, such as execution of a software application, data collection by one or more sensors, and/or initialization of one or more devices. As such, the implementation of the second automation control asset can cause such an asset to be in operation. In the alternative, in response to ascertaining that the second automation control asset is in operation, such an asset can be directed or otherwise instructed, at block 2560, to implement the task responsive to the event detected at block 2505.

Figure 26:
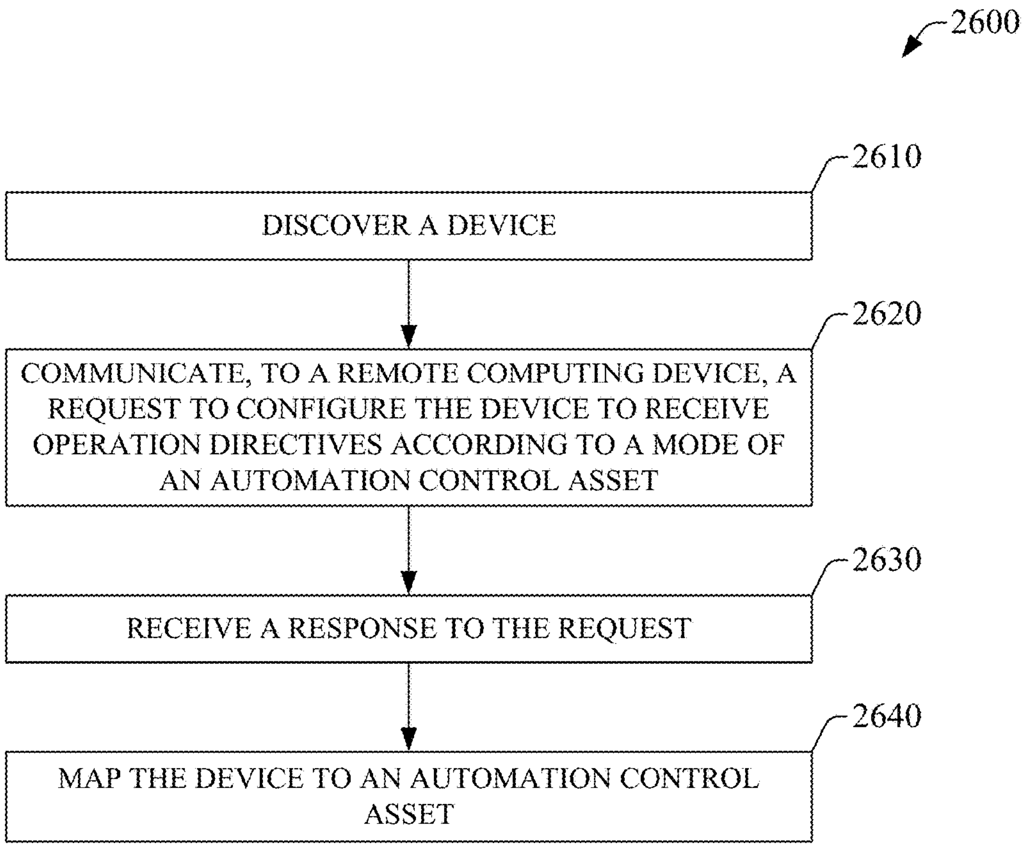

FIG. 26 presents a flowchart of an example method 2600 for device discovery and configuration in accordance with one or more aspects of the disclosure. In certain embodiments, the subject example method can be implemented by a computing device, such as a gateway device in accordance with aspects of the disclosure. At block 2610, a device can be discovered. At block 2620, a request to configure the device to receive operation directives can be communicated or otherwise transmitted to a remote computing device. In one aspect, one or more of the operation directives can be determined by a mode of an automation control asset. At block 2630, a response to the request can be received. The computing device (e.g., gateway 712) can receive the response. At block 2640, the device can be mapped to an automation control asset. In one example, mapping the device can include generating a device profile that includes information indicative of the association between the device and the automation control asset.

Figure 27:
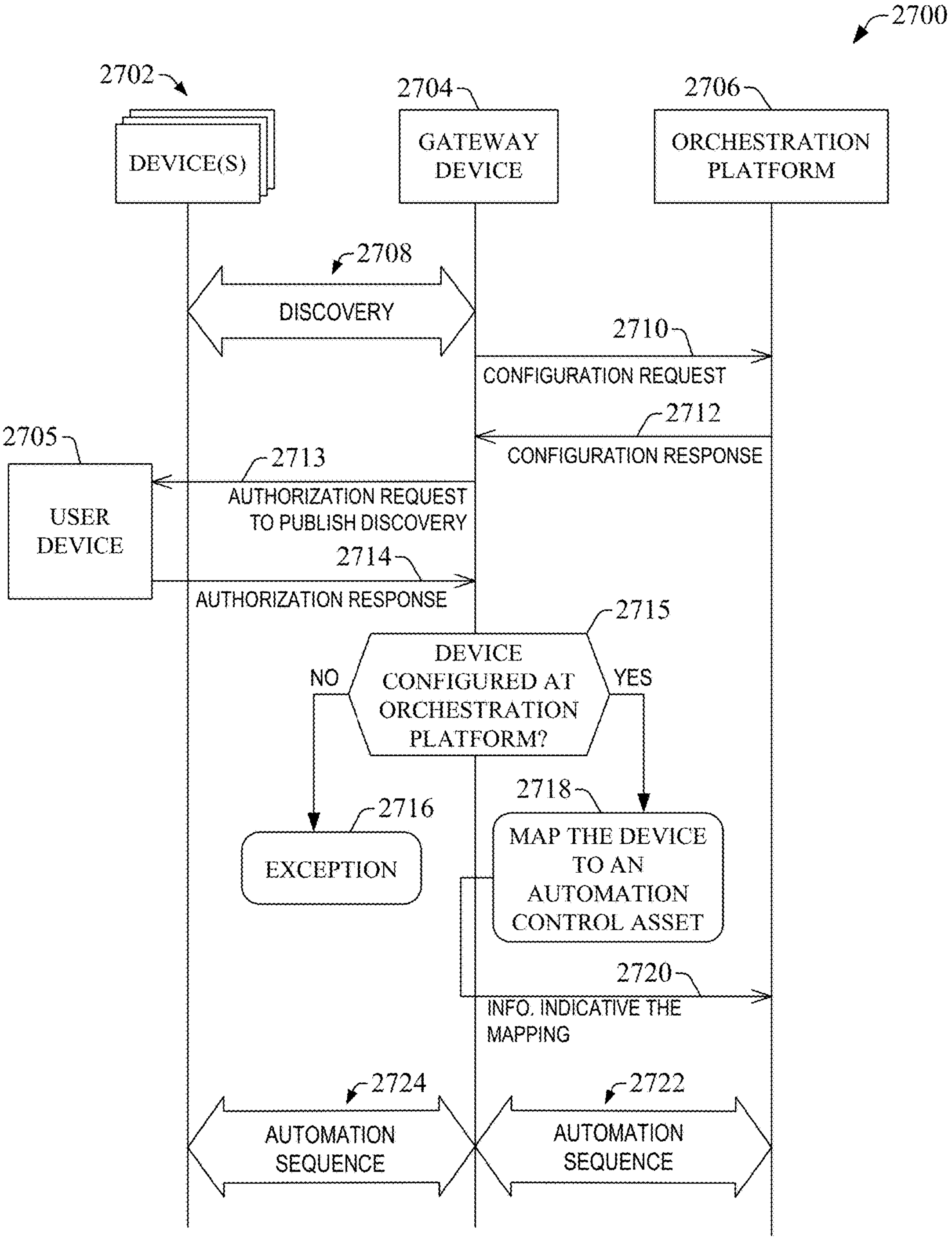

FIG. 27 presents a process flow of an example method 2700 for device discovery and configuration in accordance with one or more aspects of the disclosure. As illustrated, the example process flow can be implemented in a distributed arrangement in which several functional elements communicate information and process such information. More specifically, in one aspect, a gateway device 2704 can exchange discovery signaling 2708 (e.g., handshake signaling) with one or more devices 2702. In one aspect, at least a portion of the discovery signaling can permit the gateway device 2704 to identify at least one of the device(s) 2702. Identification of the device can include information indicative of one or more of a device identity, a device type, a device functionality, a combination thereof, or the like. In addition, the discovery signal can convey a current association between the at least one device and one or more automation control assets. The gateway device 2704 can communicate a configuration request 2710 to an orchestration platform 2706. The configuration request 2710 can be directed to configuration of the at least one device of the device(s) 2702 to operate in accordance with an automation control asset, which can be administered by the orchestration platform 2706. The configuration request 2710 can include, for example, information indicative of a location of the at least one device; information indicative of a type of the at least one device; information indicative of the sensitivity of the at least one device; access rights (such as an entitlement) to the at least one device by a party associated with the at least one device, a combination thereof, or the like.

In response to the configuration request 2710, the orchestration platform 2706, or a component therein, can configure the at least one device of the device(s) 2702 to receive control tasks or other directives associated with an automation control asset. In the alternative, the orchestration platform 2706 can reject or otherwise decline the configuration request 2710. In any case, the orchestration platform 2706 can communicate a configuration response 2712 to the gateway device 2704.

The gateway device 2704 can receive the configuration response 2712 and, in response, can provide an authorization request 2713 to publish the discovery of the configured device(s). As illustrated, the authorization request 2713 can be transmitted to a user device 2705 that can be operated by an end-user or other party associated with a confined region including the device(s) 2702. The user device 2705 can provide an authorization response 2714 to the gateway device 2704. For instance the authorization response 2714 can permit or decline broadcast of the discovered device(s) by the gateway device 2704 or the orchestration platform 2706. As such, presentation of a discovered device associated with the confined region can be administered by an end-user, for example.

In addition, at 2715, based on the response, the gateway device 2704 can determine if a device associated with the configuration request 2710 has been configured, by the orchestration platform 2706, to receive control tasks or directives associated with an automation control asset. In response to ascertaining that the device has not been so configured, the gateway device can implement an exception at block 2716. In the alternative, in response to ascertaining that the device has been configured to receive such control tasks or directives, the gateway device 2704 can map the device to the automation control asset at block 2718. In addition, the gateway device 2704 can convey information 2720 indicative or otherwise representative of the mapping to the orchestration platform 2706.

Subsequent to configuration and mapping, the gateway device 2704 and the orchestration platform 2706 can exchange an automation sequence 2722, and based on such a sequence, the gateway device 2704 and at least one configured and mapped device of the device(s) 2702 can exchange an automation sequence 2724. Each of such automation sequences can include data, metadata, and/or signaling that permits implementation of one or more automation tasks associated with the automation control asset.

Figure 28:
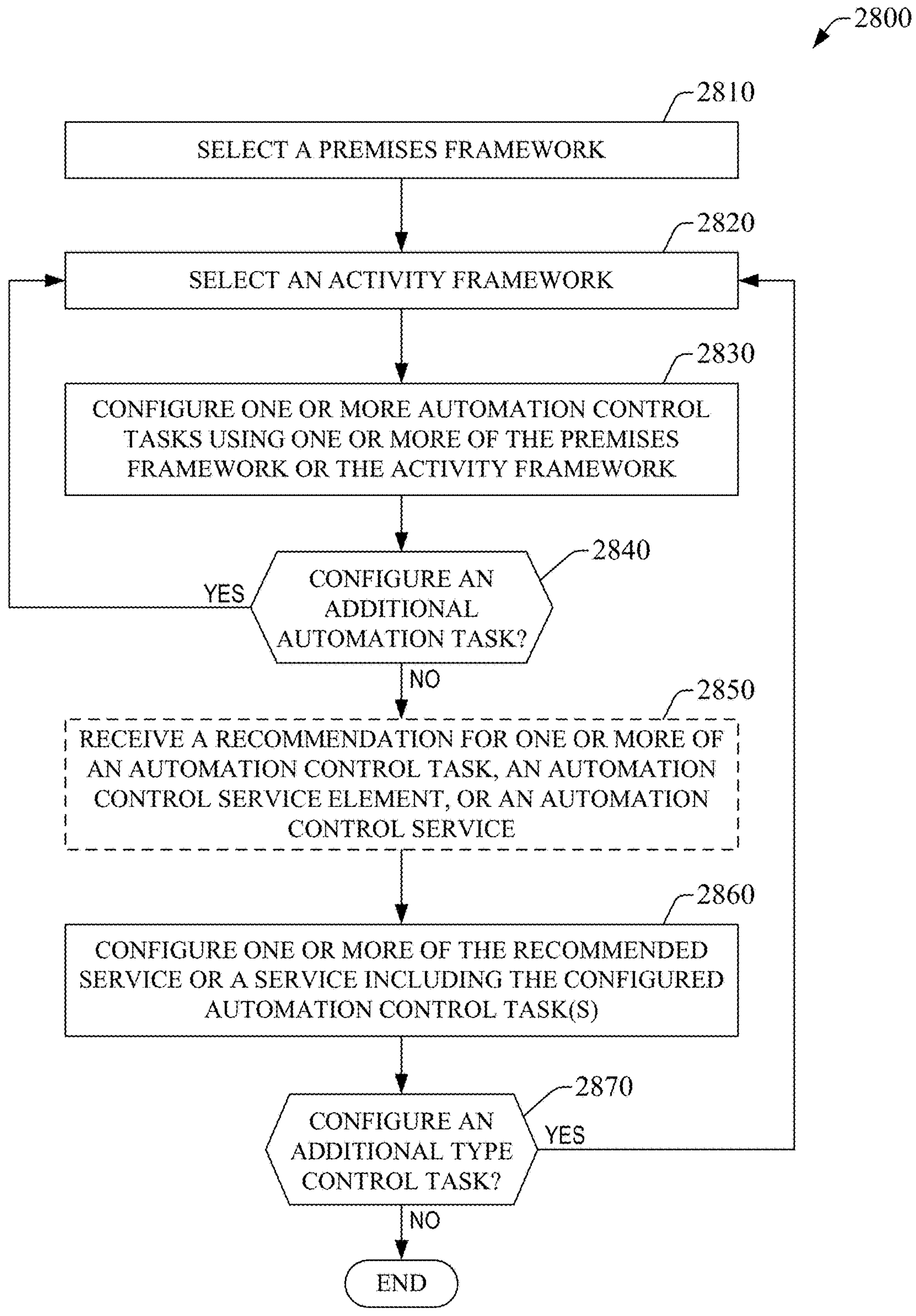

FIG. 28 presents a flowchart of an example method 2800 for developing or otherwise configuring automation control assets according to one or more aspects of the disclosure. In certain embodiments, a computing system having one or more processors functionally coupled to one or more memory devices can implement at least a portion of the subject example method. In one example, such a computing system can embody or can include the development platform 770. At block 2810, a premises framework can be selected. The premises framework embodies or includes a framework for an environment to be automated. As described herein, in one example, the environment can include a confined region and one or more agents to be automated and controlled. As such, in certain embodiments, the premises framework can include a single unit dwelling (SUD) framework, a multiple-dwelling unit (MDU) framework, a business framework, a factory framework, or the like. At block 2820, an activity framework can be selected. The activity framework can represent a category of functionality of the environment to be automated. A category of functionality can include, for example, music or sound, lighting, temperature, motion, physical access, and the like. More specifically, yet not exclusively, the activity framework can represent one or more automation control tasks that can be implemented within the environment. At block 2830, one or more automation control tasks (which also may be referred to as automation tasks) can be configured using or otherwise relying at least on one or more of the premises framework or the activity framework. At block 2840, it can be determined if an additional automation task is to be configured. In response to ascertaining that the additional automation task is to be configured, the flow of the subject example method can be directed to block 2820. In the alternative or in other embodiments, the flow can be directed to block 2850, an optional block at which a recommendation for an automation task, an automation control service element, and/or an automation control service can be received. At block 2860, one or more of the recommended service or a service including the configured automation control tasks can be configured. At block 2870, a determination may be made as to whether to configure an additional type control task.

Figure 29:
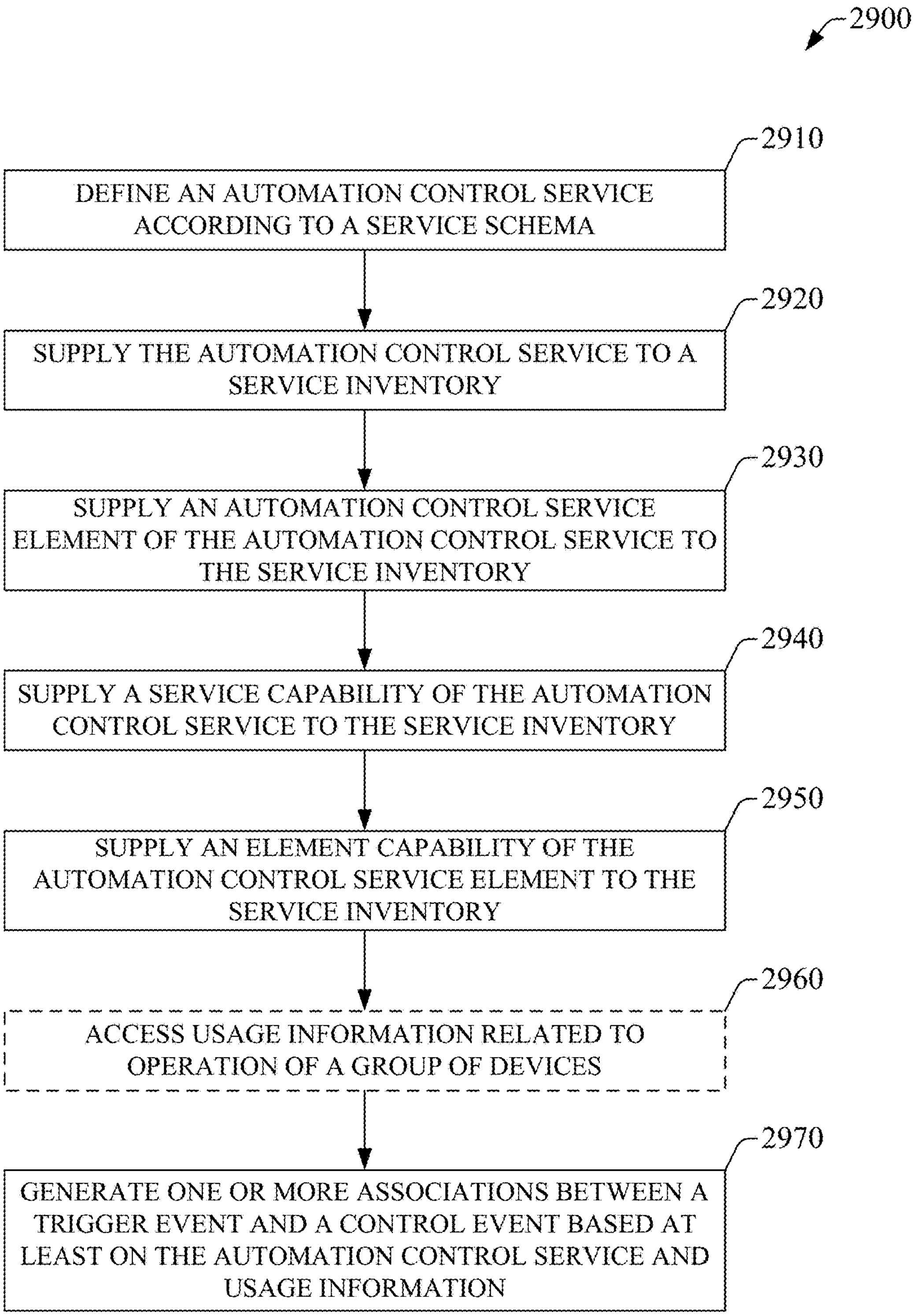

FIG. 29 presents a flowchart of an example method 2900 for developing or otherwise configuring an automation control asset in accordance with one or more aspects of the disclosure. In certain embodiments, a computing system having one or more processors functionally coupled to one or more memory devices can implement at least a portion of the subject example method. In one example, such a computing system can embody or can include the development platform 770. At block 2910, an automation control service can be defined according to a service schema. As described herein, the service schema can be embodied in or can include a XML schema and/or UML schema, such as the example schema illustrated in FIGS. 18A-18B. At block 2920, the automation control service can be supplied to a service inventory. At block 2930, an automation control service element of the automation control service can be supplied to the service inventory. In one aspect, the automation control service element can be supplied to a service element inventory that can be included or otherwise associated with the service inventory. At block 2940, a service capability of the automation control service can be supplied to the service inventory. In one aspect, the service capability can be supplied to a service capability inventory included or otherwise associated with the service inventory. At block 2950, an element capability of the automation control service element can be supplied to the service inventory. In one aspect, the element capability can be supplied to an element capability inventory included or otherwise associated with the service inventory. In certain embodiments, the service inventory can be embodied in a relational database retained in a repository (e.g., one or more memory devices) according to an inventory schema. The relational database can include tables that embody, respectively, the service element inventory, the service capability inventory, and the element capability inventory.

Figure 30:
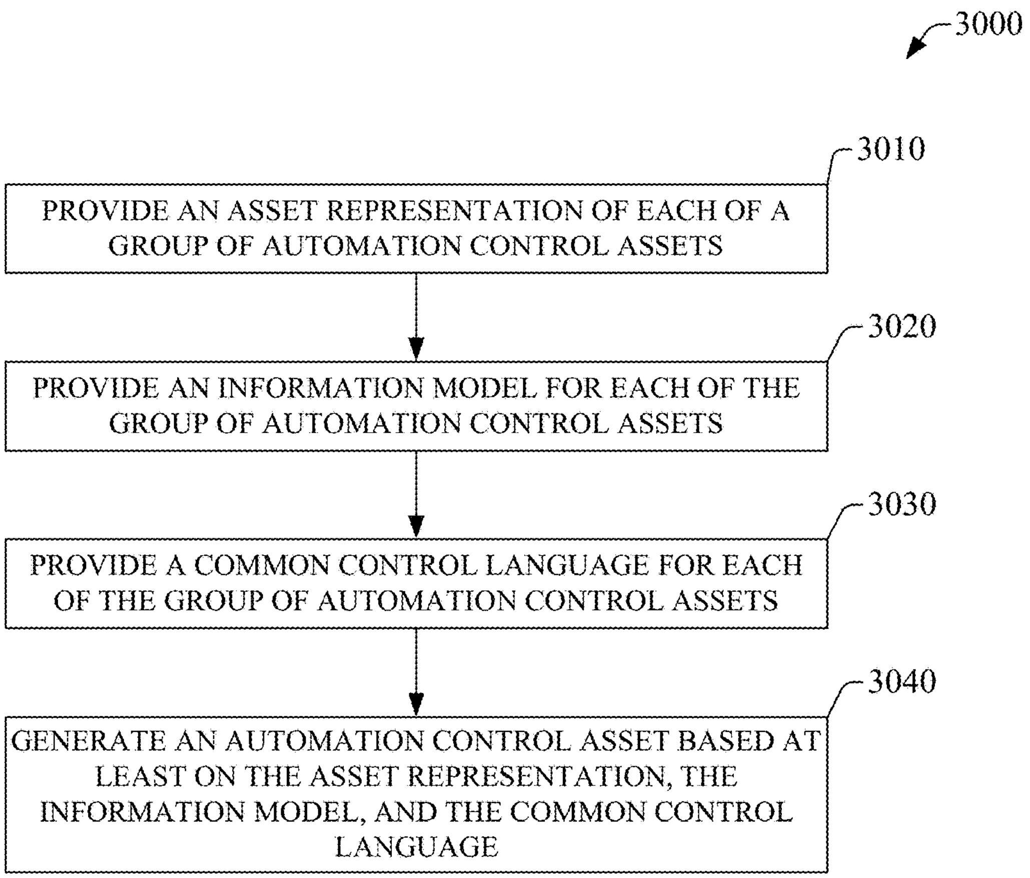

FIG. 30 presents a flowchart of an example method 3000 for developing an automation control asset in accordance with one or more aspects of the disclosure. In certain embodiments, a computing system having one or more processors functionally coupled to one or more memory devices can implement at least a portion of the subject example method. In one example, such a computing system can embody or can include the development platform 770. At block 3010, an asset representation of each of a group of automation control assets can be provided. As described herein, in certain embodiments, such a representation can be embodied in an XML schema and can be implementation-agnostic. At block 3020, an information model for each of a group of automation control assets can be provided. In certain embodiments, such a model can be embodied in or can include a UML schema. At block 3030, a common control language for each of the group of automation control assets can be provided. At block 3040, an automation control asset based at least on the asset representation, the information model, and the common control language. At block 3040, an automation control service comprising the generated automation control asset can be generated as described herein.

In certain embodiments, the example method 300 can include one or more blocks at which an input message from an agent associated with an operational environment controlled via the automation control service can be received; the input message is mapped to a control message based on the common control language; a control action for the agent based at least on the control message is determined; and the agent can be directed to execute the control action) or control operation).

In addition or in other embodiments, the subject example method can include a block at which availability of at least one of the generated automation control asset or the generated automation control service can be communicated. For instance, such availability can be communicated to a remote computing device Further or in yet other embodiments, the subject example method can include a block at which a recommendation for an automation control service based at least on a group of extant automation control services can be provided. In addition or in the alternative, the subject example method can include a block at which a recommendation for an automation control asset based at least on a group of extant automation control assets can be provided.

In certain embodiments, the subject example method can include a block at which a group of agents associated with automation control of an operational environment can be determined or otherwise identified based on at least one of (i) provisioning an automation control service for the operational environment, or (ii) detecting a change in the operational environment. In addition, in one embodiment, the subject example method can include a block at which an inventory of the determined group of agents can be determined. In one aspect, the group of agents comprises one or more of an automation control service, an automation control asset, an electronic device, a sensor, or a network service. In another aspect, an information structure representative of the generated inventory can be generated, wherein the information structure conveys relationships among agents in the group of agents. In yet another aspect, the subject example method can include a block at which at least a portion of the generated inventory can be provided. For instance, the computing system that implements the subject example method can provide (e.g., transmit or otherwise communicate) the generated inventory as an extensive markup language (XML) schema.

In certain embodiments, the subject example method also can include a block at which an automation control asset can be generated based at least in part on at least the portion of the generated inventory.

At block 2960, usage information related to operation of a group of devices within a confined region can be optionally accessed. At block 2970, one or more associations between a trigger event and a control event based at least on the automation control service and the usage information that may be accessed.

Figure 31:
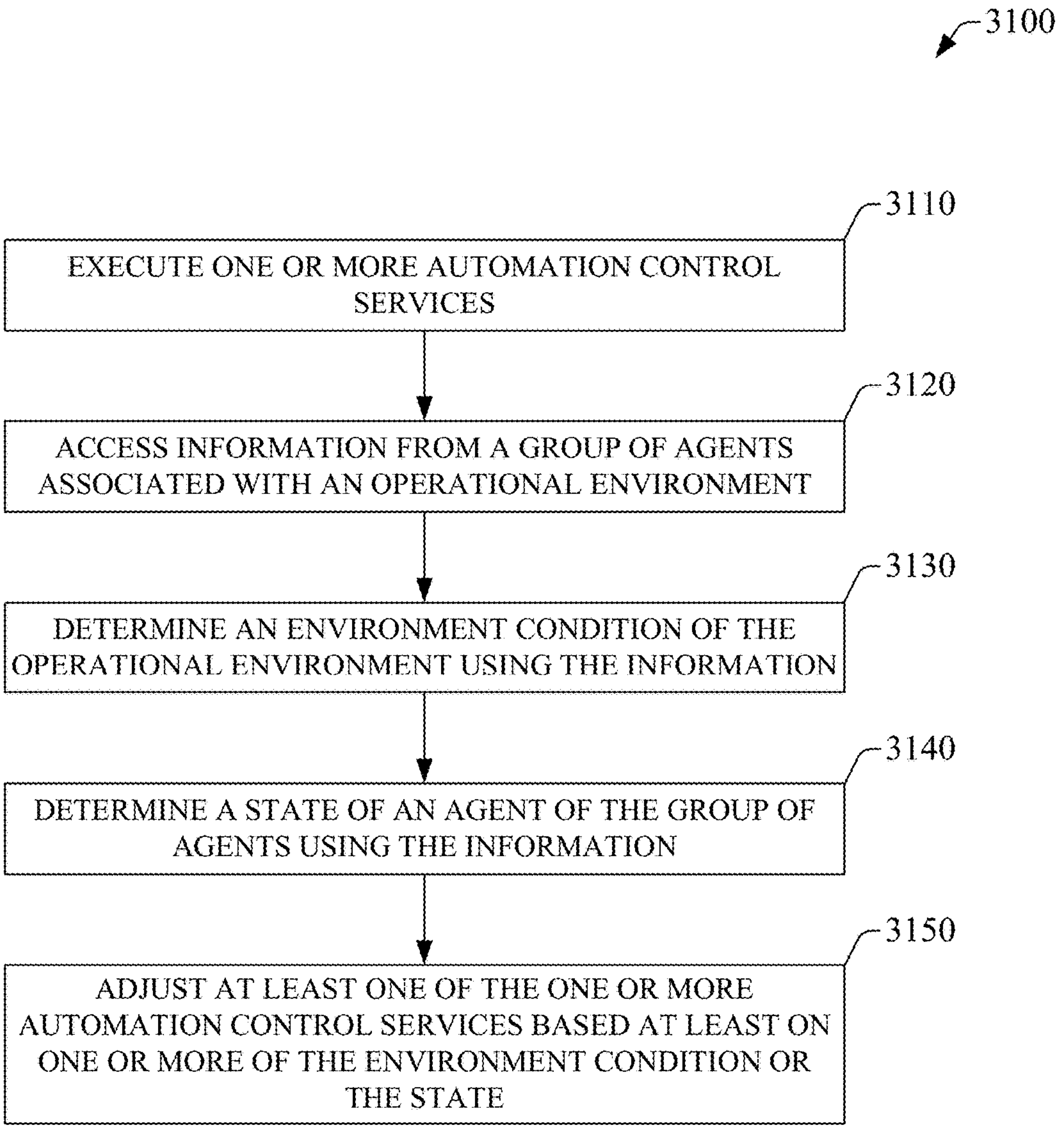
Figure 32:
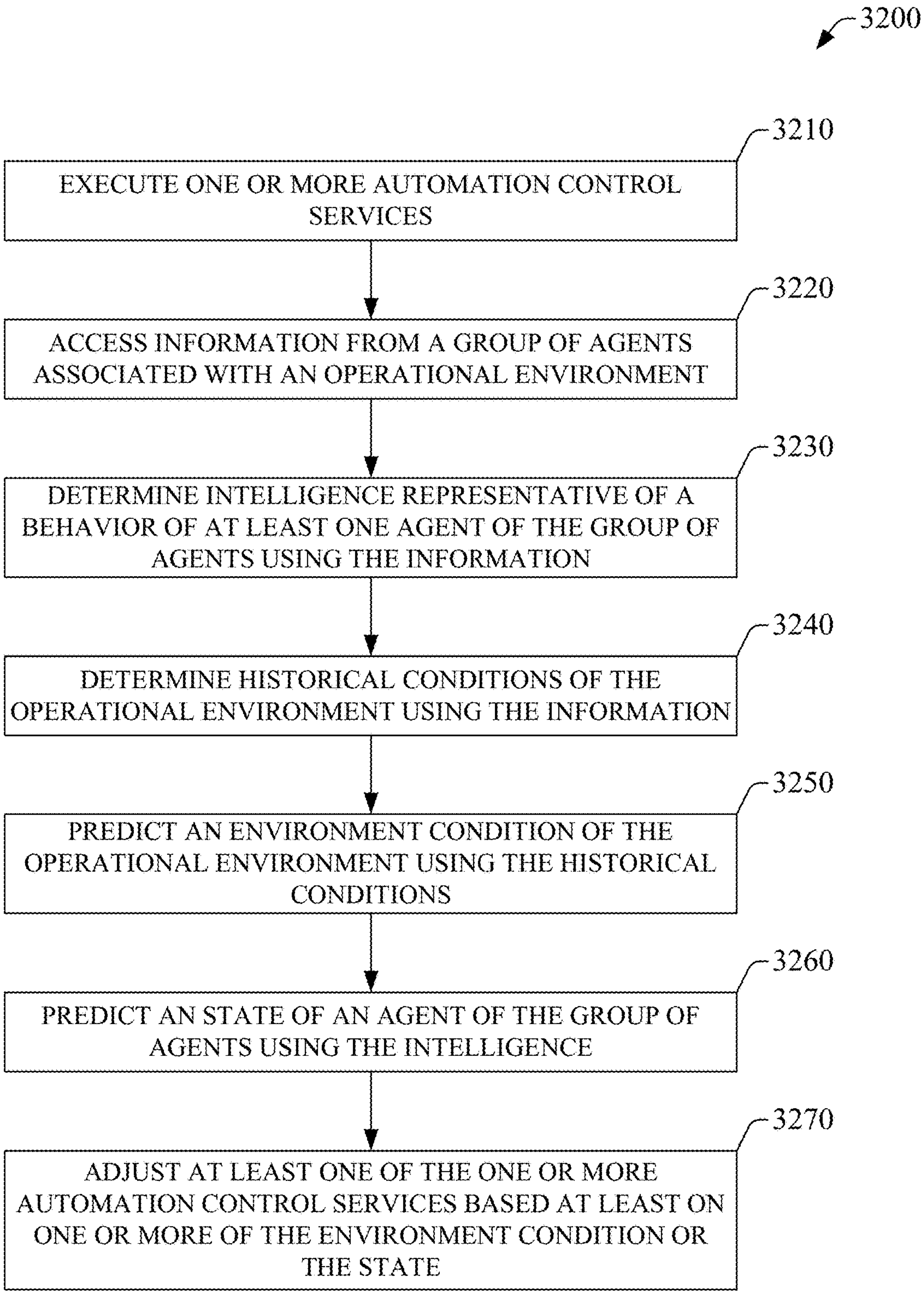
Figure 33:
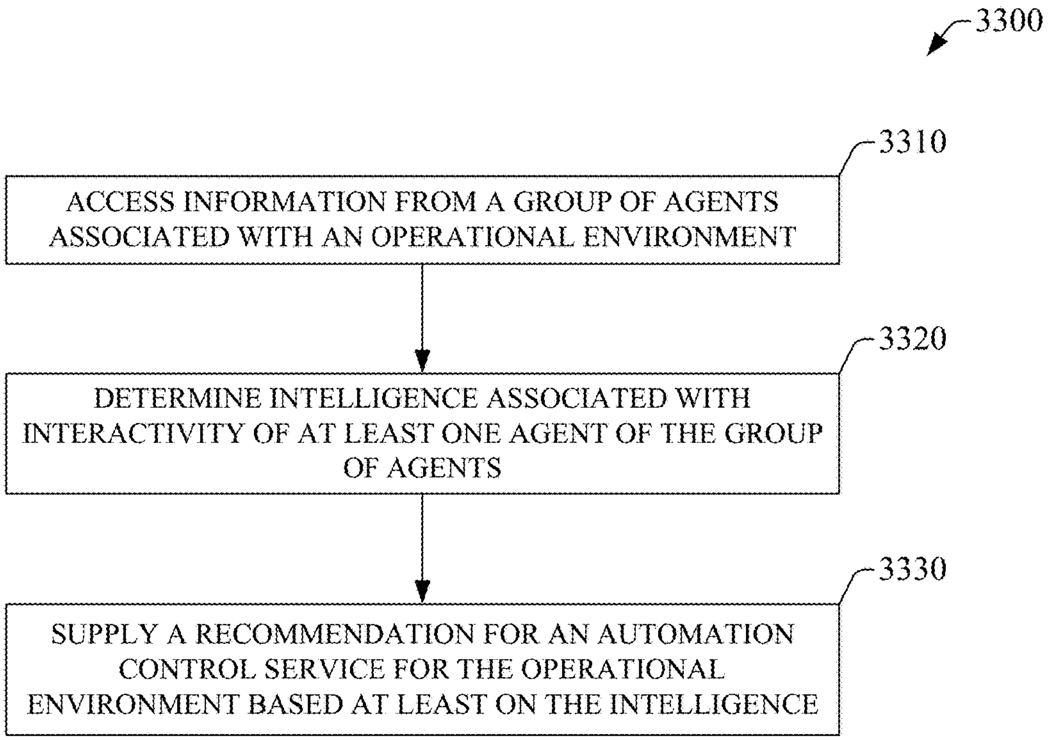

FIGS. 31-33 present examples of methods 3100, 3200, and 3300, respectively, for adaptation of an automation control service in accordance with aspects of the present disclosure. Similarly to other methods described herein, in certain embodiments, a computing system that has at least one processor can implement (e.g., configure, compile, link, execute, combinations thereof, or the like) one or more blocks of each of these example methods. The at least one processor can be functionally coupled to at least one memory device having encoded thereon computer-accessible instructions that represent the subject example method and, in response to execution by the system or the at least one processor, permit or otherwise facilitate implementation of each of the subject example methods in part or in its entirety. In addition or alternative embodiments, a computing device that has at least one processor or is functionally coupled thereto can implement one or more blocks of the subject example method. The at least one processor can be functionally coupled to at least one memory device having encoded thereon computer-accessible instructions that represent the subject example method and, in response to execution by the system or the at least one processor, permit or otherwise facilitate implementation of the subject example method.

Regarding example method 3100, at block 3110, one or more automation control services can be executed. At block 3120, information from a group of agents associated with an operational environment (e.g., a single family residence, a multiple-dwelling residence, or a SMB) can be accessed. At block 3130, an environment condition of the operational environment can be determined using at least a portion of the information. At block 3140, a state of an agent of the group of agents can be determined using at least a second portion of the information. At block 3150, at least one of the one or more automation control services can be adjusted based at least on one or more of the environment condition or the state.

In connection with example method 3200, at block 3210, one or more automation control services can be executed. At block 3220, information from a group of agents associated with an operational environment can be accessed. At block 3230, intelligence representative of a behavior of at least one agent of the group of agents can be determined based at least on a portion of the information. At block 3240, historical conditions of the operational environment can be determined based at least on a second portion of the information. At block 3250, an environment condition of the operational environment can be predicted based at least on the historical conditions. At block 3260, a state of an agent of the group of agents can be predicted based at least on the intelligence. At block 3270, at least one of the executed automation control service(s) can be adjusted based at least on one or more of the predicted environment condition or the state.

Regarding example method 3300, at block 3310, information from a group of agents associated with an operational environment can be accessed. At block 3320, intelligence associated with interactivity of at least one agent of the group of agents can be determined. The interactivity can represent, for example, interaction(s) of the at least one agent with another agent. In another example, the interactivity can represent interaction(s) of the at least one agent with an end-user (e.g., an occupant of the operational environment). At block 3330, a recommendation for an automation control service for the operational environment can be supplied based at least on the intelligence.

As it would readily be appreciated, various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having machine-accessible instructions (e.g., computer-readable and/or computer-executable instructions) such as computer software, encoded or otherwise embodied in such storage medium. Those instructions can be read or otherwise accessed and executed by one or more processors to perform or permit performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

At least some embodiments of the techniques in accordance with the disclosure are described with reference to block diagrams and flowchart illustrations of methods, computing devices, apparatuses and/or computer program products. It can be understood that each block of the block diagrams and flowchart illustrations, and combinations of blocks in the block diagrams and flowchart illustrations, respectively, can be implemented by machine-accessible instructions. In certain implementations (such as in the example computing environment described in connection with FIG. 20) the machine-accessible instructions may be loaded or otherwise incorporated into a general purpose computer, special purpose computer, or other programmable information processing apparatus to produce a particular machine, such that at least some or all of the operations or functions specified in the flowchart block or blocks can be implemented in response to execution at the computer or processing apparatus.

As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Unless otherwise expressly stated, it is in no way intended that any technique, protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

What has been described herein in the present specification and drawings includes examples of systems, devices, and techniques that can provide customer-centric intelligent automation control for device(s) and/or sensor(s). It is, of course, not possible to describe every conceivable combination of components and/or methodologies for purposes of describing the various features of the disclosure, but one of ordinary skill in the art can recognize that many further combinations and permutations of the claimed subject matter are possible. Accordingly, it may be apparent that various modifications and/or variations can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive.

What is claimed is:

1. A method for developing automation control services, comprising:

providing, by a computing system comprising at least one memory device and at least one processor, an asset representation of each of a group of automation control assets in an operational environment, wherein the asset representation is implementation-agnostic;

providing, by the computing system, an information model for each of the group of automation control assets;

providing, by the computing system, a common control language for the group of automation control assets, wherein the common control language permits discovery and control of the group of automation control assets by the computing system based on at least the information model;

gathering data regarding the behavior of a user in the operational environment, wherein the data is gathered prior to generation of an initial automation control asset;

generating, by the computing system and based at least on the asset representation, the information model, the common control language, and the data regarding the behavior of the user, the initial automation control asset that regulates operation of an agent of the operational environment based at least on a first change in the operational environment, wherein the agent comprises a non-human device;

generating, by the computing system, an inventory of a group of agents, wherein the group of agents comprises one or more of an automation control service, a second automation control asset, an electronic device, a sensor, or a network service;

generating, by the computing system, an information structure representative of the generated inventory, wherein the information structure conveys relationships among the group of agents;

generating, by the computing system, a third automation control asset based at least in part on at least a portion of the generated inventory; and directing, by the computing system and based at least on the initial automation control asset, the operation of the agent of the operational environment.

2. The method of claim 1, further comprising generating an automation control service comprising the generated automation control asset.

3. The method of claim 2, further comprising:

receiving, by the computing system and based at least on the automation control service, an input message from the agent;

mapping, by the computing system and based at least on the common control language, the input message to a control message; and determining, by the computing system and based at least on the control message, a control action for the agent.

4. The method of claim 2, further comprising communicating availability of at least one of the generated automation control asset or the generated automation control service.

5. The method of claim 1, further comprising providing, by the computing system, a recommendation for an automation control service based at least on a group of extant automation control services.

6. The method of claim 1, further comprising providing, by the computing system and based at least on a group of extant automation control assets, a recommendation for the automation control asset.

7. The method of claim 1, further comprising identifying, by the computing system and based at least on one of (i) provisioning an automation control service for the operational environment or (ii) detecting a second change in the operational environment, the agent, wherein the agent is in a group of agents.

8. The method of claim 1, further comprising providing, by the computing system, at least a portion of the generated inventory, wherein the generated inventory is provided via an extensive markup language (XML) schema.

9. A system, comprising:

at least one memory device having instructions encoded thereon; and at least one processor coupled to the at least one memory device and configured to execute the instructions and, in response, further configured at least to:

provide an asset representation of each of a group of automation control assets, wherein the asset representation is implementation-agnostic;

provide an information model for each of the group of automation control assets;

provide a common control language for each of the group of automation control assets, wherein the common control language permits discovery and control of the group of automation control assets by the system based on at least the information model;

gather data regarding the behavior of a user in an operational environment, wherein the data is gathered prior to generation of an initial automation control asset;

generate the initial automation control asset based at least on the asset representation, the information model, the common control language, and the data regarding the behavior of the user, wherein the initial automation control asset regulates operation of an agent of the operational environment based at least on a first change in the operational environment, wherein the agent comprises a non-human device;

generate an inventory of a group of agents, wherein the group of agents comprises one or more of an automation control service, a second automation control asset, an electronic device, a sensor or network service;

generate an information structure representative of the generated inventory, wherein the information structure conveys relationships among the group of agents;

generate a third automation control asset based at least in part on at least a portion of the generated inventory; and direct the operation of the agent of the operational environment based at least on the initial automation control asset.

10. The system of claim 9, wherein the at least one processor is further configured, in response to execution of the instructions, to generate an automation control service comprising the generated automation control asset.

11. The system of claim 10, wherein the at least one processor is further configured, in response to execution of the instructions, to:

receive an input message from the agent based at least on the automation control service;

map the input message to a control message based at least on the common control language; and determine a control action for the agent based at least on the control message.

12. The system of claim 10, wherein the at least one processor is further configured, in response to execution of the instructions, to communicate availability of at least one of the generated automation control asset or the generated automation control service.

13. The system of claim 9, wherein the at least one processor is further configured, in response to execution of the instructions, to provide a recommendation for an automation control service based at least on a group of extant automation control services.

14. The system of claim 9, wherein the at least one processor is further configured, in response to execution of the instructions, to provide a recommendation for the automation control asset based at least on a group of extant automation control assets.

15. The system of claim 9, wherein the at least one processor is further configured, in response to execution of the instructions, to identify the agent, wherein the agent is in a group of agents, based at least on one of (i) provision an automation control service for the operational environment or (ii) detect a second change in the operational environment.

16. The system of claim 9, wherein the at least one processor is further configured, in response to execution of the instructions, to provide at least a portion of the generated inventory, wherein the generated inventory is provided via an extensive markup language (XML) schema.

* * * * *